US010303250B2

(12) United States Patent
Jeong

(10) Patent No.: US 10,303,250 B2
(45) Date of Patent: May 28, 2019

(54) WEARABLE GLASSES AND METHOD OF DISPLAYING IMAGE VIA THE WEARABLE GLASSES

(71) Applicant: SAMSUNG ELECTRONICS CO., LTD., Suwon-si (KR)

(72) Inventor: Kyung-ho Jeong, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/941,069

(22) Filed: Mar. 30, 2018

(65) Prior Publication Data
US 2018/0224934 A1 Aug. 9, 2018

Related U.S. Application Data

(63) Continuation of application No. 14/810,652, filed on Jul. 28, 2015, now Pat. No. 9,965,030.

(30) Foreign Application Priority Data

Jul. 31, 2014 (KR) .................. 10-2014-0098630
Feb. 10, 2015 (KR) .................. 10-2015-0020288

(51) Int. Cl.
G06F 3/01 (2006.01)
G02B 27/01 (2006.01)
(Continued)

(52) U.S. Cl.
CPC ......... G06F 3/013 (2013.01); G02B 27/0093 (2013.01); G02B 27/017 (2013.01);
(Continued)

(58) Field of Classification Search
CPC ........ G06F 3/017; G06F 3/013; G06F 3/0346; G06F 1/163; G06F 3/011
See application file for complete search history.

(56) References Cited

U.S. PATENT DOCUMENTS 5,331,149 A * 7/1994 Spitzer .................. A61B 3/113
250/221
5,481,622 A 1/1996 Gerhardt et al.
(Continued)

FOREIGN PATENT DOCUMENTS

CN 102611909 A 7/2012
CN 103119512 A 5/2013
(Continued)

OTHER PUBLICATIONS

Office Action issued in parent U.S. Appl. No. 14/810,652 dated Feb. 23, 2017.
(Continued)

Primary Examiner — Olga V Merkoulova
(74) Attorney, Agent, or Firm — Sughrue Mion, PLLC

(57) ABSTRACT

Provided are wearable glasses including a display and a method of operating the same. The wearable glasses include: a display configured to display an image; a sensor configured to acquire wear state information representing a state in which a user currently wears the wearable glasses, while the image is being displayed on the display; and a processor configured to determine an inclination of the wearable glasses with respect to the user based on the acquired wear state information, and to adjust, based on the determined inclination, the image that is displayed on the display.

20 Claims, 83 Drawing Sheets

(51) Int. Cl.
*G02B 27/00* (2006.01)
*G06K 9/00* (2006.01)
*G06T 19/00* (2011.01)

(52) U.S. Cl.
CPC ..... *G02B 27/0172* (2013.01); *G02B 27/0179* (2013.01); *G06K 9/0061* (2013.01); *G06T 19/006* (2013.01); *G02B 2027/014* (2013.01); *G02B 2027/0138* (2013.01); *G02B 2027/0178* (2013.01); *G02B 2027/0187* (2013.01)

(56) References Cited

U.S. PATENT DOCUMENTS

| | | | |
|---|---|---|---|
| 7,446,768 | B2 | 11/2008 | Satoh et al. |
| 8,446,340 | B2 | 5/2013 | Aharoni |
| 9,191,658 | B2 | 11/2015 | Kato et al. |
| 2006/0061652 | A1* | 3/2006 | Sato ............... H04N 13/0429 348/53 |
| 2011/0210928 | A1* | 9/2011 | Matsuda ............ G06F 3/04886 345/173 |
| 2012/0200676 | A1 | 8/2012 | Huitema et al. |
| 2013/0038510 | A1 | 2/2013 | Brin et al. |
| 2013/0169683 | A1* | 7/2013 | Perez ................... G02B 27/02 345/633 |
| 2013/0187943 | A1 | 7/2013 | Bohn et al. |
| 2013/0235169 | A1* | 9/2013 | Kato ..................... G02B 27/01 348/53 |
| 2013/0321890 | A1 | 12/2013 | Ishida et al. |
| 2014/0375680 | A1 | 12/2014 | Ackerman et al. |
| 2015/0277123 | A1 | 10/2015 | Chaum et al. |
| 2016/0034032 | A1 | 2/2016 | Jeong |

FOREIGN PATENT DOCUMENTS

| | | |
|---|---|---|
| CN | 103380625 A | 10/2013 |
| JP | 2002-14300 A | 1/2002 |
| JP | 2012-34229 A | 2/2012 |
| JP | 2012-109708 A | 6/2012 |
| JP | 2012-244453 A | 12/2012 |
| KR | 10-2011-0098253 A | 9/2011 |
| WO | 2013/088725 A1 | 6/2013 |

OTHER PUBLICATIONS

Office Action issued in parent U.S. Appl. No. 14/810,652 dated May 31, 2017.
Notice of Allowance issued in parent U.S. Appl. No. 14/810,652 dated Dec. 29, 2017.
Beymer, et al.; "Eye Gaze Tracking Using an Active Stereo Head", Proceedings of the 2003 IEEE Computer Society on Computer Vision and Pattern Recognition, Jun. 2003, vol. 2, 8 pages total.
Clarke, et al.; "Using High Frame-Rate CMOS Sensors for Three-Dimensional Eye Tracking", Behavior Research Methods, Instruments, & Computers, Nov. 2002, vol. 34, Is. 4, 22 pages total.
Communication dated Dec. 11, 2015, issued by the European Patent Office in counterpart European Patent Application No. 15179242.1.
Curatu, et al.; "Projection-Based Head-Mounted Display with Eye-Tracking Capabilities", Proceedings of the SPIE International Society for Optical Engineering, Aug. 2005, vol. 5875, 9 pages total.
Duchowski, et al.; "Binocular Eye Tracking in Virtual Reality for Inspection Training", Proceedings of the 2000 Symposium on Eye Tracking Research & Applications, Nov. 2000, 8 pages total.
Nakazawa, et al.; "Eye Reflection Analysis and Applications", ICVSS 2010 Registration and Video Analysis, Jul. 2010, 1 page total.
International Search Report dated Nov. 10, 2015, issued by the International Searching Authority in counterpart International Patent Application No. PCT/KR2015/007933 (PCT/ISA/210).
Written Opinion dated Nov. 10, 2015, issued by the International Searching Authority in counterpart International Patent Application No. PCT/KR2015/007933 (PCT/ISA/237).
Communication dated Sep. 29, 2018 issued by the State Intellectual Property Office of P.R. China in counterpart Chinese Application No. 201510463690.9.
Communication dated Mar. 28, 2019, issued by the Taiwanese Patent Office in counterpart Taiwanese Application No. 104124448.

* cited by examiner

10

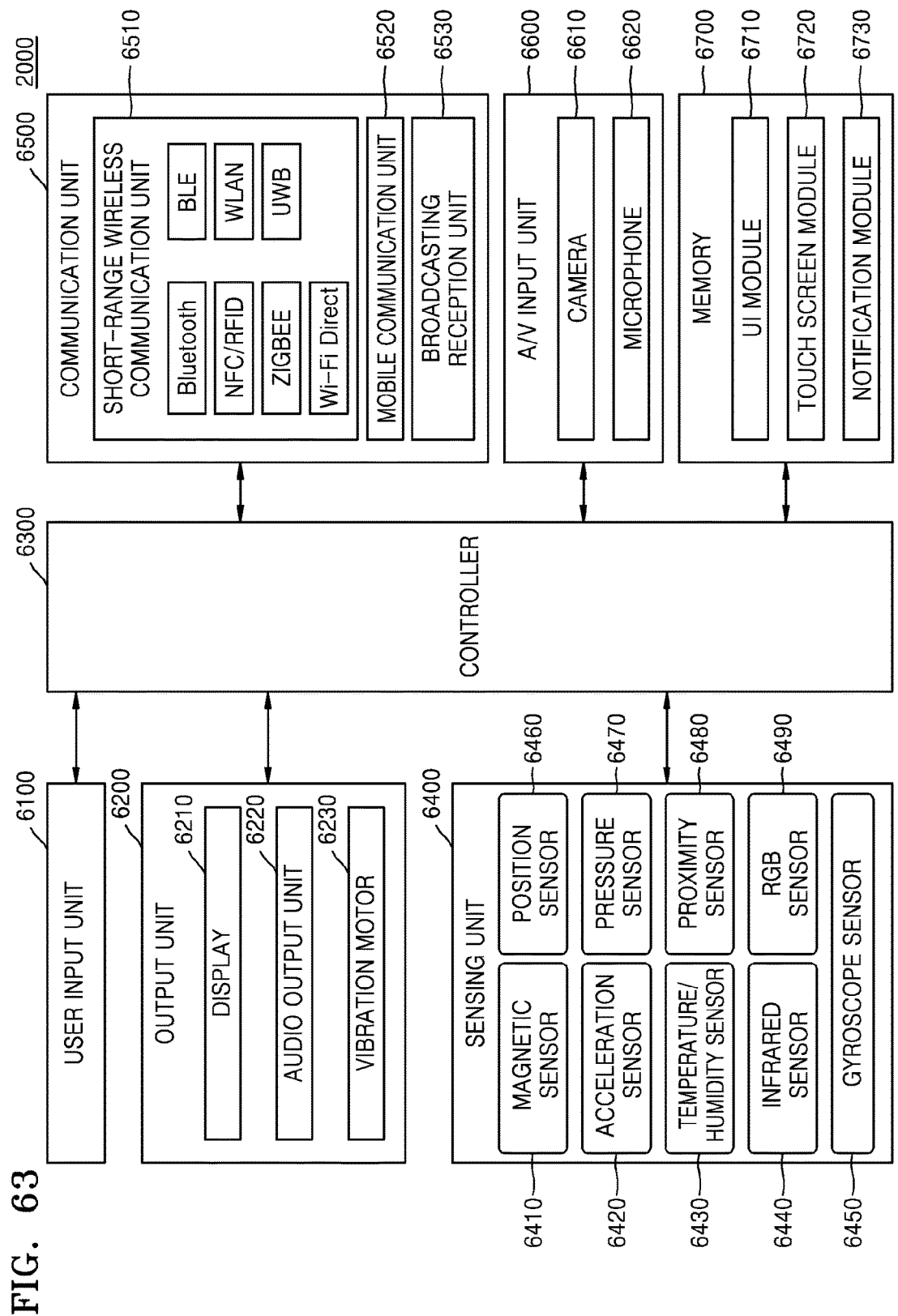

WEARABLE GLASSES AND METHOD OF DISPLAYING IMAGE VIA THE WEARABLE GLASSES

CROSS-REFERENCE TO RELATED PATENT APPLICATIONS

This is a continuation of U.S. application Ser. No. 14/810,652 filed on Jul. 28, 2015, which claims priorities from Korean Patent Application No. 10-2014-0098630, filed on Jul. 31, 2014 in the Korean Intellectual Property Office, and Korean Patent Application No. 10-2015-0020288, filed on Feb. 10, 2015 in the Korean Intellectual Property Office, the disclosures of which are incorporated herein in their entireties by reference.

BACKGROUND

1. Field

Apparatuses and methods consistent with one or more exemplary embodiments relate to image display apparatuses and methods, and more particularly, to wearable glasses and a method of displaying an image on the wearable glasses.

2. Description of the Related Art

Wearable glasses are a type of wearable device that is worn on the head, like eyeglasses. In particular, wearable glasses are a type of head mounted display (HMD) that is worn on the head of a user and displays an image in front (e.g., directly in front) of the eyes of the user.

Since wearable glasses are temporarily fixed onto the head of a user by a frame or the like, a location or position of the wearable glasses on the head of the user may change due to movement of the user. In general, wearable glasses include a near-to-eye display system that displays an image within several centimeters from the eyes of a user. Thus, an output image is greatly distorted even by a fine position change of the wearable glasses.

SUMMARY

Aspects of one or more exemplary embodiments provide a system and method of comparing a wear state of wearable glasses of a user with a reference wear state to determine an inclination of the wearable glasses with respect to the user, adjusting an output image of the wearable glasses by taking into account the inclination of the wearable glasses, and displaying the adjusted image to a display of the wearable glasses.

Additional aspects will be set forth in part in the description which follows and, in part, will be apparent from the description, or may be learned by practice of exemplary embodiments.

According to an aspect of an exemplary embodiment, there is provided wearable glasses including: a display configured to display an image; a sensor configured to acquire wear state information representing a state in which a user currently wears the wearable glasses, while the image is being displayed on the display; and a processor configured to determine an inclination of the wearable glasses with respect to the user based on the acquired wear state information, and to adjust, based on the determined inclination, the image that is displayed on the display.

The sensor may be configured to acquire the wear state information including information about a body part of the user; and the processor may be configured to determine the inclination of the wearable glasses with respect to the user by comparing the acquired wear state information with predetermined reference wear state information.

The sensor may be configured to acquire the wear state information including an image of the body part; and the processor may be configured to detect an area corresponding to the body part from the image of the body part, to acquire a property value from the detected area, and to compare the acquired property value with a reference value included in the reference wear state information in order to determine the inclination.

The acquired wear state information may include an eye image of an eye of the user who is wearing the wearable glasses; and the processor may be configured to acquire at least one value from among a length of a major axis of the eye, a length of a minor axis of the eye, an angle of the major axis of the eye, an angle of the minor axis of the eye, and a location value of an iris of the user from the eye image, to compare the acquired at least one value with at least one predetermined reference value, and to determine the inclination based on a result of the comparison.

The display may be configured to display a test image; the sensor may be configured to acquire the wear state information including an eye image of an eye of the user on which the test image is reflected; and the processor may be configured to detect an area corresponding to the eye of the user from the eye image, to obtain a reflection image of the test image within the detected area corresponding to the eye, to compare at least one of a size and a shape of the obtained reflection image with predetermined reference wear state information, and to determine the inclination based on a result of the comparison.

The sensor may be configured to obtain a state value representing a movement state of the wearable glasses and to acquire the wear state information when the obtained state value is equal to or greater than a predetermined value.

The processor may be configured to determine whether the determined inclination is equal to or greater than a predetermined value; when the processor determines that the determined inclination is less than the predetermined value, the processor may be configured to control the display to display the adjusted image obtained based on the determined inclination; and when the processor determines that the determined inclination is equal to or greater than the predetermined value, the processor may be configured to control the display to display an image informing the user to adjust the wearable glasses.

According to an aspect of another exemplary embodiment, there is provided a method of displaying an image via wearable glasses, the method including: displaying, on a display of the wearable glasses, an image; acquiring wear state information representing a state in which a user currently wears the wearable glasses; determining an inclination of the wearable glasses with respect to the user based on the acquired wear state information; and adjusting, based on the determined inclination, the image that is displayed on the display.

The acquiring the wear state information may include acquiring the wear state information including information about a body part of the user; and the determining the inclination may include determining the inclination of the wearable glasses with respect to the user by comparing the acquired wear state information with predetermined reference wear state information.

The acquiring the wear state information may include acquiring the wear state information including an image of the body part; and the determining the inclination may include: detecting an area corresponding to the body part from the image of the body part, acquiring a property value from the detected area, and comparing the acquired property value with a reference value included in the reference wear state information in order to determine the inclination.

The wear state information may include an eye image of an eye of the user who is wearing the wearable glasses; and the determining the inclination may include: acquiring at least one value from among a length of a major axis of the eye, a length of a minor axis of the eye, an angle of the major axis of the eye, an angle of the minor axis of the eye, and a location value of an iris of the user from the eye image, comparing the acquired at least one value with at least one predetermined reference value, and determining the inclination based on a result of the comparing.

The displaying the image may include displaying a test image; the acquiring the wear state information may include acquiring the wear state information including an eye image of an eye of the user on which the test image is reflected; and the determining the inclination may include: detecting an area corresponding to the eye of the user from the eye image, obtaining a reflection image of the test image within the detected area corresponding to the eye, comparing at least one of a size and a shape of the reflection image with predetermined reference wear state information, and determining the inclination based on a result of the comparing.

The acquiring the wear state information may include: obtaining a state value representing a movement state of the wearable glasses; and acquiring the wear state information when the obtained state value is equal to or greater than a predetermined value.

The adjusting the image may include: determining whether the determined inclination is equal to or greater than a predetermined value; if the determined inclination is equal to or greater than the predetermined value according to the determining, displaying an image informing the user to adjust the wearable glasses; and if the determined inclination is less than the predetermined value according to the determining, adjusting the image that is displayed on the display, based on the determined inclination.

According to an aspect of another exemplary embodiment, there is provided a non-transitory computer-readable storage medium having embodied thereon at least one program including commands for performing a method of displaying an image via wearable glasses, wherein the method includes: displaying an image that is provided by the wearable glasses; acquiring wear state information representing a state in which a user currently wears the wearable glasses; determining an inclination of the wearable glasses with respect to the user based on the acquired wear state information; and displaying an adjusted image obtained based on the determined inclination.

The acquiring the wear state information may include acquiring the wear state information including information about a body part of the user; and the determining the inclination may include determining the inclination of the wearable glasses with respect to the user by comparing the acquired wear state information with predetermined reference wear state information.

The acquiring the wear state information may include acquiring the wear state information including an image of a body part of the user; and the determining the inclination may include: detecting an area corresponding to the body part from the image of the body part, acquiring a property value from the detected area, and comparing the acquired property value with a reference value included in the reference wear state information in order to determine the inclination.

The displaying the image may include displaying a test image; the acquiring the wear state information may include acquiring the wear state information including an eye image of an eye of the user on which the test image is reflected; and the determining the inclination may include: detecting an area corresponding to the eye of the user from the eye image, obtaining a reflection image of the test image within the detected area corresponding to the eye, comparing at least one of a size and a shape of the reflection image with predetermined reference wear state information, and determining the inclination based on a result of the comparing.

The displaying the adjusted image may include: determining whether the determined inclination is equal to or greater than a predetermined value; and in response to the determined inclination being less than the predetermined value according to the determining, adjusting the image that is displayed on the display, based on the determined inclination.

According to an aspect of another exemplary embodiment, there is provided a device for displaying an image via wearable glasses, the device including: a communicator configured to receive, from the wearable glasses, wear state information representing a state in which a user currently wears the wearable glasses, the wear state information being acquired by the wearable glasses; and a controller configured to determine an inclination of the wearable glasses with respect to the user based on the received wear state information, and to control to adjust, based on the determined inclination, an image to be displayed on a display of the wearable glasses, wherein the communicator is configured to transmit the adjusted image to the wearable glasses, for display on the display of the wearable glasses.

The received wear state information may include information about a body part of the user; and the controller may be configured to determine the inclination by comparing the received wear state information with predetermined reference wear state information.

According to an aspect of another exemplary embodiment, there is provided a method in which a device displays an image via wearable glasses, the method including: receiving, from the wearable glasses, wear state information representing a state in which a user currently wears the wearable glasses, the wear state information being acquired by the wearable glasses; determining an inclination of the wearable glasses with respect to the user based on the received wear state information; and providing, to the wearable glasses, an adjusted image obtained based on the determined inclination, for display on the wearable glasses.

According to an aspect of another exemplary embodiment, there is provided a non-transitory computer readable recording medium having recorded thereon a program executable by a computer for performing the above method.

According to an aspect of another exemplary embodiment, there is provided wearable glasses including: a display configured to present an image to a user; a sensor configured to acquire information about a gesture of the user; and a processor configured to determine an adjustment value based on the acquired information and to adjust, based on the determined adjustment value, an image that is displayed on the display.

According to an aspect of another exemplary embodiment, there is provided a method of displaying an image via wearable glasses, the method including: acquiring information about a gesture of a user; determining an adjustment value, based on the acquired information; and adjusting, based on the determined adjustment value, an image that is to be displayed on a display of the wearable glasses.

According to an aspect of another exemplary embodiment, there is provided a non-transitory computer readable recording medium having recorded thereon a program executable by a computer for performing the above method.

According to an aspect of another exemplary embodiment, there is provided a device for displaying an image via wearable glasses, the device including: a communicator configured to receive information about a gesture of a user from the wearable glasses, the information about the gesture of the user being acquired by the wearable glasses; and a controller configured to determine an adjustment value based on the received information about the gesture and to control to adjust, based on the determined adjustment value, an image that is displayed via the wearable glasses, wherein the communicator is configured to provide, to the wearable glasses, an adjusted image corresponding to a result of the image adjustment, such that the adjusted image is displayed via the wearable glasses.

According to an aspect of another exemplary embodiment, there is provided a method of displaying an image via wearable glasses, the method including: obtaining wear state information representing a state in which a user currently wears the wearable glasses; determining an inclination of the wearable glasses with respect to the user based on the obtained wear state information; and controlling to adjust, based on the determined inclination, the image for display on a display of the wearable glasses.

The obtained wear state information may include information about a body part of the user; and the determining the inclination may include determining the inclination of the wearable glasses with respect to the user by comparing the obtained wear state information with predetermined reference wear state information.

The obtained wear state information may include an image of the body part; and the determining the inclination may include: detecting an area corresponding to the body part from the image of the body part, acquiring a property value from the detected area, and comparing the acquired property value with a reference value included in the reference wear state information in order to determine the inclination.

The wear state information may include an eye image of an eye of the user who is wearing the wearable glasses; and the determining the inclination may include: acquiring at least one value from among a length of a major axis of the eye, a length of a minor axis of the eye, an angle of the major axis of the eye, an angle of the minor axis of the eye, and a location value of an iris of the user from the eye image, comparing the acquired at least one value with at least one predetermined reference value, and determining the inclination based on a result of the comparing.

The controlling to adjust the image may include: determining whether the determined inclination is equal to or greater than a predetermined value; and if the determined inclination is less than the predetermined value according to the determining, controlling to adjust the image based on the determined inclination.

According to an aspect of another exemplary embodiment, there is provided a non-transitory computer readable recording medium having recorded thereon a program executable by a computer for performing the above method.

BRIEF DESCRIPTION OF THE DRAWINGS

These and/or other aspects will become apparent and more readily appreciated from the following description of exemplary embodiments, taken in conjunction with the accompanying drawings in which:

FIGS. 62 and 63 are block diagrams of devices that display an image via wearable glasses, according to one or more exemplary embodiments.

DETAILED DESCRIPTION

Figure 1:
FIG. 1 is a schematic diagram for explaining an inconvenience for a user that wears wearable glasses.

Exemplary embodiments are described in detail herein with reference to the accompanying drawings so that this disclosure may be easily performed by one of ordinary skill in the art to which exemplary embodiments pertain. Exemplary embodiments may, however, be embodied in many different forms and should not be construed as being limited to exemplary embodiments set forth herein. In the drawings, parts irrelevant to the description are omitted for simplicity of explanation, and like numbers refer to like elements throughout.

Throughout the specification, the terms "comprises" and/or "comprising" or "includes" and/or "including" when used in this specification, specify the presence of stated elements, but do not preclude the presence or addition of one or more other elements.

The term "display image" denotes an image that is provided to a user via wearable glasses. A display image may include an image previously displayed via wearable glasses, an image currently being displayed via the wearable glasses, and an image that is to be displayed later via the wearable glasses. The display image may be an image generated by the wearable glasses or an image received from an external device.

Exemplary embodiments will now be described more fully with reference to the accompanying drawings, in which like reference numerals refer to like elements throughout. Hereinafter, expressions such as "at least one of," when preceding a list of elements, modify the entire list of elements and do not modify the individual elements of the list.

A head mounted display (HMD) is mounted on the head of a user and displays an image in front of (e.g., directly in front of) the eyes of the user. For example, like the wearable glasses 10 of FIG. 1, an HMD may have a shape of eyeglasses. Various exemplary embodiments of wearable glasses, which are an eyeglasses-type HMD, will be described in detail hereinafter. However, it is understood that one or more other exemplary embodiments are not limited to wearable glasses. For example, and one or more other exemplary embodiments may be applicable to various types of HMDs that are partially or wholly fixed to the head of a user and display information within the viewing angle of the user. The wearable glasses 10 are temporarily fixed onto the head of a user by a frame or the like of the wearable glasses 10. Thus, when the user is wearing the wearable glasses 10 for a long time, the position of the wearable glasses 10 on the head of the user may be changed according to a movement of the user or an external environment change.

The wearable glasses 10 may include a near-to-eye display system that displays an image within several centimeters from the eyes of a user. Thus, an output image is greatly distorted even with a minute change in the position of the wearable glasses 10, such that a distorted image is provided to the user. In other words, when the wearable glasses 10 are inclined or twisted with respect to the user, the user is provided with a distorted image via an inclined or twisted display.

The distorted image may denote an image that, compared with a reference image, has at least one of a changed size, a changed display location, and a changed shape. For example, the reference image denotes an image that is provided to a user in a reference wear state in which the user properly wears wearable glasses 10, and may be previously determined.

Accordingly, the user may have to frequently adjust the position of wearable glasses every time the user feels discomfort due to a distorted image.

To address this problem, aspects of one or more exemplary embodiments provide a system and method of adjusting a display image based on an inclination of wearable glasses with respect to a user and displaying an adjusted display image via the wearable glasses.

Figure 2A:
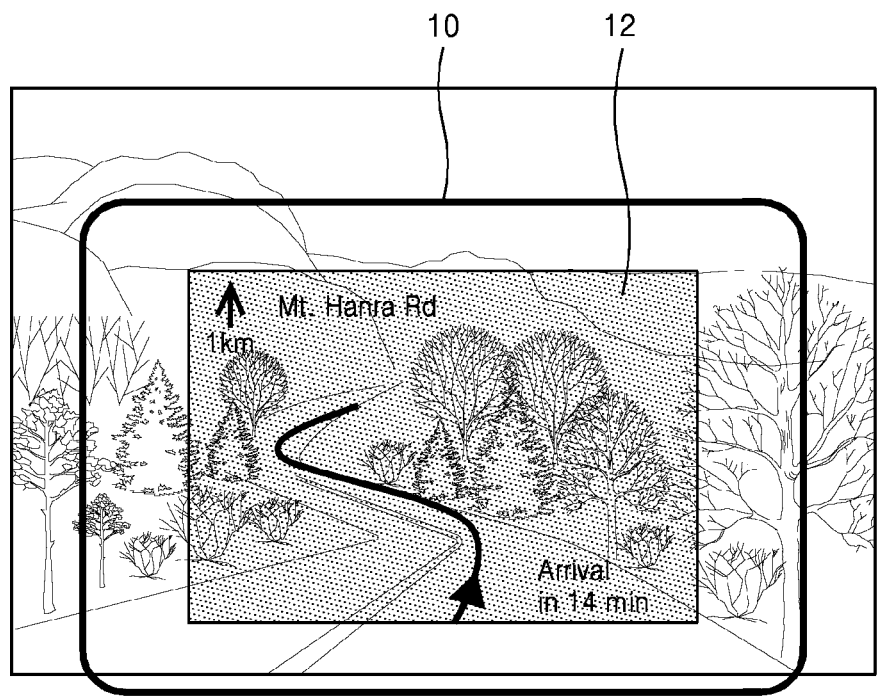
FIGS. 2A, 2B, and 2C are schematic diagrams for explaining wearable glasses that display an adjusted image when the wearable glasses are inclined with respect to a user, according to one or more exemplary embodiments.
Figure 2A:
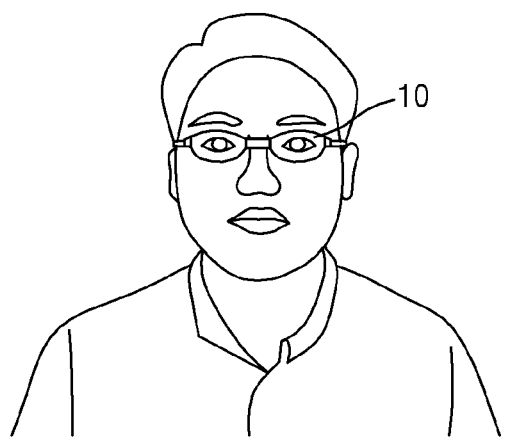
Figure 2B:
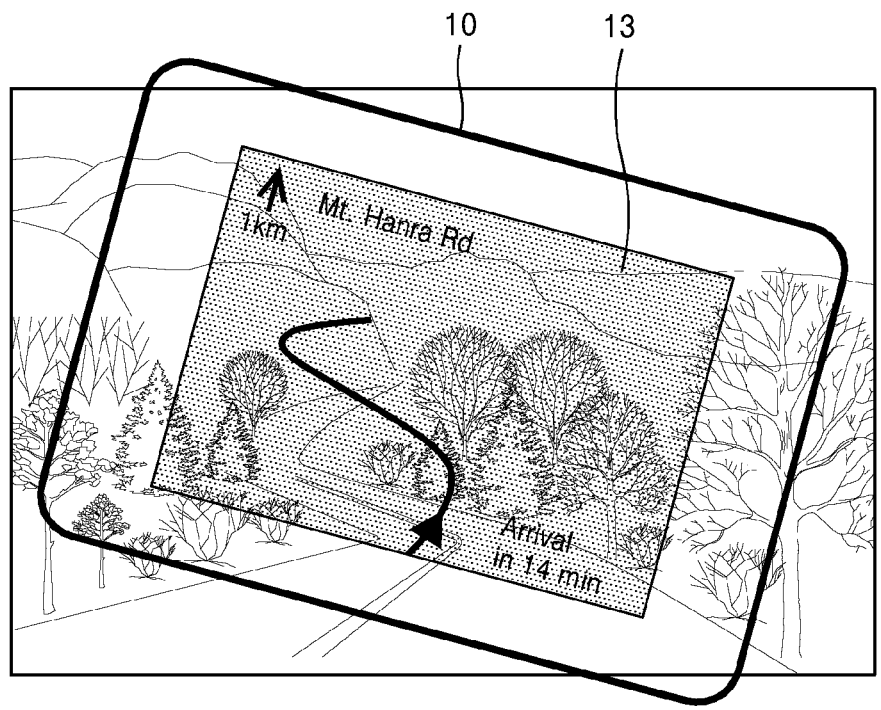
Figure 2B:
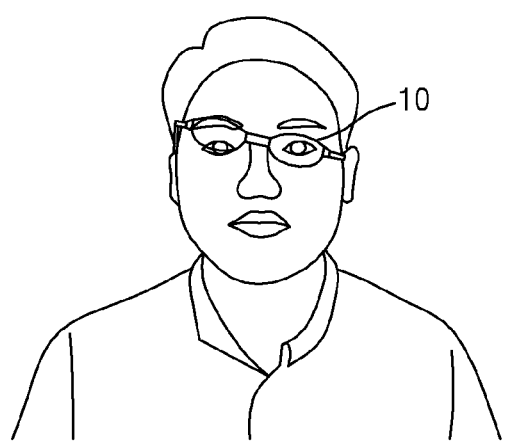
Figure 2C:
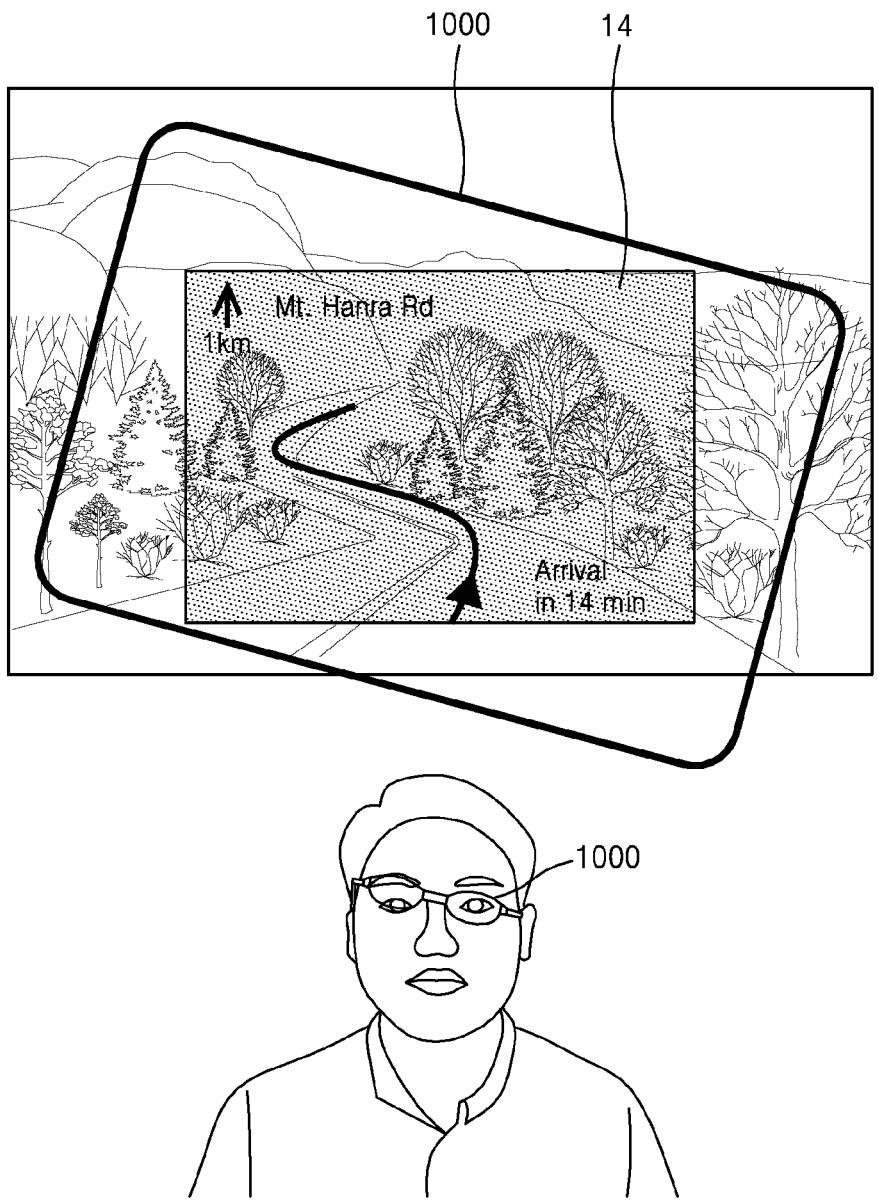

FIGS. 2A, 2B, and 2C are diagrams for explaining an exemplary embodiment in which wearable glasses 10 display an adjusted image by taking into account an inclination of the wearable glasses 10, when the wearable glasses 10 are determined to be inclined according to a comparison between a wear state in which a user wears the wearable glasses 10 and a reference wear state. The reference wear state denotes a state in which a user properly wears wearable glasses 10, and may be previously determined. The reference wear state may be set differently for different users who wear the wearable glasses 10.

The user may be provided with various pieces of information by recognizing both a display image provided via the wearable glasses 10 and a surrounding environment.

FIG. 2A illustrates a case in which the wearable glasses 10 provide a display image to a user in a reference wear state in which the user properly wears the wearable glasses 10. For example, as shown in FIG. 2A, the wearable glasses 10 may support a navigation function by providing an image 12 guiding a path to a destination.

When the user is wearing the wearable glasses 10 for a long time, the state in which the user wears the wearable glasses 10 on his or her head (e.g., a position of the wearable glasses 10 on the user's head) may be changed according to a movement of the user or an external environment change. As shown in FIG. 2B, as compared with the reference wear state of FIG. 2A, the wearable glasses 10 may be inclined with respect to the user.

When the user wears the related art wearable glasses, the user is provided with an image that has been distorted as the wearable glasses are inclined. In other words, the related art wearable glasses 10 output an image that has been output by the wearable glasses 10 in the reference wear state, even when the wearable glasses 10 are inclined. For example, as shown in FIG. 2B, when the wearable glasses 10 support a navigation function of guiding a path to a destination, the image 13 provided to the user may be visually inclined as compared with an actual surrounding environment. Therefore, according to the related art, the user needs to physically adjust the position of the wearable glasses 10 in order to receive an undistorted image.

Due to this inconvenience, there is a demand for wearable glasses 10 capable of adjusting a display image according to an inclination degree of the wearable glasses 10 with respect to a user as compared with a reference wear state.

As shown in FIG. 2C, as compared with the reference wear state of FIG. 2A, wearable glasses 1000 may be inclined with respect to the user. Referring to FIG. 2C, wearable glasses 1000 according to an exemplary embodiment may output an adjusted image 14 obtained by compensating for the inclination degree of the wearable glasses 1000 with respect to the user.

The wearable glasses 1000 may determine the inclination degree of the wearable glasses 1000 as compared with a predetermined reference wear state. For example, the reference wear state may be a state predetermined as a state in which the user properly wears the wearable glasses 1000. The wearable glasses 1000 may output an image that has been adjusted according to the inclination degree of the wearable glasses 1000 compared with the predetermined reference wear state.

The wearable glasses 1000 may provide the user with an image 14 that is not inclined with respect to the user. The wearable glasses 1000 may adjust a display image 14 according to the inclination degree of the wearable glasses 1000 with respect to the user as compared with the reference wear state, by at least one of rotating the display image 14, moving a location where the display image 14 is displayed, magnifying or shrinking the display image 14, and changing the shape of the display image. For example, as shown in FIG. 2C, when the wearable glasses 1000 support a navigation function of guiding a path to a destination, the wearable glasses 1000 according to an exemplary embodiment may output the adjusted image 14 obtained by compensating for the inclination degree of the wearable glasses 10. Thus, the adjusted image 14 provided to the user according to an exemplary embodiment may provide path-guiding information without being inclined as compared with an actual surrounding environment. That is, the adjusted image 14 may provide path-guiding information at a location matched with the actual surrounding environment.

Figure 3A:
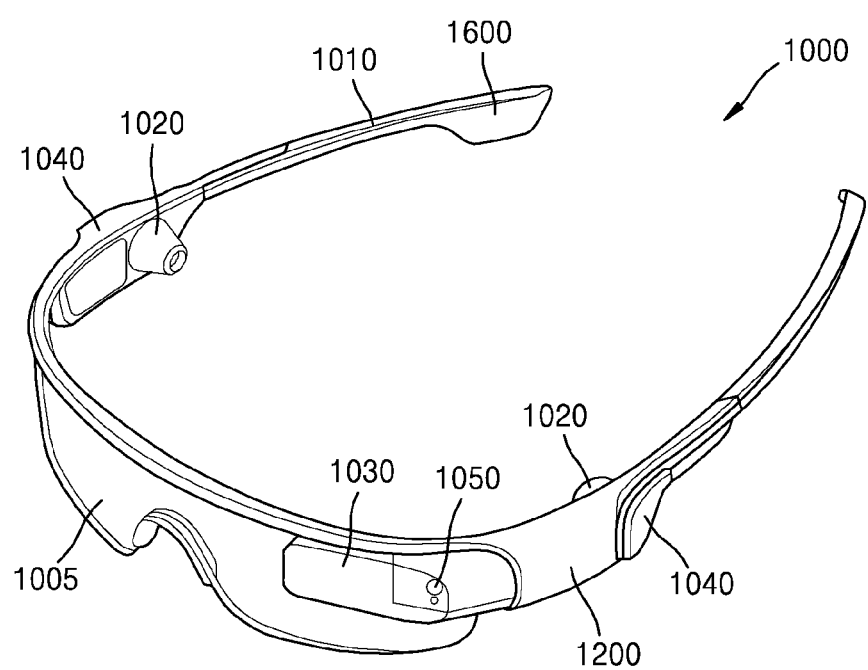
FIGS. 3A and 3B illustrate the exterior of wearable glasses according to an exemplary embodiment.
Figure 3B:
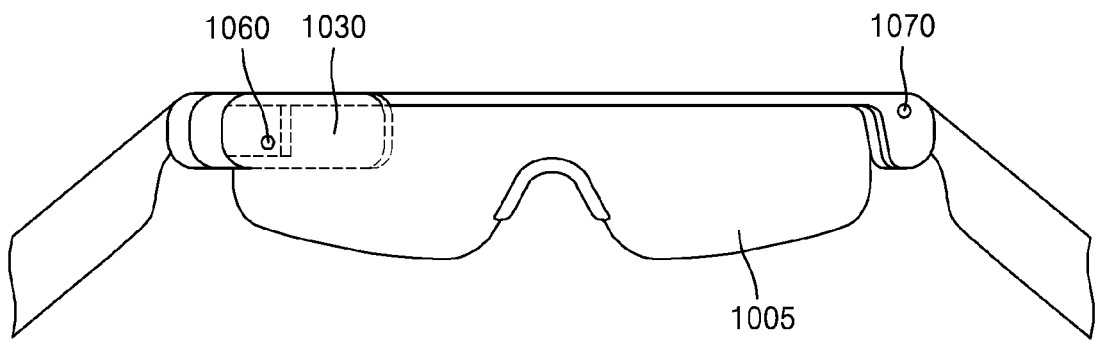

FIGS. 3A and 3B illustrate the exterior of the wearable glasses 1000 according to an exemplary embodiment.

Referring to FIGS. 3A and 3B, the wearable glasses 1000 may be a monocular display, although it is understood that one or more other exemplary embodiments are not limited thereto.

Referring to FIG. 3A, the wearable glasses 1000 may be constructed as eyeglasses that are fixed to the head of a user by using the ears and the nose of a user. However, the structure of the wearable glasses 1000 is not limited to FIGS. 3A and 3B. For example, the wearable glasses 1000 may be attached to a Helmet structure, may be constructed as goggles, may have a headband structure, may have an elastic band, may attach to another structure or another pair of glasses, etc.

The wearable glasses 1000 of FIG. 3A may include a frame 1010, a processor 1200, a camera 1050 (e.g., first camera), audio output units 1020 (e.g., audio outputters or audio output devices), a display 1030, user input units 1040 (e.g., user inputters or user input device), and a power supply unit 1600 (e.g., power supply or power supplier). It is understood that more or less components than those illustrated in FIG. 3A may be included in the wearable glasses 1000.

Some of the components of the wearable glasses 1000 may be built in the wearable glasses 1000, or the other components may be mounted on the exterior of the wearable glasses 1000. For example, the processor 1200 and the power supply unit 1600 may be built in the wearable glasses 1000. The display 1030 may be mounted on the exterior of the wearable glasses 1000. The components built in the wearable glasses 1000 and the components mounted on the exterior of the wearable glasses 1000 are not limited to those described above.

The components included in the wearable glasses 1000 are not limited to those illustrated in FIG. 3A. For example, the wearable glasses 1000 may further include a sensing unit (e.g., sensor) capable of acquiring information about the wearable glasses 1000 or surrounding environment information of the wearable glasses 1000, and a communication unit (e.g., communication device, transceiver, transmitter, communicator, etc.) for communicating with an external device. For example, the sensing unit and the communication unit may be built within the wearable glasses 1000.

The frame 1010 may be formed of (e.g., include) a material such as plastic and/or metal, and may include wiring that connects the components of the wearable glasses 1000 to one another.

The frame 1010 of FIG. 3A is integrated with the wearable glasses 1000, but the shape and structure of the frame 1010 are not limited to those of FIG. 3A.

For example, the frame 1010 of the wearable glasses 1000 may include a connection member (e.g., connector) and thus may be constructed such that at least a portion of the frame 1010 is bendable. For example, the wearable glasses 1000 may include a bendable frame 1010 and thus may be folded and stored when a user does not use the wearable glasses 1000, thereby minimizing a space occupied by the wearable glasses 1000.

The wearable glasses 1000 may further include an elastic band such that the wearable glasses 1000 may be fixed to the head of the user regardless of the size of the head of the user.

The frame 1010 according to an exemplary embodiment may be constructed such that a lens 1005 is detachable from the frame 1010. The wearable glasses 1000 may not include the lens 1005. Although the lens 1005 is integrated with a nose bridge in FIG. 3A, it is understood that one or more other exemplary embodiments are not limited thereto. For example, the nose bridge of the wearable glasses 1000 may be integrated with the frame 1010.

The lens 1005 may be formed of a transparent material that enables a user to see the actual space via the lens 1005. The lens 1005 may be formed of a material capable of transmitting light that constitutes an image that is displayed on the display 1030. Examples of a material used to form the lens 1010 may include, but are not limited to, glass and plastic, such as polycarbonate.

The processor 1200 may be connected to the wearable glasses 1000 via wires and/or wirelessly. Although the processor 1200 is located on a left lateral surface of the frame 1010 in FIG. 3A, it is understood that one or more other exemplary embodiments are not limited thereto. For example, the processor 1200 may be located on a right lateral surface of the frame 1010 or on a front surface of the wearable glasses 1000 so as to be adjacent to the camera 1050. In general, it is understood that the relative locations of components of the wearable glasses 1000 are not limited to the exemplary embodiment illustrated in FIG. 3A, and may vary in various exemplary embodiments.

The processor 1200 may receive data from the camera 1050 or the user input units 1040, analyze the received data, and generate information that is to be provided to a user of the wearable glasses 1000 via at least one of the display 1030 and the audio output units 1020. The information to be provided to the user may include, but is not limited to, at least one of an image, text, video, and audio.

The camera 1050 may be included in the display 1030, or may be separate from the display 1030 and disposed on the frame 1010. The camera 1050 may be a camera for use in smartphones, or a small camera such as webcams. For example, the camera 1050 may be mounted on a location that is predetermined to be suitable to acquire an image corresponding to a gesture of the hands of a user. For example, as shown in FIG. 3A, when a user wears the wearable glasses 1000, the camera 1050 may be mounted on a location adjacent to an eye of the user to thereby capture an image that is similar to an image recognized via the eyes of the user.

Each of the user input units 1040 may include, but is not limited to, at least one of a touch pad operable by a finger of the user, an optical input device, a rotatable dial, a joystick, and a button operable by a push manipulation of the user. Although the user input units 1040 are respectively mounted on both lateral surfaces of the frame 1010 in FIG. 3A, it is understood that the user input units 1040 may be positioned at the other locations on the wearable glasses 1000 according to one or more other exemplary embodiments.

The user input units 1040 receive a user input. The user input may include user-input data or a user-input signal that generates an event that causes the wearable glasses 1000 to start or conclude a certain operation.

For example, each of the user input units 1040 may include an on/off switch capable of turning on/off the wearable glasses 1000. Alternatively, the user input units 1040 may receive a user input for adjusting an image that is displayed via the wearable glasses 1000.

As illustrated in FIG. 3A, the display 1030 may be located on a left upper end of the lens 1005, although it is understood that one or more other exemplary embodiments are not limited thereto. For example, the display 1030 may be located on a right end of the lens 1005 or may be located on a lower end of the lens 1005. As shown in FIG. 3A, the display 1030 may be constructed as a semi-transparent optical waveguide (for example, a prism). The display 1030 of FIG. 3A may reflect light that is output from a projector built in the wearable glasses 1000, and focus an image on the foveae of the retinas of the eyes of a user who wears the wearable glasses 1000. However, the display 1030 included in the wearable glasses 1000 is not limited to FIG. 3A, and the display 1030 may display an image near to the eyes of a user by using various methods and various structures.

The wearable glasses 1000 according to an exemplary embodiment may further include a microphone. The microphone may receive, for example, a voice of the user and sounds of a surrounding environment of the wearable glasses 1000.

The audio output units 1020 may be constructed as earphones that may be mounted on the ears of the user of the wearable glasses 1000. The audio output units 1020 may be fixed onto the wearable glasses 1000 as shown in FIG. 3A, although it is understood that one or more other exemplary embodiments are not limited thereto. For example, the audio output units 1020 may be detachable from the wearable glasses 1000 such that the user of the wearable glasses 1000 may selectively mount the audio output units 1020 on his or her ears. For example, each of the audio output units 1020 may be constructed as a bone conduction speaker.

In FIG. 3A, the power supply unit 1600 is located on an end of the frame 1010 of the wearable glasses 1000. However, it is understood that one or more other exemplary embodiments are not limited thereto, and the power supply unit 1600 may be disposed on any of various other locations on the frame 1010 of the wearable glasses 1000. The power supply unit 1600 supplies power for operating the wearable glasses 1000, to each component. The power supply unit 1600 may include a battery capable of charging, and a cable or cable port capable of receiving power from an external source.

FIG. 3B illustrates the exterior of the wearable glasses 1000 as viewed by a user when the user wears the wearable glasses 1000.

Referring to FIG. 3B, the wearable glasses 1000 may include a camera 1060 (e.g., second camera) that is adjacent to the display 1030 and faces the user. The wearable glasses 1000 may adjust an image that is displayed on the display 1030, based on an image of an eye of the user captured by using the camera 1060. However, the location of the camera 1060 is not limited to the location shown in FIG. 3B, and may be any of various other locations according to the shapes of the wearable glasses 1000 in one or more other exemplary embodiments.

The wearable glasses 1000 may further include an eye tracking camera 1070 that faces the user. For example, the eye tracking camera 1070 may include an infrared camera. The eye tracking camera 1070 may detect user's eyes by tracking the iris of the user. However, the location of the eye tracking camera 1070 is not limited to the location shown in FIG. 3B, and may be any of various other locations according to the shapes of the wearable glasses 1000 in one or more other exemplary embodiments.

Figure 4A:
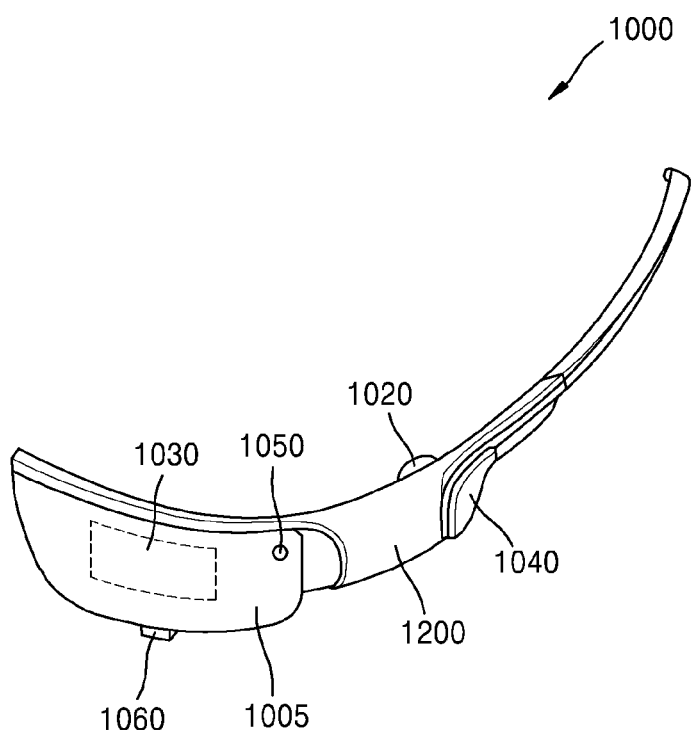
FIGS. 4A and 4B illustrate the exterior of wearable glasses according to an exemplary embodiment.
Figure 4B:
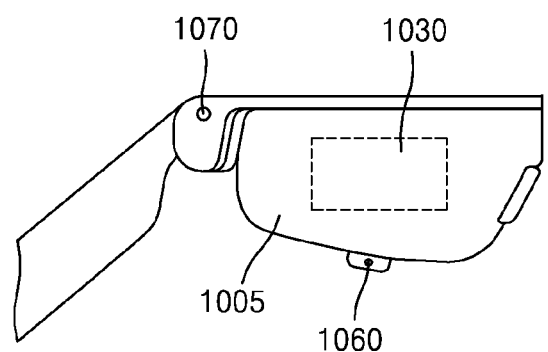

Referring to FIGS. 4A and 4B, the wearable glasses 1000 may have a monocular display shape and may be constructed to be fixed on the left or right side of the head of a user. Descriptions of the components of the wearable glasses 1000 of FIGS. 4A and 4B that are the same as given above with reference to FIGS. 3A and 3B will not be repeated herein.

Referring to FIG. 4A, the wearable glasses 1000 may be fixed to the head of a user by using one ear of the user and one side of the nose of the user. The wearable glasses 1000 may be attached to a Helmet structure, although it is understood that one or more other exemplary embodiments are not limited thereto.

The wearable glasses 1000 of FIG. 4A may include the processor 1200, the camera 1050, the audio output unit 1020, the display 1030, the user input unit 1040, and the power supply unit 1600.

As shown in FIG. 4A, the wearable glasses 1000 may be constructed such that the lens 1005 executes a function of the display 1030. In this case, the lens 1005 may be constructed as a transparent display or a semi-transparent display. When the lens 1005 is constructed as a semi-transparent display, the lens 1005 may be formed of the same material as a material used to form at least one optical waveguide (for example, a prism), an electroluminescent display, an organic light emitting diode (OLED) display, or a liquid crystal display (LCD), although it is understood that the material of the lens 1005 is not limited thereto.

FIG. 4B illustrates the exterior of the wearable glasses 1000 as viewed by a user when the user wears the wearable glasses 1000.

Referring to FIG. 4B, the wearable glasses 1000 may include the camera 1060 that faces of the user. The wearable glasses 1000 may adjust an image that is displayed on the display 1030, based on an image of an eye of the user captured by the camera 1060. However, it is understood that the location of the camera 1060 is not limited to the location shown in FIG. 4B, and may be any of various other locations according to the shapes of the wearable glasses 1000 in one or more other exemplary embodiments.

The wearable glasses 1000 may further include the eye tracking camera 1070 (e.g., eye tracker) that faces the user. The eye tracking camera 1070 may detect a user's eyes by tracking one or both irises of the user. However, the location of the eye tracking camera 1070 is not limited to the location shown in FIG. 4B, and may be any of other various locations according to the shapes of the wearable glasses 1000.

Figure 5A:
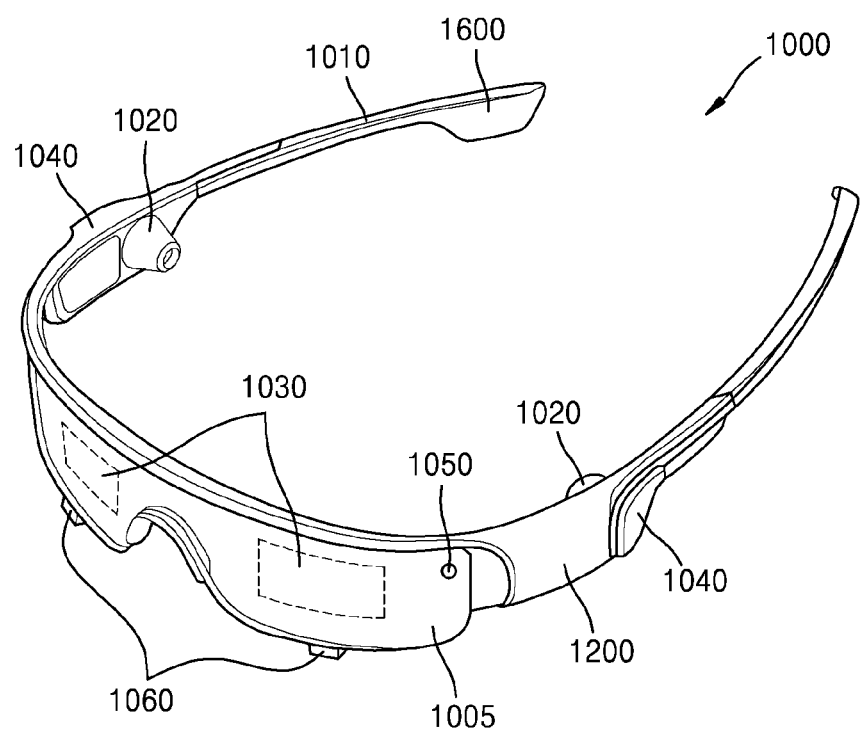
FIGS. 5A and 5B illustrate the exterior of wearable glasses according to an exemplary embodiment.
Figure 5B:
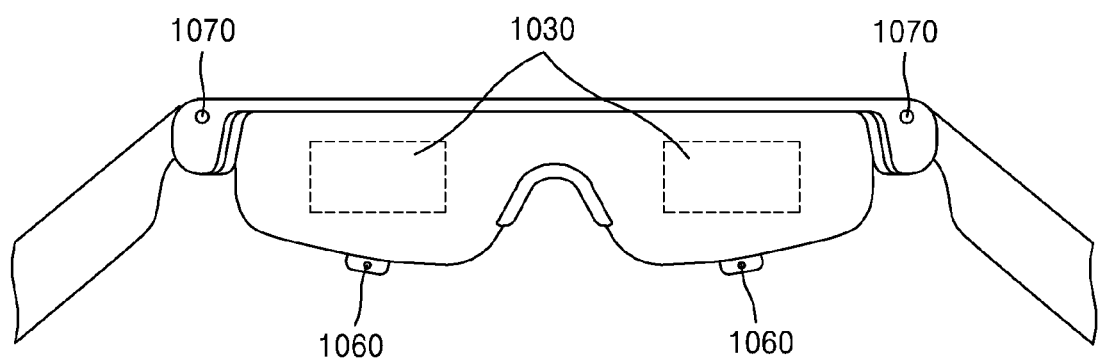

FIGS. 5A and 5B illustrate the exterior of wearable glasses 1000 according to an exemplary embodiment.

Referring to FIGS. 5A and 5B, the wearable glasses 1000 may be a binocular display. Redundant descriptions of the components of the wearable glasses 1000 of FIGS. 5A and 5B that are the same as or similar to those given above with reference to FIGS. 3A, 3B, 4A, and 4B will not be repeated herein.

The wearable glasses 1000 of FIG. 5A may include the frame 1010, the processor 1200, the camera 1050, the audio output units 1020, the display 1030, the user input units 1040, and the power supply unit 1600.

As shown in FIG. 5A, the wearable glasses 1000 may be constructed such that the lens 1005 executes a function of the display 1030. In this case, the lens 1005 may be constructed as a transparent display or a semi-transparent display. When the lens 1005 is constructed as a semi-transparent display, the lens 1005 may be formed of the same material as a material used to form at least one optical waveguide (for example, a prism), an electroluminescent display, an OLED display, or an LCD, although it is understood that the material of the lens 1005 is not limited thereto.

FIG. 5B illustrates the exterior of the wearable glasses 1000 as viewed by a user when the user wears the wearable glasses 1000.

Referring to FIG. 5B, the wearable glasses 1000 may include cameras 1060 that face the face of the user. The wearable glasses 1000 may adjust an image that is displayed on the display 1030, based on images of one or more eyes of the user captured by the cameras 1060. However, it is understood that the locations and number of the cameras 1060 are not limited to the locations and number shown in FIG. 5B, and may be any of various other locations or numbers according to the shapes of the wearable glasses 1000. For example, according to another exemplary embodiment, only one camera 1060 may be provided to capture an image of the eye or eyes of the user.

The wearable glasses 1000 may further include the eye tracking cameras 1070 that face the face of the user. The eye tracking cameras 1070 may detect user's eyes by tracking the irises of the user. However, it is understood that the locations and number of the eye tracking cameras 1070 are not limited to the locations and number shown in FIG. 5B, and may be any of various other locations and number according to the shapes of the wearable glasses 1000. Furthermore, according to an exemplary embodiment, the eye tracking cameras 1070 may be omitted, and the cameras 1060 may detect user's eyes, instead of the eye tracking cameras 1070.

As described above with reference to FIGS. 3A, 3B, 4A, 4B, 5A, and 5B, the shapes and components of the wearable glasses 1000 may be variously modified by one of ordinary skill in the art. It is understood that one or more other exemplary embodiments are not limited to FIGS. 3A, 3B, 4A, 4B, 5A, and 5B, and any of the components of FIGS. 3A, 3B, 4A, 4B, 5A, and 5B may be omitted. That is, more or less components than those illustrated in FIGS. 3A, 3B, 4A, 4B, 5A, and 5B may be included in the wearable glasses 1000.

Figure 6:
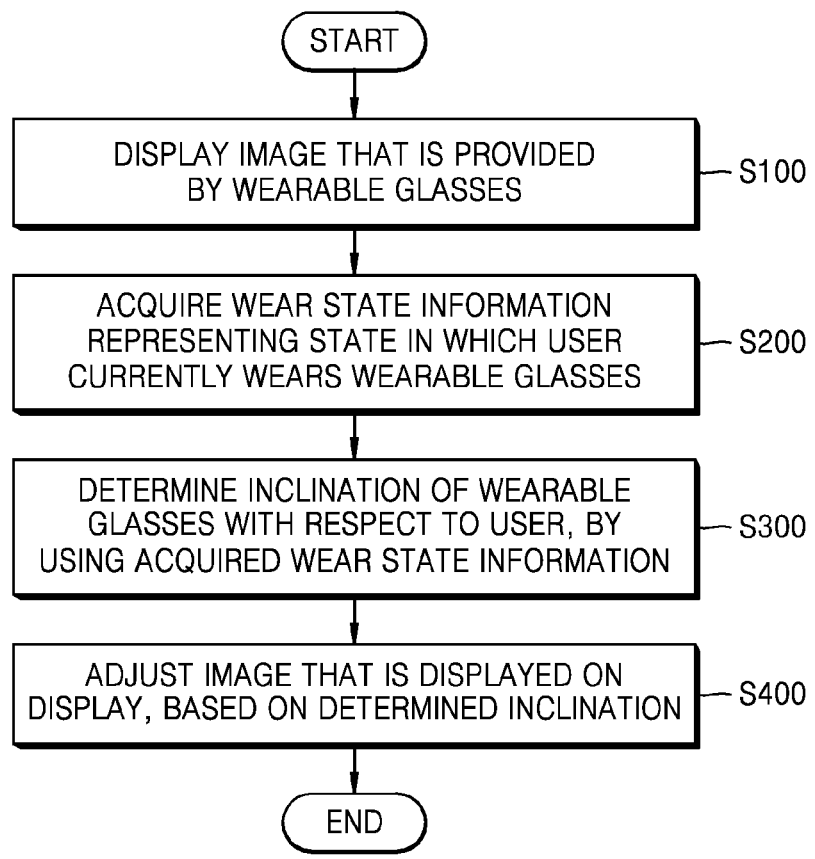
FIG. 6 is a flowchart of a method in which wearable glasses display an image, according to an exemplary embodiment.

FIG. 6 is a flowchart of a method in which wearable glasses 1000 display an image, according to an exemplary embodiment.

Referring to FIG. 6, in operation S100, the wearable glasses 1000 may generate and display an image.

The wearable glasses 1000 may process and provide an image and display the provided image via the display 1030. The image provided by the wearable glasses 1000 may be an image or moving picture that includes text, a chart, a figure, or a color for providing information to a user. However, it is understood that one or more other exemplary embodiments are not limited thereto. For example, according to another exemplary embodiment, the image provided by the wearable glasses 1000 may be an image including a user interface (UI) or a graphical user interface (GUI) for an interaction between the user and the wearable glasses 1000.

For example, the wearable glasses 1000 may also display a test image for acquiring wear state information representing a state in which a user currently wears the wearable glasses 1000. The wearable glasses 1000 may output the test image and acquire the wear state information from an image of the eyes of the user on which the test image is reflected. In operation S200, the wearable glasses 1000 may acquire the wear state information representing a state in which the user currently wears the wearable glasses 1000.

The wearable glasses 1000 may determine a state in which the user currently wears the wearable glasses 1000, based on information about a body part of the user who wears the wearable glasses 1000. The wearable glasses 1000 may acquire wear state information including information about a body part of the user. The information about the body part acquired by the wearable glasses 1000 may include information about a body part on which the wearable glasses 1000 are worn. For example, the information about the body part may include information used to determine a relative location and angle of the wearable glasses 1000 with respect to at least one body part included in the head on which the wearable glasses 1000 are worn. For example, the information about the body part may include information about at least one of the eyes, nose, ears, and mouth included in the head of the user on which the wearable glasses 1000 are worn.

The wearable glasses 1000 may acquire wear state information including information about a body part of the user that contacts the wearable glasses 1000. For example, when the wearable glasses 1000 include a nose bridge and temples, the wearable glasses 1000 may acquire information about at least one of the location and the angle of the nose bridge with respect to the nose of the user or at least one of the location and the angle of the temples with respect to the ears of the user. The wearable glasses 1000 may determine whether the at least one of the location and the angle of the nose bridge with respect to the nose of the user or the at least one of the location and the angle of the temples with respect to the ears of the user has changed as compared with the reference wear state. Based on a result of the determination, the wearable glasses 1000 may acquire the information about the state in which the user currently wears the wearable glasses 1000, based on a location of the wearable glasses 1000 in the reference wear state.

The wearable glasses 1000 may also acquire wear state information including information about a body part of the user that does not contact the wearable glasses 1000. For example, the wearable glasses 1000 may capture an image of the eyes of the user and compare the captured eye image with an eye image captured in the reference wear state. By comparing the captured eye image with an eye image captured in the reference wear state, the wearable glasses 1000 may acquire the information about the state in which the user currently wears the wearable glasses 1000, based on the location of the wearable glasses 1000 in the reference wear state.

The wearable glasses 1000 may acquire wear state information including information about whether the location and the angle of at least a portion of the wearable glasses 1000 has changed as compared with the reference wear state in which the user properly wears the wearable glasses 1000.

The wearable glasses 1000 may acquire the wear state information, which represents the state in which the user currently wears the wearable glasses 1000, by using the sensing unit included in the wearable glasses 1000, or acquire the wear state information from an external device. For example, the wearable glasses 1000 may acquire the wear state information by using at least one of a magnetic sensor, an acceleration sensor, a gyroscope sensor, a proximity sensor, an optical sensor, a depth sensor, an infrared sensor, and an ultrasonic sensor, which is included in the wearable glasses 1000.

When the wearable glasses 1000 are initialized or the wearable glasses 1000 are turned on, the wearable glasses 1000 may acquire the wear state information representing the state in which the user currently wears the wearable glasses 1000.

Alternatively, when a user input for acquiring the wear state information representing the state in which the user currently wears the wearable glasses 1000 is received, the wearable glasses 1000 may acquire the wear state information.

Alternatively, when the wearable glasses 1000 greatly move, the wearable glasses 1000 may determine that the location of the wearable glasses 1000 with respect to the user is highly likely to be changed. Thus, when at least one of measurement values representing a movement of the wearable glasses 1000, for example, an acceleration value, a velocity value, and an angular momentum, is equal to or greater than a critical value, the wearable glasses 1000 may acquire the wear state information representing the state in which the user currently wears the wearable glasses 1000.

The wear state information, representing the state in which the user currently wears the wearable glasses 1000, may be used to determine an inclination degree of the wearable glasses 1000 with respect to the user, by being compared with the reference wear state in which the user properly wears the wearable glasses 1000.

The wearable glasses 1000 may acquire the wear state information including the information about a body part of the user who wears the wearable glasses 1000, in order to determine the inclination degree of the wearable glasses 1000 with respect to the user. For example, the information about the body part acquired by the wearable glasses 1000 may include information about at least one of the eyes, nose, ears, mouth, and hand of the user. The information about the body part acquired by the wearable glasses 1000 may also include an image of the body part.

As another example, the information about the body part of the user may include information about a gesture of the user. The term "gesture" may denote a shape of a body part of a user at a certain time point, a variation in the shape of the body part of the user for a certain period of time, a variation in the location of the body part, or an action of the body part. For example, information about a gesture of a user may be an image of a body part of the user at a certain time point, or information about a touch input that is input via the user input unit 1040.

For example, when the user wears the wearable glasses 1000 by using a nose bridge, like how the user wears eyeglasses, the wearable glasses 1000 may acquire, as information about the nose of the user, an inclination degree of the wearable glasses 1000 worn on the nose of the user.

As another example, when the user wears the wearable glasses 1000 by fixing the frame of the wearable glasses 1000 onto the ears of the user, like how the user wears eyeglasses, the wearable glasses 1000 may acquire, as information about the ears of the user, information about relative locations between the ears of the user.

As another example, the wearable glasses 1000 may acquire an image of at least one of the eyes of the user as information about the eyes of the user. The wearable glasses 1000 may acquire an eye image by photographing the eyes of the user using the camera 1060 included in the wearable glasses 1000. For example, the wearable glasses 1000 may acquire wear state information including an image captured by photographing eyes of the user on which a test image is reflected.

A method of acquiring an image of the eyes of a user as information about a body part of the user will be described in more detail below with reference to FIGS. 8, 9, 10A and 10B, and 11A through 11C.

In operation S300, the wearable glasses 1000 may determine an inclination of the wearable glasses 1000 with respect to the user, by using the wear state information acquired in operation S200.

The inclination of the wearable glasses 1000 with respect to the user denotes a degree to which the wearable glasses 1000 that are currently worn by the user are inclined based on a predetermined reference wear state in which the user properly wears the wearable glasses 1000. In other words, the inclination of the wearable glasses 1000 may denote variations in the location and the angle of the current wearable glasses 1000 from a location and an angle of the wearable glasses 1000 with respect to the user in the reference wear state. The wearable glasses 1000 may determine the inclination of the wearable glasses 1000 with respect to the user, by comparing the wear state information acquired in operation S200 with predetermined reference wear state information.

For example, the predetermined reference wear state information represents a state in which the user wears the wearable glasses 1000 at a location that is the most appropriate to receive an image, and thus the reference wear state information may be pre-stored as a default value or may be set by the user. A method in which a user sets a reference wear state will be described in detail below with reference to FIG. 33.

For example, information about a state in which the user currently wears the wearable glasses 1000 may include an image of a body part of the user. The wearable glasses 1000 may detect an area corresponding to the body part from the image of the body part and acquire a property value of the body part from the detected area. The wearable glasses 1000 may acquire a property value associated with the location, shape, or size of the area corresponding to the body part detected from the image of the body part. The wearable glasses 1000 may determine the inclination thereof by comparing the acquired property value with a reference value included in the reference wear state information. The reference value included in the reference wear state information may be a property value detected from an image of a body part acquired in the reference wear state. The reference value may be a pre-stored value or a value set by the user.

The wearable glasses 1000 may map a plurality of reference wear states and/or a plurality of reference values with a plurality of body parts and store a result of the mapping. Alternatively, the wearable glasses 1000 may map a plurality of reference wear states and/or a plurality of reference values with a plurality of users and store a result of the mapping, and thus may use different criteria according to different users in order to compensate for an inclination of the wearable glasses 1000.

A method of determining the inclination of the wearable glasses 1000 from the image of the body part will be described in detail below with reference to FIGS. 12 through 17.

Figure 7:
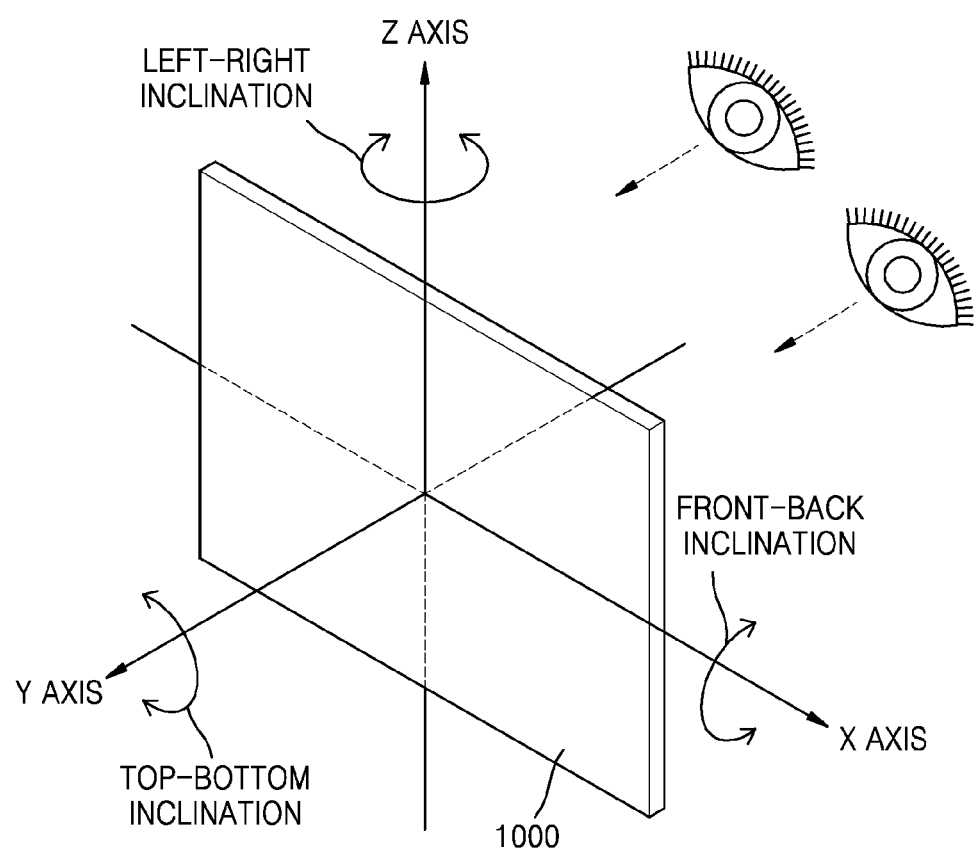
FIG. 7 is a diagram for explaining inclinations of wearable glasses with respect to a user that are determined based on a reference wear state, according to an exemplary embodiment.

FIG. 7 is a diagram for explaining inclinations of the wearable glasses 1000 with respect to a user that are determined based on the reference wear state, according to an exemplary embodiment. An inclination of the wearable glasses 1000 with respect to a user may denote the degree to which the wearable glasses 1000 worn by the user are inclined as compared with a predetermined reference wear state.

FIG. 7 illustrates a case in which the wearable glasses 1000 are in a reference wear state with respect to a user. The reference wear state denotes a state in which the wearable glasses 1000 are positioned most appropriate for the user to receive an image from the wearable glasses 1000. The reference wear state may be pre-stored as a default value or may be set by the user.

For example, the wearable glasses 1000 may acquire, as an inclination value, an angle at which the wearable glasses 1000 are rotated along a virtual axis defined on the space. For example, the inclination of the wearable glasses 1000 with respect to the user may include at least one of (or all of) a front-back inclination, a top-bottom inclination, and a left-right inclination that are determined based on three axes defined on the space in the reference wear state of the wearable glasses 1000. The inclination of the wearable glasses 1000 with respect to the user may denote a relative inclination representing the degree to which the wearable glasses 1000 are inclined with respect to a particular body part of the user as compared with the reference wear state.

As shown in FIG. 7, an x-axis, a y-axis, and a z-axis may be defined from the wearable glasses 1000, based on when a state in which the user currently wears the wearable glasses 1000 is the reference wear state. The x-axis of the wearable glasses 1000 in the reference wear state may be parallel to the axis where the coronal plane and the transverse plane of the body of the user intersect with each other. The y-axis of the wearable glasses 1000 in the reference wear state may be parallel to the axis where the sagittal plane and the transverse plane of the body of the user intersect with each other. The z-axis of the wearable glasses 1000 in the reference wear state may be parallel to the axis where the sagittal plane and the coronal plane of the body of the user intersect with each other. It is understood that the reference wear state is not limited to that described above. For example, according to another exemplary embodiment, the reference wear state may be changed or may vary by a setting of the user.

In the present specification, the front-back inclination of the wearable glasses 1000 denotes an angle at which the wearable glasses 1000 are rotated about the x-axis from a location of the wearable glasses 1000 with respect to the user in the reference wear state (hereinafter, referred to as a reference location). For example, the x-axis may be an axis that is parallel to a straight line that connects both eyes of the user to each other in the reference wear state.

The top-bottom inclination of the wearable glasses 1000 denotes an angle at which the wearable glasses 1000 are rotated about the y-axis from the reference location. For example, the y-axis may be an axis that is parallel to an eye direction in which the user looks straight ahead in the reference wear state.

The left-right inclination of the wearable glasses 1000 denotes an angle at which the wearable glasses 1000 are rotated from the reference location about the z-axis. The z-axis may be an axis that is perpendicular to the x-axis and the y-axis.

For convenience of explanation, a case in which the rotation angles of the wearable glasses 1000 about the x-axis, the y-axis, and the z-axis of FIG. 7 are determined as inclinations of the wearable glasses 1000 is illustrated in the present specification. However, it is understood that one or more other exemplary embodiments are not limited to the case of FIG. 7, and various methods and various criteria may be used to determine an inclination degree of the wearable glasses 1000 with respect to a user.

A method of determining the inclination of the wearable glasses 1000 with respect to the user by using the wear state information of the user will be described in detail below with reference to FIGS. 12 through 17.

The wearable glasses 1000 may determine the inclination of the wearable glasses 1000, based on information about a gesture of the user. The wearable glasses 1000 may map information about several gestures with inclinations and store a result of the mapping, or store relations capable of calculating the inclination of the wearable glasses 1000 based on the information about the gestures. The wearable glasses 1000 may determine the inclination by searching for a pre-stored inclination based the acquired information about the gesture of the user, or by calculating the inclination by using a found relation.

Referring back to FIG. 6, in operation S400, the wearable glasses 1000 adjust an image that is displayed on the display 1030, based on the determined inclination. The wearable glasses 1000 adjust the image that is displayed on the display 1030, based on the inclination determined based on the reference wear state.

The wearable glasses 1000 may provide the user with a nondistorted image even when the wearable glasses 10 are inclined, by adjusting the image that is displayed on the display 1030 based on the inclination of the wearable glasses 1000 with respect to the user.

For example, the wearable glasses 1000 may adjust at least one of a rotation angle, a size, and a shape of a display image, based on the inclination of the wearable glasses 1000 determined in operation S300.

For example, when the display 1030 of the wearable glasses 1000 is constructed as a semi-transparent optical waveguide (for example, a prism), the wearable glasses 1000 may adjust the location of a focal point on which light output from the projector of the display 1030 is focused, based on the inclination of the wearable glasses 1000.

The wearable glasses 1000 may perform image adjustment for compensating for the inclination of the wearable glasses 1000 (for example, horizontal translation, vertical translation, keystoning, and/or various types of image processing in which an image is corrected so that a user may not be provided with a distorted image).

For example, when the wearable glasses 1000 are inclined vertically with respect to the user, e.g., when the top-bottom inclination is determined as a value that is not 0, the wearable glasses 1000 may compensate for the top-bottom inclination from the display image. In other words, the wearable glasses 1000 may rotate the display image by the determined top-bottom inclination in a direction opposite to the direction in which the wearable glasses 1000 are inclined.

Accordingly, a user who uses the wearable glasses 1000 may be provided with an inclination-compensated image without correcting the location of the wearable glasses 1000, even when the state in which the user currently wears the wearable glasses 1000 deviates from the reference wear state.

A method of displaying an image adjusted based on the inclination of the wearable glasses 1000 will be described in detail below with reference to FIGS. 19, 20, 21A and 21B, 22A through 22C, and 23-26.

Figure 8:
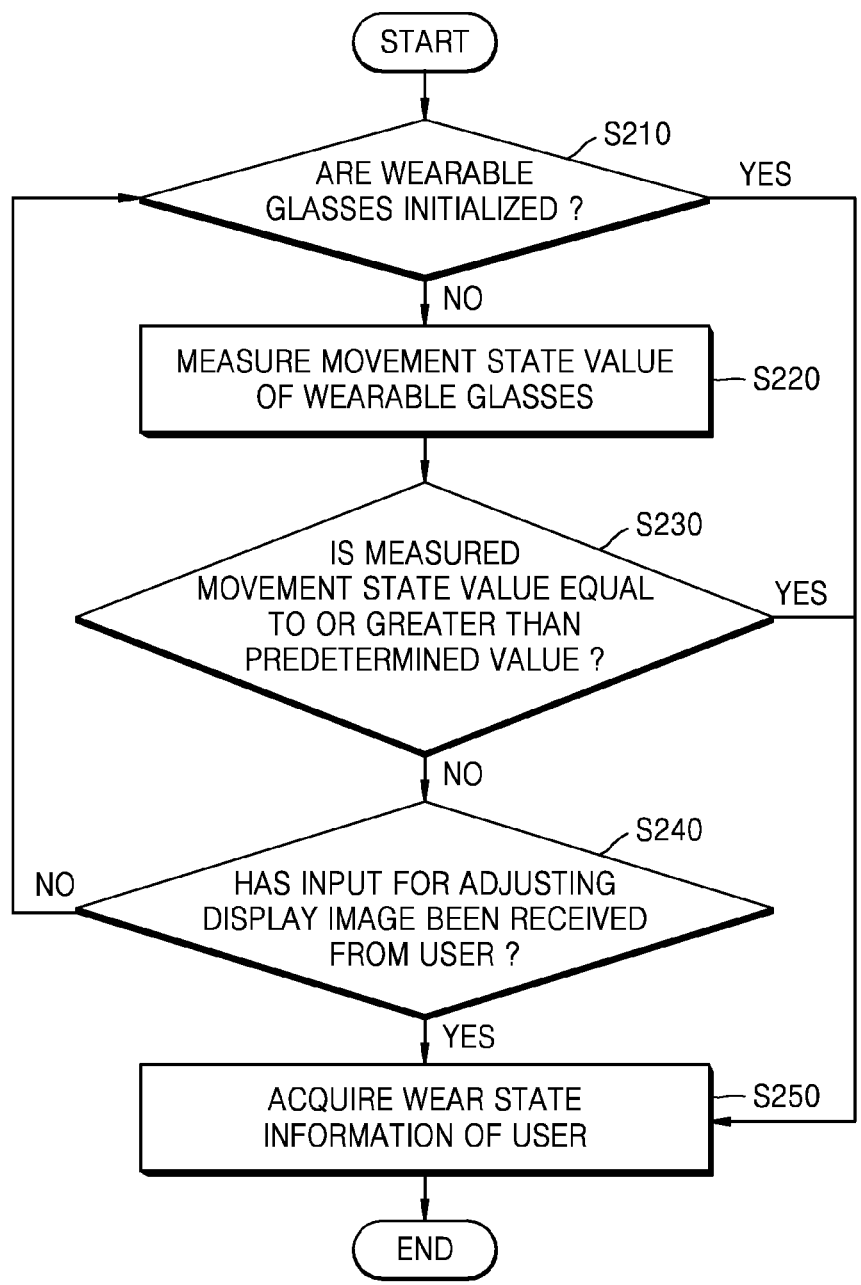
FIG. 8 is a flowchart of a method in which wearable glasses acquire information about a body part of a user, according to an exemplary embodiment.

FIG. 8 is a flowchart of a method in which the wearable glasses 1000 acquire information about a body part of a user, according to an exemplary embodiment.

When wear state information representing a state in which the user currently wears the wearable glasses 1000 is used to determine a degree to which the wearable glasses 1000 are inclined compared with the reference wear state, the wearable glasses 1000 may acquire the wear state information of the user at regular time intervals. For example, the wearable glasses 1000 may photograph the eyes of the user at regular time intervals in order to acquire the wear state information of the user.

However, repeatedly acquiring the wear state information of the user may cause overload of a memory capacity and overload of the number of calculations of a processor. Therefore, according to an exemplary embodiment, as shown in FIG. 8, the wearable glasses 1000 may acquire the wear state information of the user only when a certain event has occurred.

Referring to FIG. 8, in operation S210, the wearable glasses 1000 may determine whether the wearable glasses 1000 are initialized. For example, when the power of the wearable glasses 1000 is turned on or an initialization input for initializing the wearable glasses 1000 is received from the user, the wearable glasses 1000 may be initialized.

When the wearable glasses 1000 are initialized, the wearable glasses 1000 may acquire the wear state information of the user, in operation S250. After the wearable glasses 1000 are initialized, the wearable glasses 1000 may acquire the wear state information of the user, based on a movement state value of the wearable glasses 1000, by performing operation S220.

In operation S220, the wearable glasses 1000 may measure the movement state value of the wearable glasses 1000. The movement state value denotes a value representing a movement of the wearable glasses 1000.

For example, the wearable glasses 1000 may measure at least one of an acceleration value, a velocity value, and an angular momentum value of the wearable glasses 1000, as the movement state value. In operation S230, the wearable glasses 1000 may determine whether the measured movement state value is equal to or greater than a predetermined value. When the measured movement state value is equal to or greater than the predetermined value, the wearable glasses 1000 may acquire the wear state information, in operation S250. On the other hand, when the measured movement state value of the wearable glasses 1000 is less than the predetermined value, the wearable glasses 1000 may photograph or capture an image or state of the eyes of the user based on a user input by performing operation S240.

In operation S240, the wearable glasses 1000 determine whether an input for adjusting a display image has been received from the user. When a distorted image is provided to the user due to a change in the location of the wearable glasses 1000, the user may input to the wearable glasses 1000 a command for adjusting the display image based on the degree to which the wearable glasses 1000 are inclined based on the reference wear state.

The wearable glasses 1000 may perform operation S240 of determining whether the user input for adjusting a display image has been received. When the user input for adjusting a display image has been received, the wearable glasses 1000 may acquire the wear state information, in operation S250. On the other hand, when the user input for adjusting a display image has not been received, the wearable glasses 1000 may repeat operations S210 to S240.

Figure 9:
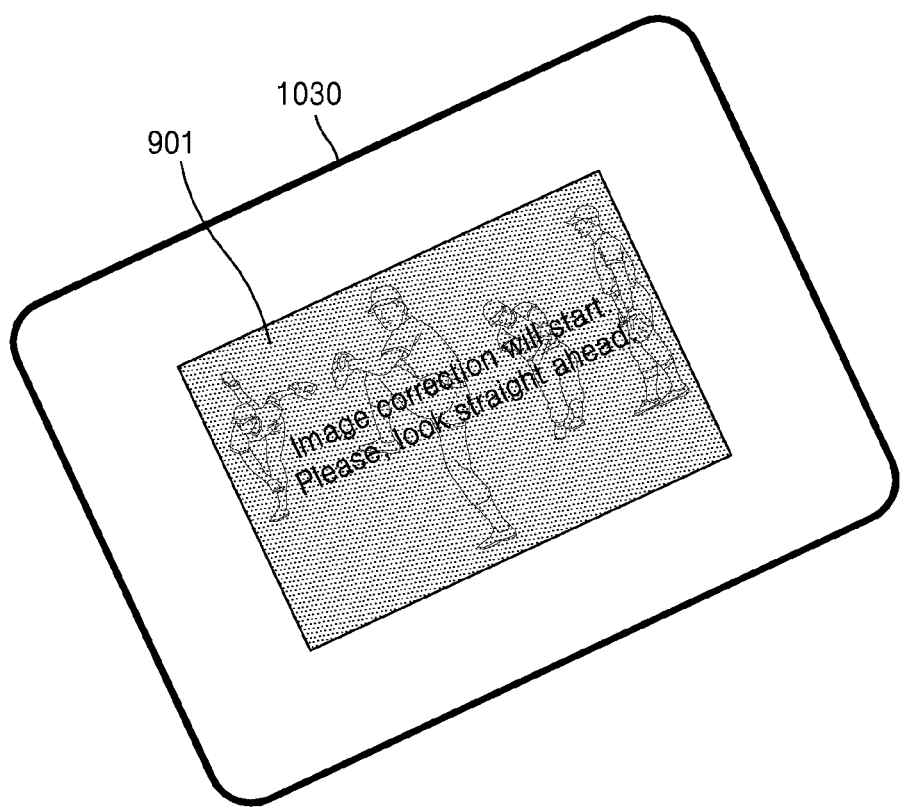
FIG. 9 illustrates a screen on which a guide image for photographing an eye of a user is displayed, according to an exemplary embodiment.

In operation S250, the wearable glasses 1000 may acquire the wear state information of the user. The wearable glasses 1000 may output a guide image to guide the user to look straight ahead, thereby increasing the accuracy of measurement of the inclination of the wearable glasses 1000. For example, as illustrated in FIG. 9, the wearable glasses 1000 may display, on the display 1030, an image 901 informing a user that the eyes of the user will be photographed for adjustment or that an image correction process is about to start. The wearable glasses 1000 may photograph the eyes of the user after outputting the guide image. However, it is understood that one or more other exemplary embodiments are not limited thereto, and the eyes of the user may be photographed without outputting the guide image.

The wearable glasses 1000 may photograph a body part of the user in order to acquire information about a state in which the user currently wears the wearable glasses 1000. For example, the wearable glasses 1000 may acquire wear state information including an image of an eye of a user who is wearing the wearable glasses 1000. FIGS. 10A, 10B, 11A, 11B, and 11C are examples of images of the eyes of a user captured via the wearable glasses 1000, according to one or more exemplary embodiments.

Figure 10A:
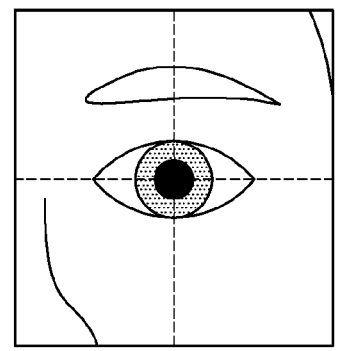
FIGS. 10A and 10B illustrate an example of an eye image of a user that is acquired via wearable glasses when the wearable glasses are not inclined with respect to the user, according to one or more exemplary embodiments.

As shown in FIG. 10A, the wearable glasses 1000 may photograph one eye of the user. Alternatively, as shown in FIG. 10B, the wearable glasses 1000 may photograph both eyes of the user.

Figure 10B:
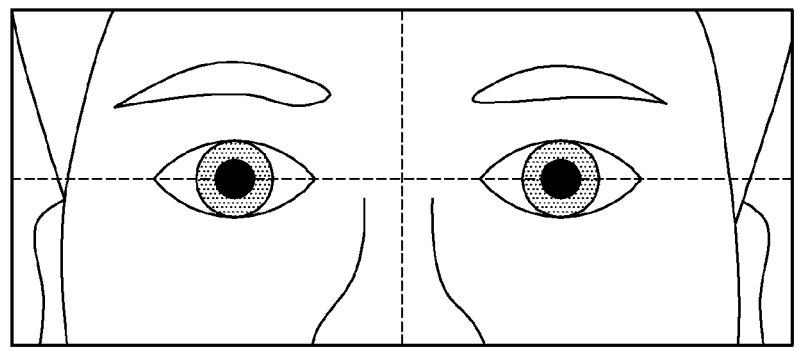

FIGS. 10A and 10B illustrate images of the eyes of a user that are captured via the wearable glasses 1000 when the wearable glasses 1000 are not inclined with respect to the user based on the reference wear state, according to one or more exemplary embodiments.

Figure 11A:
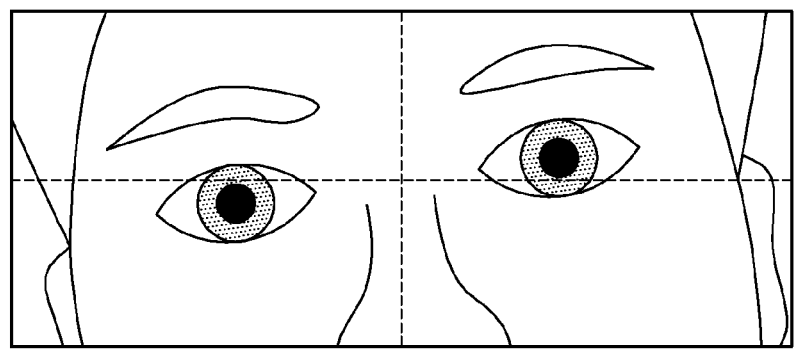
FIGS. 11A, 11B, and 11C illustrate an example of an eye image of a user that is acquired via wearable glasses when the wearable glasses are inclined with respect to the user, according to one or more exemplary embodiments.
Figure 11B:
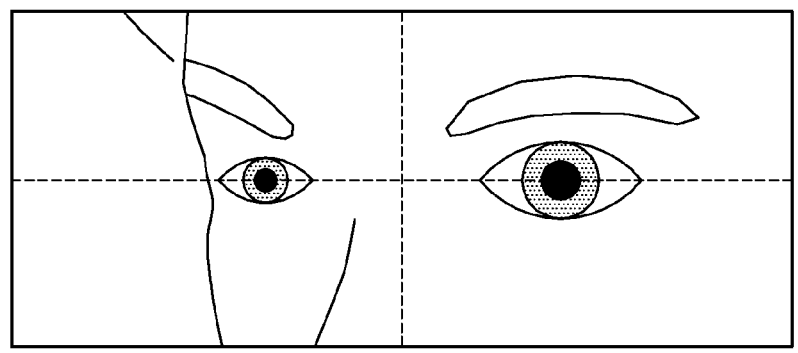
Figure 11C:
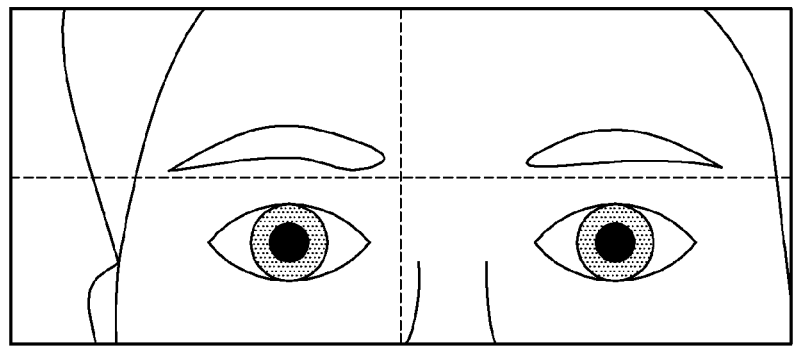

FIGS. 11A, 11B, and 11C illustrate images of the eyes of a user that are captured via the wearable glasses 1000 when the wearable glasses 1000 are inclined with respect to the user based on the reference wear state, according to one or more exemplary embodiments.

FIG. 11A illustrates an example of an image of the eyes of a user that is captured via the wearable glasses 1000 when the wearable glasses 1000 are inclined vertically with respect to the user and thus there is a top-bottom inclination. FIG. 11A illustrates an image of the eyes of a user when the wearable glasses 1000 have rotated about the y-axis of the wearable glasses 1000 in the reference wear state (i.e., an axis parallel to the eye direction in which the user in a reference wear state sees straight ahead). Compared with the locations of both eyes illustrated in FIG. 10B, the locations and angles of both eyes illustrated in FIG. 11A are changed.

FIG. 11B illustrates an example of an image of the eyes of the user that is captured via the wearable glasses 1000 when the wearable glasses 1000 are inclined right and left with respect to the user and thus there is a right-left inclination. FIG. 11B illustrates an image of the eyes of the user when the wearable glasses 1000 have rotated about the z-axis of the wearable glasses 1000 in the reference wear state (i.e., an axis perpendicular to the x-axis and the y-axis that are parallel to a straight line that connects the two eyes of the user in the reference wear state to each other).

When the wearable glasses 1000 are inclined right and left with respect to the user and thus a distance from one side of the wearable glasses 1000 to an eye of the user increases, the size of the eye displayed on an image of the eye is reduced. When the wearable glasses 1000 is inclined right and left with respect to the user and thus a distance from the other side of the wearable glasses 1000 to an eye of the user decreases, the size of the eye displayed on an image of the eye is increased. Compared with the locations of both eyes illustrated in FIG. 10B, the sizes of both eyes illustrated in FIG. 11B are changed. Referring to FIG. 11B, since the right eye of the user shown on a captured eye image becomes smaller, the right eye of the user becomes farther from the right side of the wearable glasses 1000. Since the left eye of the user shown on the captured eye image becomes larger, the left eye of the user becomes closer to the left side of the wearable glasses 1000. In other words, FIG. 11B illustrates an example of an eye image captured when the wearable glasses 1000 have rotated about the z-axis of the wearable glasses 1000 in the reference wear state in the direction in which a right end of the wearable glasses 1000b becomes farther from the user and a left end thereof becomes closer to the user.

The wearable glasses 1000 may acquire an image of the eyes of the user as information about a body part of the user, and determine an inclination of the wearable glasses 1000 with respect to the user by using the eye image. In this case, the wearable glasses 1000 may acquire the image of the eyes of the user by directly photographing the eyes of the user using the camera included therein or by receiving an image of the eyes of the user captured by an external device from the external device.

FIG. 11C illustrates an example of an image of the eyes of a user that is captured via the wearable glasses 1000 when the wearable glasses 1000 have a front-back inclination with respect to the user. That is, FIG. 11C illustrates an image of the eyes of a user when the wearable glasses 1000 have rotated about the x-axis of the wearable glasses 1000 in the reference wear state. Compared with the locations of both eyes illustrated in FIG. 10B, the locations and angles of both eyes illustrated in FIG. 11A are changed.

Figure 12:
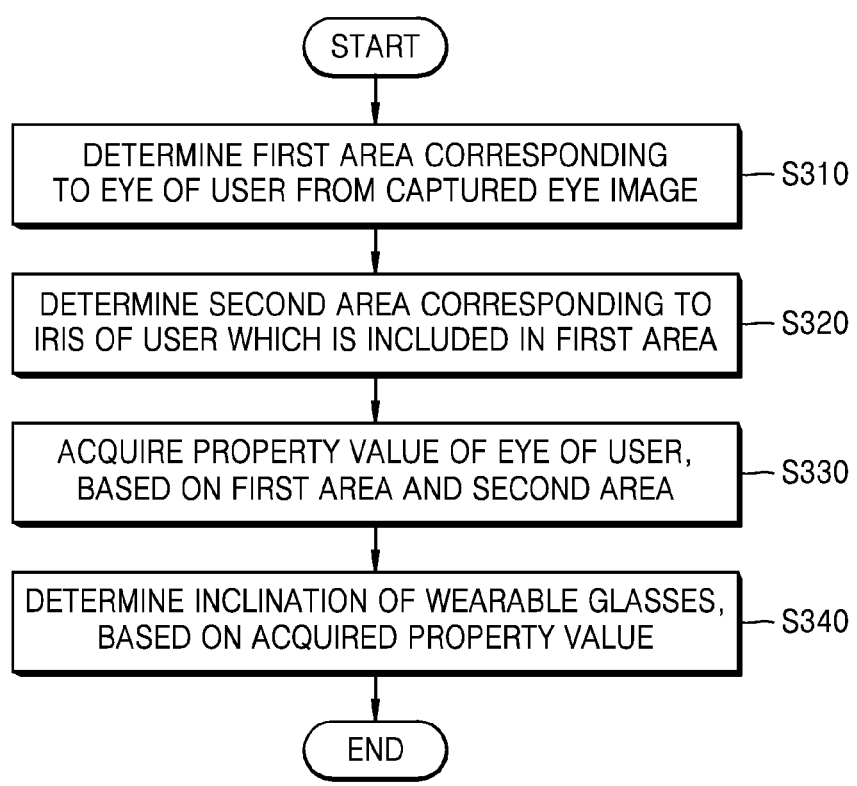
FIG. 12 is a flowchart of a method in which wearable glasses determine an inclination of the wearable glasses from an eye image of a user, according to an exemplary embodiment.

FIG. 12 is a flowchart of a method in which the wearable glasses 1000 determine the inclination of the wearable glasses 1000 from an image of the eyes of a user, according to an exemplary embodiment.

In operation S310, the wearable glasses 1000 may determine a first area corresponding to an eye of the user from the eye image.

For example, the wearable glasses 1000 may determine the first area corresponding to an eye of the user, based on a change in at least one of the brightness and the color of the eye image.

Figure 13:
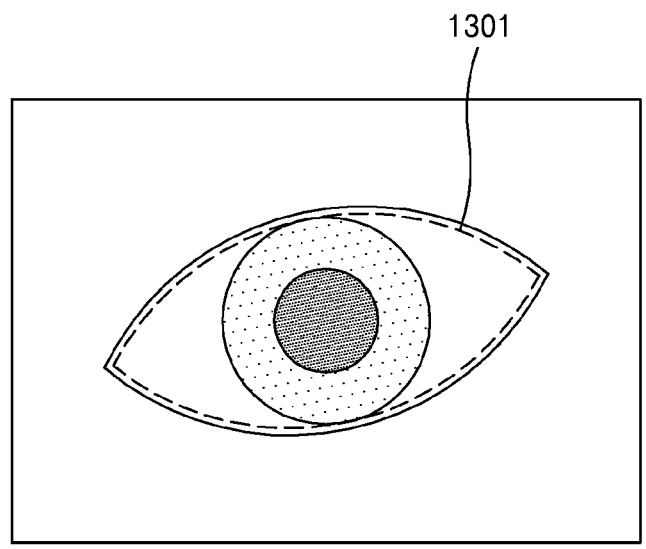
FIG. 13 is a schematic diagram for describing a first area corresponding to an eye that is determined from a captured eye image of a user, according to an exemplary embodiment.

FIG. 13 illustrates an example of an image of the eyes of a user. The wearable glasses 1000 may determine an area 1301 indicated by a dotted line of FIG. 13, as the first area corresponding to an eye of the user.

In operation S320, the wearable glasses 1000 may determine a second area corresponding to an iris of the user from the eye image.

For example, the wearable glasses 1000 may determine the second area corresponding to the iris of the user, based on a change in at least one of the brightness and the color of the eye image. The wearable glasses 1000 may determine the second area within the first area determined in operation S310 to thereby reduce the number of calculations compared with the case where the second area is determined within the entire eye image.

Figure 14:
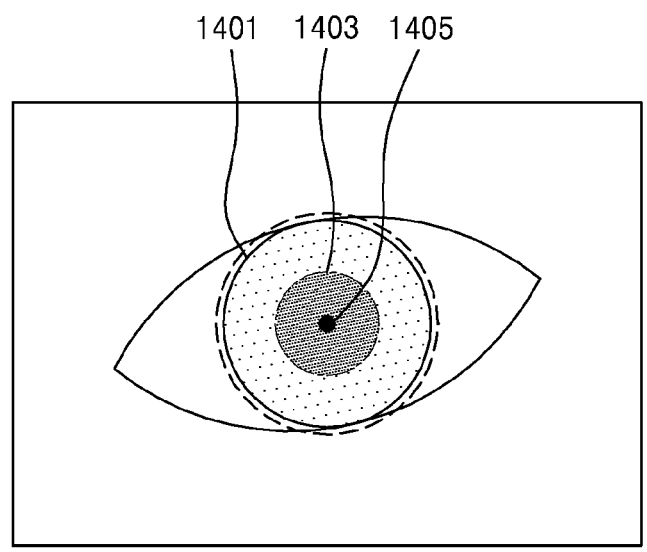
FIG. 14 is a schematic diagram for describing a second area corresponding to an iris that is determined from a captured eye image of a user, according to an exemplary embodiment.

FIG. 14 illustrates an example of an image of the eyes of a user. The wearable glasses 1000 may determine an area 1401 indicated by a dotted line of FIG. 14, as the second area corresponding to the iris of the user.

The wearable glasses 1000 may further determine an area 1403 (e.g., third area) corresponding to the pupil of the user or a center 1405 of the second area 1401. As shown in FIG. 14, the wearable glasses 1000 may further determine the area 1403 corresponding to the pupil of the user or the center 1405 of the second area 1401 from the eye image.

In operation S330, the wearable glasses 1000 may acquire a property value of the eye of the user, based on at least one of the first area and the second area. The property value of the eye of the user may include at least one of a length value of the major axis of the eye, a length value of the minor axis of the eye, a value of an angle at which the major axis is rotated, a value of an angle at which the minor axis is rotated, and a value representing the location of the iris of the user, which are within the eye image.

Figure 15:
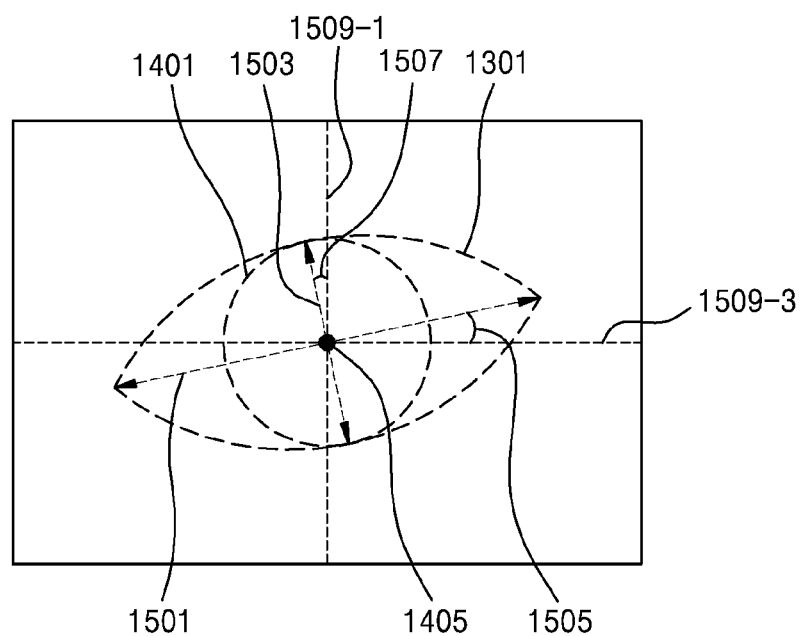
FIG. 15 is a schematic diagram for describing a property value that is acquired from the captured eye image, according to an exemplary embodiment.

FIG. 15 is a schematic diagram for describing a property value that is acquired from the captured eye image, according to an exemplary embodiment.

As shown in FIG. 15, the wearable glasses 1000 may determine, as the major axis, a line segment 1501 that connects points at which a straight line passing through two focal points of the first area 1301, corresponding to the eye of the user, intersects with the first area 1301, and determine a length of the line segment 1501 as a length of the major axis. When the first area 1301 approximates to an oval, the two focal points of the first area 1301 may denote two focal points of the first area 1301 approximating to an oval.

The wearable glasses 1000 may determine as the minor axis a line segment 1503 that perpendicularly bisects the line segment 1501, and determine a length of the line segment 1503 as a length of the minor axis.

The wearable glasses 1000 may acquire the location of a center 1405 of the second area 1401 corresponding to the iris of the user, as the value representing the location of the iris.

The wearable glasses 1000 may acquire the angle of the major axis and/or the angle of the minor axis, by comparing the angle of the major axis and/or the angle of the minor axis with a horizontal axis and/or a vertical axis of the eye image. The horizontal axis and the vertical axis of the eye image may be the major axis and the minor axis of an area corresponding to an eye acquired from an eye image of the user that is captured in the reference wear state.

The wearable glasses 1000 may determine an angle 1505 that is formed by the major axis of the first area 1301, corresponding to the eye of the user, and a horizontal axis 1509-3 of the eye image, as the angle of the major axis. The wearable glasses 1000 may determine an angle 1507 that is formed by the minor axis of the first area 1301, corresponding to the eye of the user, and a vertical axis 1509-1 of the eye image, as the angle of the minor axis.

Referring back to FIG. 12, in operation S340, the wearable glasses 1000 may determine the inclination of the wearable glasses 1000 with respect to the user, based on the acquired property value. For example, the wearable glasses 1000 may determine the inclination thereof by comparing the acquired property value with a reference value included in reference wear state information. The reference value included in the reference wear state information may be a property value that is detected from an image of a body part that is acquired when the state in which the user currently wears the wearable glasses 1000 is the reference wear state. The reference value may be a predetermined value or a value set by the user.

Figure 16:
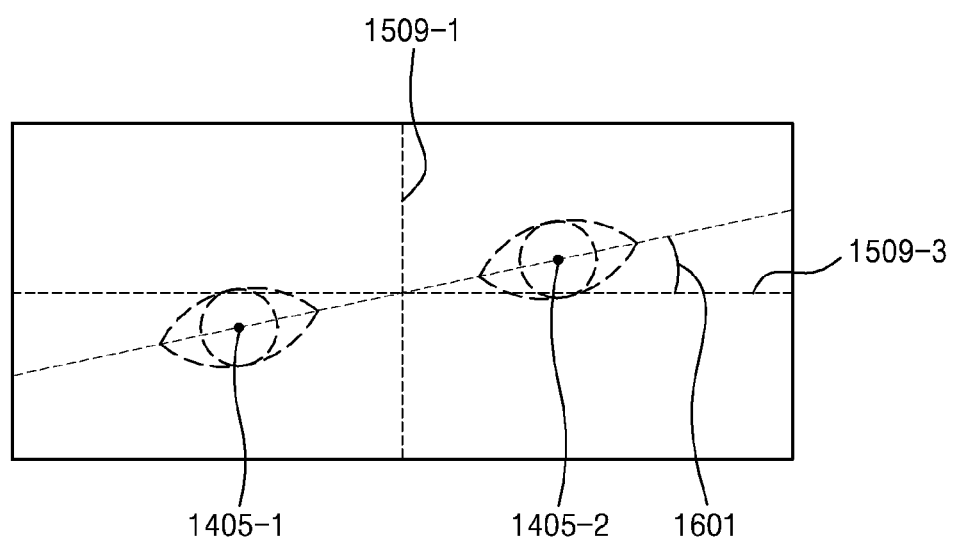
FIGS. 16 and 17 are schematic diagrams for explaining a method in which wearable glasses determine the inclination of the wearable glasses from the eye image, according to an exemplary embodiment.
Figure 17:
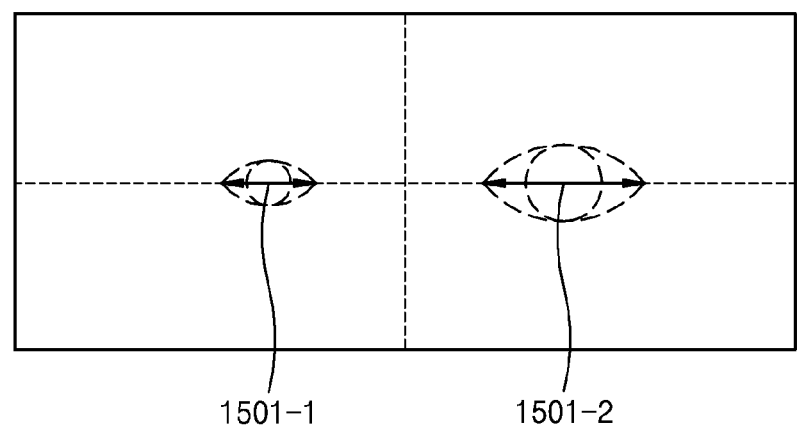

FIGS. 16 and 17 are schematic diagrams for explaining a method in which the wearable glasses 1000 determine the inclination of the wearable glasses 1000 from the eye image, according to an exemplary embodiment.

Referring to FIG. 16, the wearable glasses 1000 may extract, as the property value, an angle 1601 that is formed by a straight line that connects centers 1405-1 and 1405-2 of the irises of both eyes of the user and the horizontal axis 1509-3 of the eye image. The wearable glasses 1000 may determine a top-bottom inclination thereof by comparing the acquired property value with the reference value.

For example, when a reference value of the angle between the straight line that connects the centers 1405-1 and 1405-2 of the irises of both eyes of the user and the horizontal axis 1509-3 is 0, the angle 1601 between the straight line that connects the centers 1405-1 and 1405-2 and the horizontal axis 1509-3 may be determined as the top-bottom inclination of the wearable glasses 1000. The wearable glasses 1000 may adjust at least one of a rotation angle, a size, and a shape of the display image, based on the determined top-bottom inclination of the wearable glasses 1000.

Referring to FIG. 17, the wearable glasses 1000 may extract, as the property value, lengths of major axes 1501-1 and 1501-2 of both eyes of the user. The wearable glasses 1000 may determine a left-right inclination thereof by comparing the acquired property value with the reference value. For example, the wearable glasses 1000 may previously store the length of a major axis as the reference value. The wearable glasses 1000 may calculate a change in a distance between the wearable glasses 1000 and the user based on the pre-stored length of the major axis and a newly measured length of the major axis, and may adjust at least one selected from a size and a shape of the display image based on the calculated distance.

Figure 18:
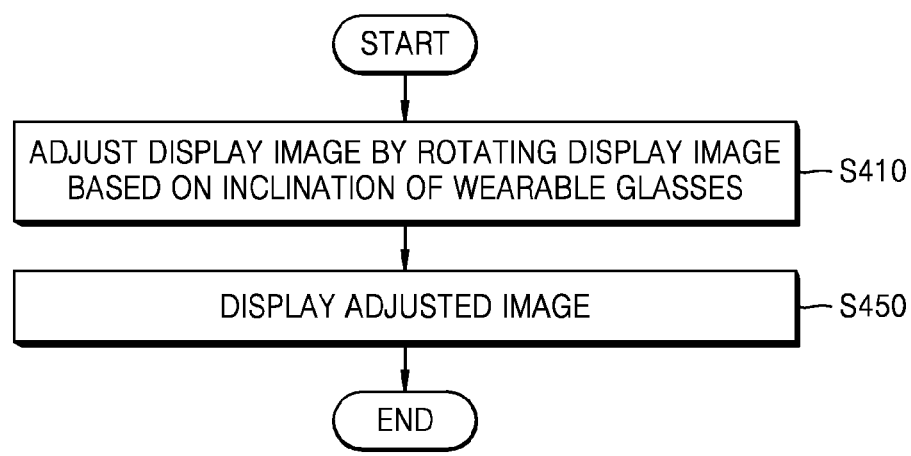
FIGS. 18 and 19 are flowcharts of methods in which wearable glasses display an adjusted image obtained based on an inclination of the wearable glasses, according to one or more exemplary embodiments.

FIG. 18 is a flowchart of a method in which the wearable glasses 1000 display an image adjusted based on the inclination of the wearable glasses 1000, according to an exemplary embodiment.

Referring to FIG. 18, in operation S410, the wearable glasses 1000 may adjust a display image by rotating the display image based on the inclination of the wearable glasses 1000. For example, the wearable glasses 1000 may rotate the display image according to an inclination (e.g., a top-bottom inclination) at which the wearable glasses 1000 are rotated about an axis parallel to the eye direction in which the user sees straight ahead, based on the reference wear state.

The wearable glasses 1000 may determine an inclination of the wearable glasses 1000 as compared with the reference wear state, and rotate the display image by the determined inclination in a direction opposite to the direction in which the wearable glasses 1000 are inclined.

In operation S450, the wearable glasses 1000 display an image adjusted based on the inclination of the wearable glasses 1000. The wearable glasses 1000 adjust the image that is displayed on the display 1030, based on the inclination determined according to the reference wear state.

Figure 20:
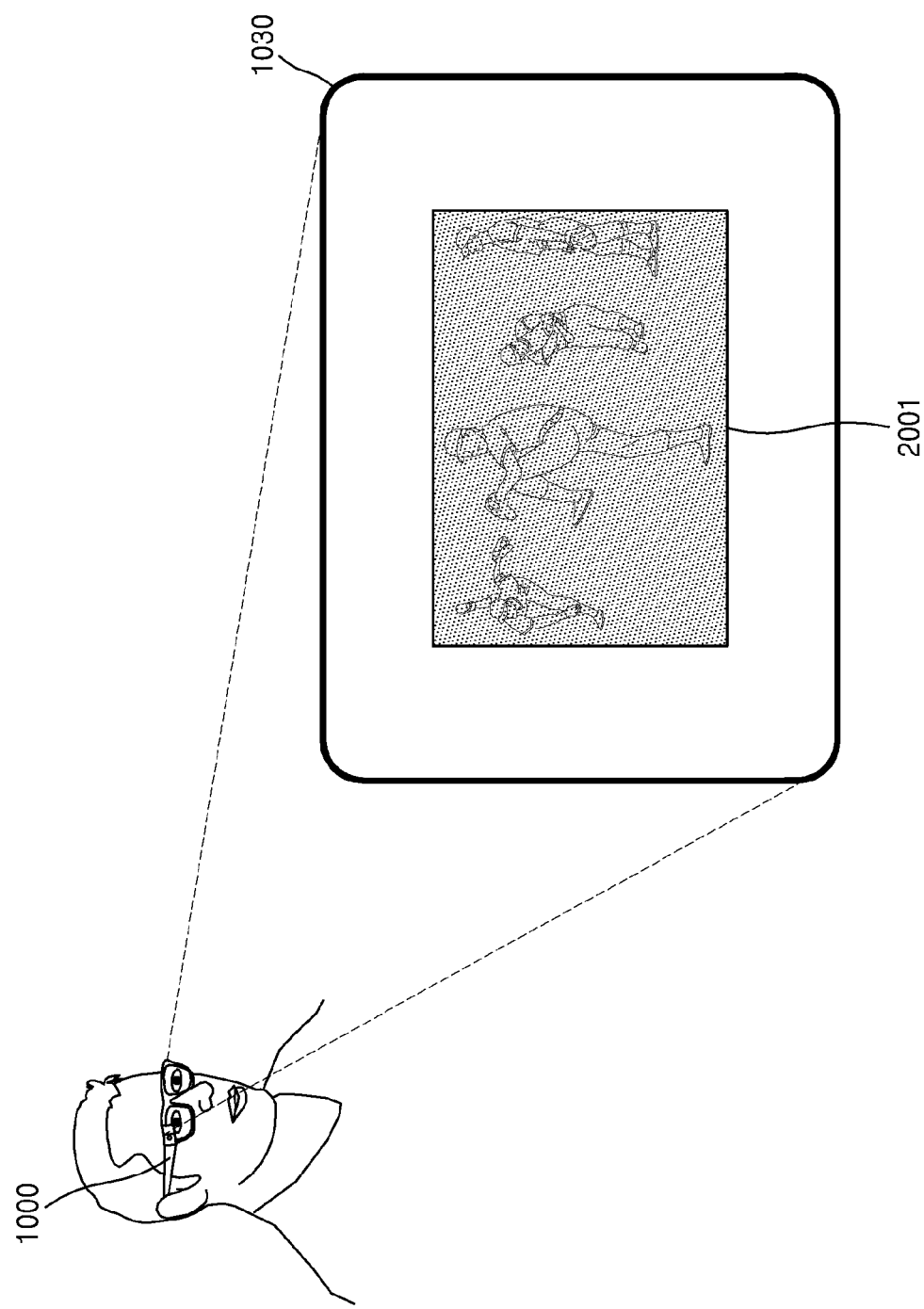
FIGS. 20, 21A, and 21B are schematic diagrams for explaining adjustment of an image that is displayed via a display of wearable glasses, based on an inclination of the wearable glasses, according to one or more exemplary embodiments.
Figure 21A:
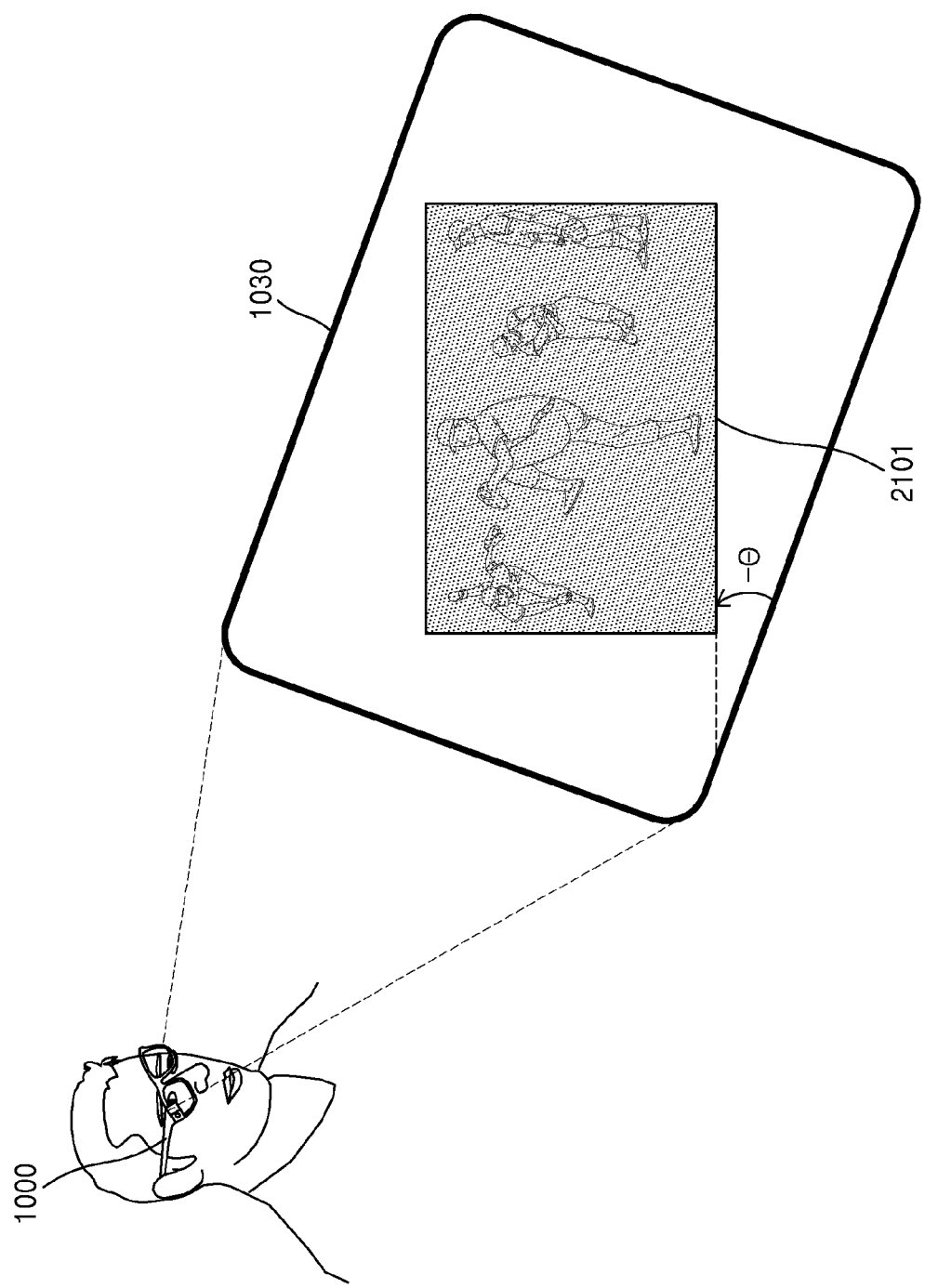
Figure 21B:
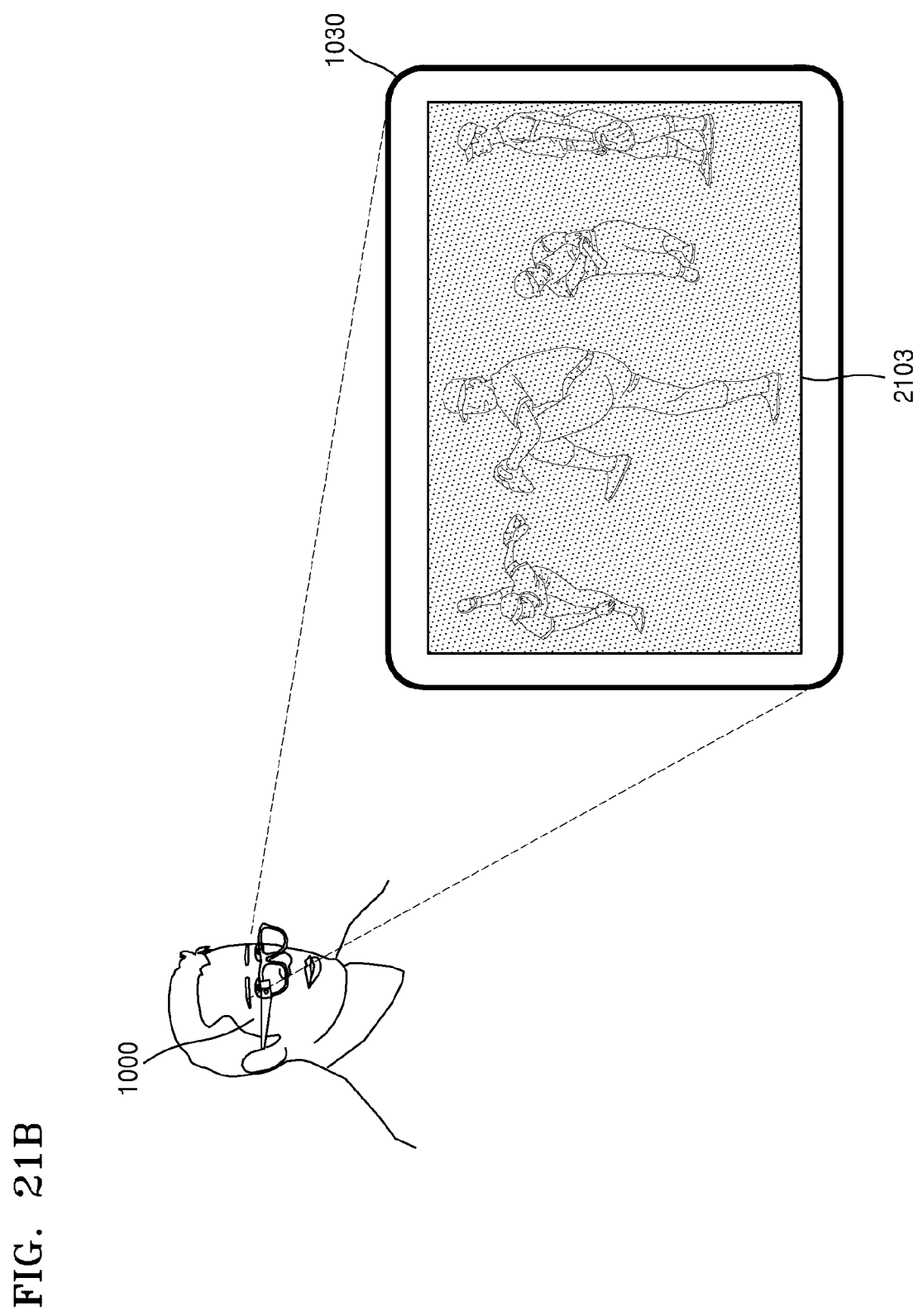

FIGS. 20, 21A, and 21B are schematic diagrams for explaining an image that is displayed via the display 1030 based on an inclination of the wearable glasses 1000, according to one or more exemplary embodiments. As shown in FIGS. 20, 21A, and 21B, the wearable glasses 1000 may display an image on the display 1030 by using a prism method. However, it is understood that one or more other exemplary embodiments are not limited thereto. For example, according to one or more other exemplary embodiments, the wearable glasses 1000 may display an image via the display 1030 according to the monocular display method of FIGS. 4A and 4B, the binocular display method of FIGS. 5A and 5B, or a method similar thereto.

FIG. 20 illustrates a case where a user in the reference wear state wears the wearable glasses 1000. As shown in FIG. 20, the wearable glasses 1000 may provide an image 2001 to the user via the display 1030.

FIG. 21A illustrates a case of adjusting an image that is displayed on the display 1030, based on the inclination of the wearable glasses 1000 when the wearable glasses 1000 are inclined as compared with the reference wear state.

When the wearable glasses 1000 are inclined as compared with the reference wear state about an axis parallel to the eye direction in which the user sees straight ahead, the wearable glasses 1000 may determine an angle θ of rotation of the wearable glasses 1000, as a top-bottom inclination of the wearable glasses 1000. As shown in FIG. 21A, the wearable glasses 1000 may display an image 2101 rotated by the determined top-bottom inclination in a direction opposite to the direction in which the wearable glasses 1000 are inclined.

Figure 19:
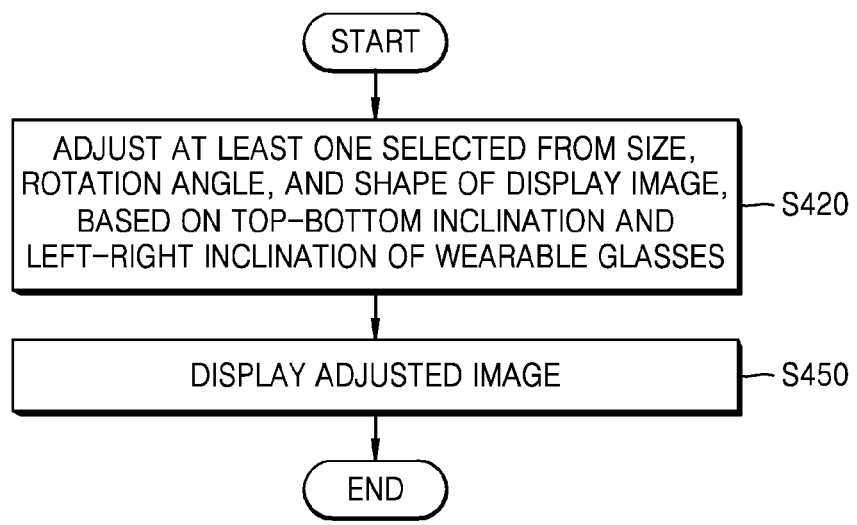

FIG. 19 is a flowchart of a method in which the wearable glasses 1000 display an image adjusted based on an inclination of the wearable glasses 1000, according to an exemplary embodiment.

Referring to FIG. 19, in operation S420, the wearable glasses 1000 adjust at least one of a size, a rotation angle, and a shape of a display image, based on the inclination of the wearable glasses 1000. For example, when a distance from the user to the wearable glasses 1000 varies based on the reference wear state, the wearable glasses 1000 may adjust the size of a display image. Alternatively, the wearable glasses 1000 may determine an inclination at which the wearable glasses 1000 are inclined about a predetermined axis as compared with the reference wear state, and rotate the display image in a direction opposite to the direction in which the wearable glasses 1000 are inclined. Alternatively, when at least one of the location and the angle of the wearable glasses 1000 varies as compared with the reference wear state, the wearable glasses 1000 may adjust the shape of the display image such that the user may be provided with a nondistorted image.

In operation S450, the wearable glasses 1000 display an image adjusted based on the inclination of the wearable glasses 1000.

FIG. 21B illustrates a case of adjusting an image that is displayed via the display 1030, based on a variation in the location of the wearable glasses 1000 when the wearable glasses 1000 become farther from the user as compared with the reference wear state.

When the wearable glasses 1000 become farther from the user as compared with the reference wear state, the user is provided with an image that is smaller than an image that is provided in the reference wear state. Thus, the wearable glasses 1000 may display an image 2103 that has been magnified based on the distance by which the wearable glasses 1000 become farther from the user.

FIG. 21B illustrates a case where the wearable glasses 1000 use a prism that projects an image to one eye of a user. However, it is understood that one or more other exemplary embodiments are not limited to the wearable glasses 1000 illustrated in FIG. 21B. In the case of the wearable glasses 1000 constructed as a binocular display as shown in FIGS. 5A and 5B, when the wearable glasses 1000 are inclined right and left with respect to the user and thus a left-right inclination exists, a distance from one side of the wearable glasses 1000 to the eyes of the user differs from a distance from the other side of the wearable glasses 1000 and the eyes of the user.

When the wearable glasses 1000 are inclined right and left with respect to the user, the wearable glasses 1000 may determine an angle at which the wearable glasses 1000 are inclined right and left with respect to the user, as a left-right inclination thereof.

For example, as shown in FIG. 17, the wearable glasses 1000 may determine the left-right inclination of the wearable glasses 1000, based on the lengths of the major axes 1501-1 and 1501-2 of both eyes of the user. When the wearable glasses 1000 are inclined right and left with respect to the user, a distance from one side of the wearable glasses 1000 to an eye of the user may vary. Accordingly, as shown in FIG. 17, when the distance from one side of the wearable glasses 1000 to the eye of the user increases, the size of the eye shown on an image of the eye becomes smaller. When a distance from the other side of the wearable glasses 1000 to an eye of the user decreases, the size of the eye shown on the image of the eye becomes larger.

The wearable glasses 1000 may determine a left-right inclination of the wearable glasses 1000 as compared with the reference wear state, and may adjust the size of a display image by the determined left-right inclination. For example, the wearable glasses 1000 may estimate a variation in the distance from the wearable glasses 1000 to an eye of the user, based on the left-right inclination. The wearable glasses 1000 may adjust the size of the display image, based on the estimated distance variation.

The wearable glasses 1000 may perform image adjustment based on the inclination of the wearable glasses 1000 (for example, horizontal translation, vertical translation, keystoning, and/or various types of image processing in which a display image is corrected such that a user may be provided with a nondistorted image).

A method in which the wearable glasses 1000 adjust an image that is displayed on the display 1030, according to one or more exemplary embodiments, will now be described in detail with reference to FIGS. 22A, 22B, and 22C.

The wearable glasses 1000 may determine a variation in the location of the wearable glasses 1000 with respect to a user as compared with the reference wear state. For example, the wearable glasses 1000 may determine an inclination thereof as compared with the reference wear state.

The wearable glasses 1000 may adjust the image that is displayed via the display 1030, based on the determined location variation. The wearable glasses 1000 may display an adjusted image by remapping the image displayed on the display 1030 by using a conversion formula.

Figure 22A:
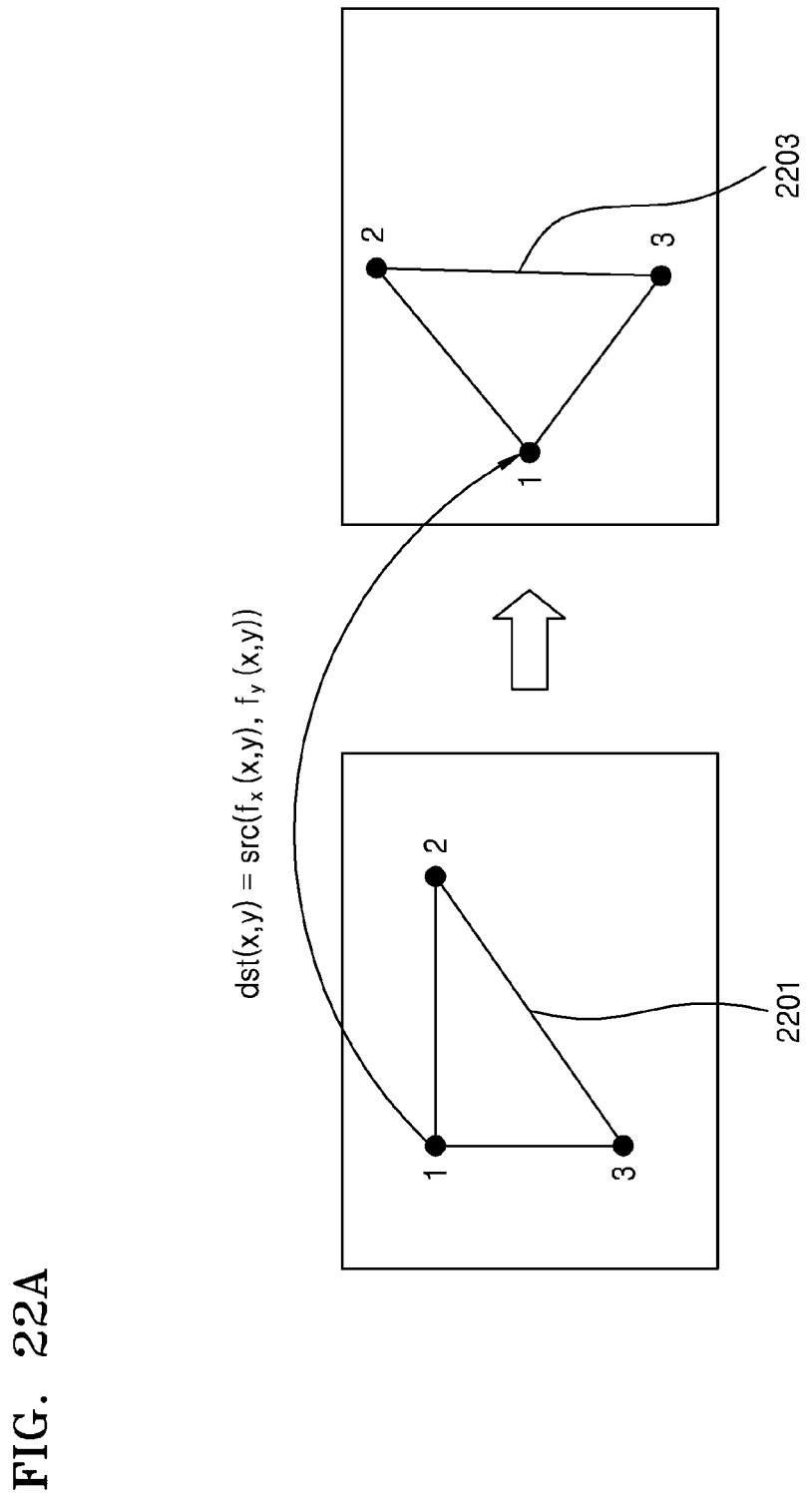
FIGS. 22A, 22B, and 22C are schematic diagrams for explaining a method of adjusting an image that is displayed via a display of wearable glasses, based on an inclination of the wearable glasses, according to one or more exemplary embodiments.

As shown in FIG. 22A, the wearable glasses 1000 may display an image 2201 on the display 1030.

When a user is wearing the wearable glasses 1000 for a long time, the location of the wearable glasses 1000 on the head of the user may be changed according to a movement of the user or an external environment change. The wearable glasses 1000 may acquire wear state information representing a state in which the user currently wears the wearable glasses 1000. The wearable glasses 1000 may determine a location change degree of the wearable glasses 1000 from the acquired wear state information, based on a predetermined reference wear state. The wearable glasses 1000 may calculate or operate in accordance with a conversion formula for adjusting an image that is being displayed via the display 1030, based on the determined location change degree.

The conversion formula calculated or used by the wearable glasses 1000 may be expressed as Equation 1:

$$dst(x,y)=src(f_x(x,y),f_y(x,y))$$ [Equation 1]

where src indicates the original image that is not yet rotated, dst indicates an image that has been rotated, and (x,y) indicates coordinates of an image. In Equation 1, fx(x,y) indicates a conversion formula for an x-axis value of a predetermined pixel, and fy(x,y) indicates a conversion formula for a y-axis value of the predetermined pixel.

As shown in FIG. 22A, the wearable glasses 1000 remap each pixel included in the image 2201 by applying the conversion formula to the image 2201, thereby generating and displaying an adjusted image 2203. The wearable glasses 1000 may adjust at least one of a location, a rotation angle, a size, and a shape of an image that is being displayed, by applying the conversion formula to the image.

Figure 22B:
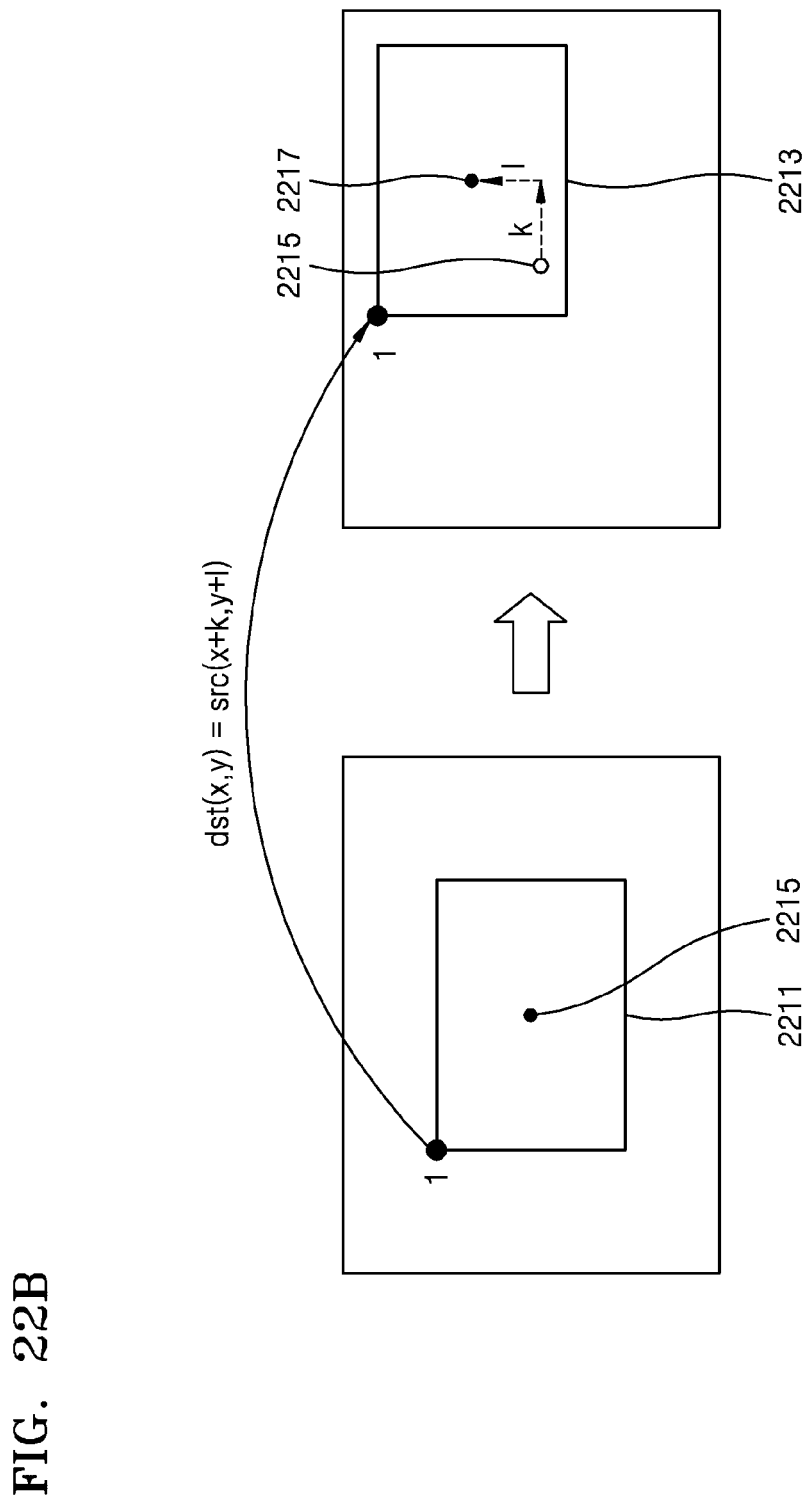
Figure 22C:
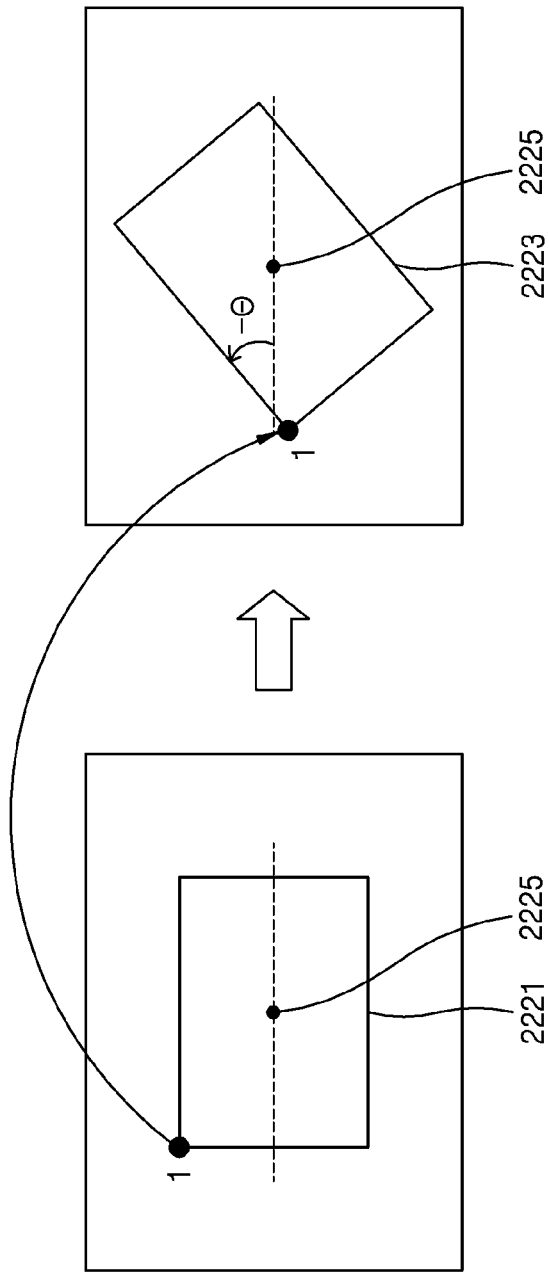

FIG. 22B illustrates a method of adjusting the location of an image that is provided via the wearable glasses 1000. As shown in FIG. 22B, the wearable glasses 1000 may display an image 2211 on the display 1030.

When a user is wearing the wearable glasses 1000 for a long time, the location of the wearable glasses 1000 on the head of the user may be changed according to a movement of the user or an external environment change. When the location of the wearable glasses 1000 on the head of the user is changed, the image that is provided via the wearable glasses 1000 may deviate from the viewing angle of the user. In particular, when the display 1030 of the wearable glasses 1000 is constructed in the form of a prism and the location of the wearable glasses 1000 on the head of the user is changed, the location of a focal point on which light output by the projector of the display 1030 is focused is changed, and thus the user is provided with a distorted image.

Accordingly, the wearable glasses 1000 may determine a change in the location of the wearable glasses 1000 with respect to the user as compared with the reference wear state, and adjust the image 2211 being displayed based on the determined location change. The wearable glasses 1000 may calculate or operate in accordance with a conversion formula for adjusting the image 2211 being displayed.

A conversion formula calculated or used such that the wearable glasses 1000 move an image that is being displayed by k in the x-axis direction and by l in the y-axis direction may be expressed as Equation 2:

$$dst(x,y)=src(x+k,y+l)$$ [Equation 2]

where src indicates the original image that has not yet changed in a display location, dst indicates a resultant image that has been changed in a display location, and (x,y) indicates coordinates of an image. A pixel 2215 denotes a predetermined pixel within the image 2211 that is being displayed. FIG. 22B illustrates a case of moving the image 2211 being displayed by k in the x-axis direction and by l in the y-axis direction. As shown in FIG. 22B, the pixel 2215 within the image 2211 being displayed may be moved by k in the x-axis direction and by l in the y-axis direction and thus may be remapped as a pixel 2217 on the display 1030.

As shown in FIG. 22B, the wearable glasses 1000 remap each pixel included in the image 2211 by applying Equation 2 to the image 2211, thereby generating and displaying an adjusted image 2213. FIG. 22C illustrates a method of rotating an image that is provided via the wearable glasses 1000, at a predetermined angle. As shown in FIG. 22C, the wearable glasses 1000 may display an image 2221 on the display 1030.

When a user is wearing the wearable glasses 1000 for a long time, the location of the wearable glasses 1000 on the head of the user may be changed according to a movement of the user or an external environment change. When the wearable glasses 1000 rotate about a predetermined axis on the head of the user, the user is provided with a distorted image.

Accordingly, the wearable glasses 1000 may determine an inclination of the wearable glasses 1000 with respect to the user as compared with the reference wear state, and adjust an image that is being displayed, based on the determined inclination. The wearable glasses 1000 may calculate a conversion formula for adjusting the image 2221 that is being displayed via the display 1030. For example, when the wearable glasses 1000 are inclined about an axis parallel to the eye direction in which the user looks straight ahead, as compared with the reference wear state, the wearable glasses 1000 may determine an angle θ of rotation of the wearable glasses 1000, as a top-bottom inclination of the wearable glasses 1000. As shown in FIG. 22C, the wearable glasses 1000 may display an image 2223 that has been rotated by the determined top-bottom inclination in a direction opposite to the direction in which the wearable glasses 1000 are inclined.

A conversion formula calculated or used such that the wearable glasses 1000 rotate an image that is being displayed in the opposite direction by the top-bottom inclination may be expressed as Equation 3 below.

A conversion matrix M for rotating a display image in a direction opposite to the direction in which the wearable glasses 1000 are inclined may be expressed as follows. In other words, M indicates a conversion matrix for rotating the display image by −θ°:

$$M = \begin{bmatrix} \alpha & \beta & (1-\alpha)\cdot\text{center}\cdot x - \beta\cdot\text{center}\cdot y \\ -\beta & \alpha & \beta\cdot\text{center}\cdot x + (1-\alpha)\cdot\text{center}\cdot y \end{bmatrix} \quad \text{[Equation 3]}$$

$$\alpha = \text{scale}\cdot\cos(-\theta)$$

$$\beta = \text{scale}\cdot\sin(\theta)$$

In Equation 3, center indicates a center point of the display image that is to be rotated, and scale indicates a parameter that determines the size of a resultant image obtained by applying a conversion matrix to the display image.

A conversion formula calculated or used by applying a conversion matrix to the display image may be expressed as Equation 4:

$$dst(x,y)=src(M_{11}x+M_{12}y+M_{13}, M_{21}x+M_{22}y+M_{23}) \quad \text{[Equation 4]}$$

where src indicates the original image that is not yet rotated, dst indicates a resultant image that has been rotated, and (x,y) indicates coordinates of an image. As shown in FIG. 22C, the wearable glasses 1000 may generate the image 2223 by rotating the image 2221, which is being displayed, by −θ° from a center point 2225, and display the image 2223.

The wearable glasses 1000 may apply an animation effect to update an image being displayed on the display 1030 with an image adjusted based on an inclination of the wearable glasses 1000 to display the adjusted image.

Figure 23:
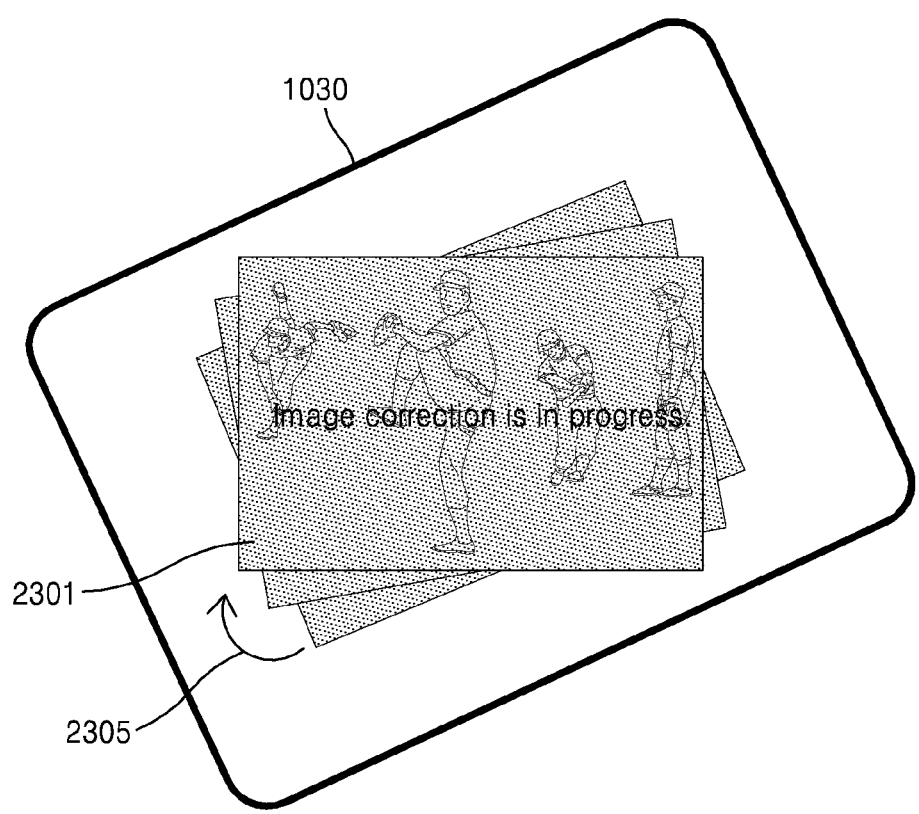
FIGS. 23 and 24 illustrate an example of an animation effect that is applied to an image that is displayed via wearable glasses, according to one or more exemplary embodiments.

For example, as shown in FIG. 23, the wearable glasses 1000 may apply, to the display image 2301, an animation effect in which a display image 2301 is rotated in the direction of an arrow 2305 and displayed.

Figure 24:
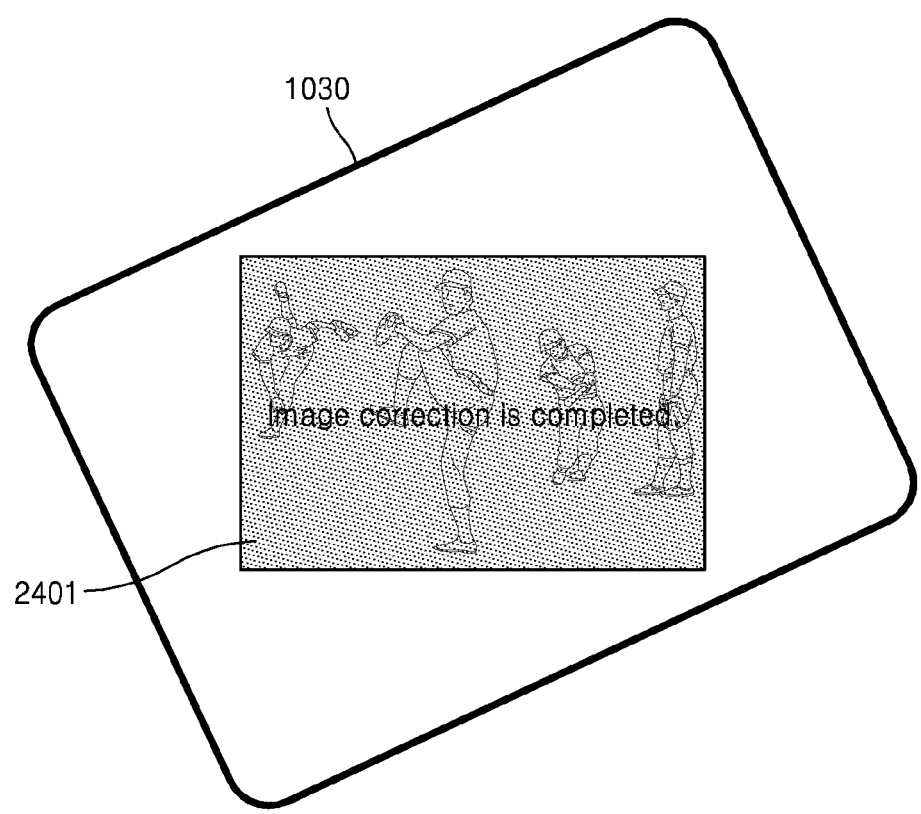

After image adjustment based on the inclination of the wearable glasses 1000 is completed, an image 2401 representing that the image adjustment has been completed may be output as shown in FIG. 24.

According to an exemplary embodiment, when the image adjusted based on the inclination of the wearable glasses 1000 deviates from an area where the wearable glasses 1000 may display an image, the adjusted image may be shrunk and displayed.

Figure 25:
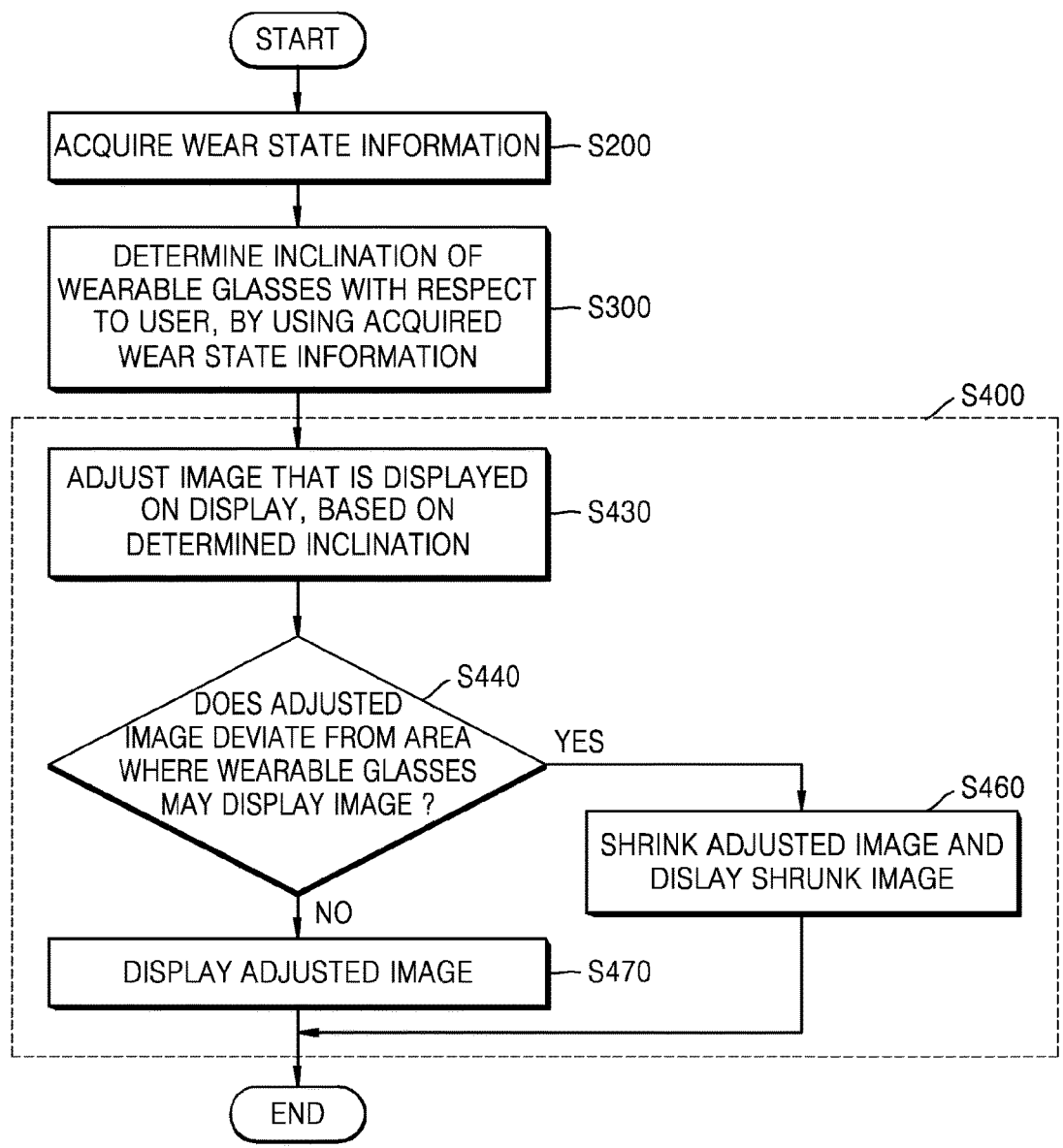
FIG. 25 is a flowchart of a method in which wearable glasses shrink and display an adjusted image, according to an exemplary embodiment.

FIG. 25 is a flowchart of a method in which the wearable glasses 1000 shrink and display an adjusted image, according to an exemplary embodiment.

Operations S200, S300, and S400 of FIG. 25 respectively correspond to operations S200, S300, and S400 of FIG. 6, and thus redundant descriptions thereof will be omitted herein.

As shown in FIG. 25, in operation S430, the wearable glasses 1000 adjust an image that is displayed on the display 1030, based on a determined inclination.

In operation S440, the wearable glasses 1000 determine whether the adjusted image deviates from the area where the wearable glasses 1000 may display an image.

For example, in the wearable glasses 1000 having the display types illustrated in FIGS. 4A, 4B, 5A, and 5B, the area where the wearable glasses 1000 may display an image may denote an area on the display 1030 where light beams and colors corresponding to pixels that constitute an image may be output. As another example, in the wearable glasses 1000 having the prism type illustrated in FIGS. 3A and 3B, the area where the wearable glasses 1000 may display an image may denote an area on the display 1030 where light output by the projector of the wearable glasses 1000 may be reflected and thus an image may be focused on the foveae of the retinas of the eyes of a user who is wearing the wearable glasses 1000.

For example, when a display image is rotated based on the inclination of the wearable glasses 1000 and an angle of the rotation is equal to or greater than a predetermined value, the wearable glasses 1000 may determine that the adjusted image deviates from the area where the wearable glasses 1000 may display an image.

Alternatively, when the size of a display image is changed based on the inclination of the wearable glasses 1000 and the size of a changed display image is equal to or greater than a predetermined value, the wearable glasses 1000 may determine that the adjusted image deviates from the area where the wearable glasses 1000 may display an image.

When the adjusted image is displayed within the area where the wearable glasses 1000 may display an image, the wearable glasses 1000 may display the adjusted image, in operation S470. On the other hand, when the adjusted image deviates from the area where the wearable glasses 1000 may display an image, the wearable glasses 1000 may shrink or demagnify the adjusted image, in operation S460.

Figure 26:
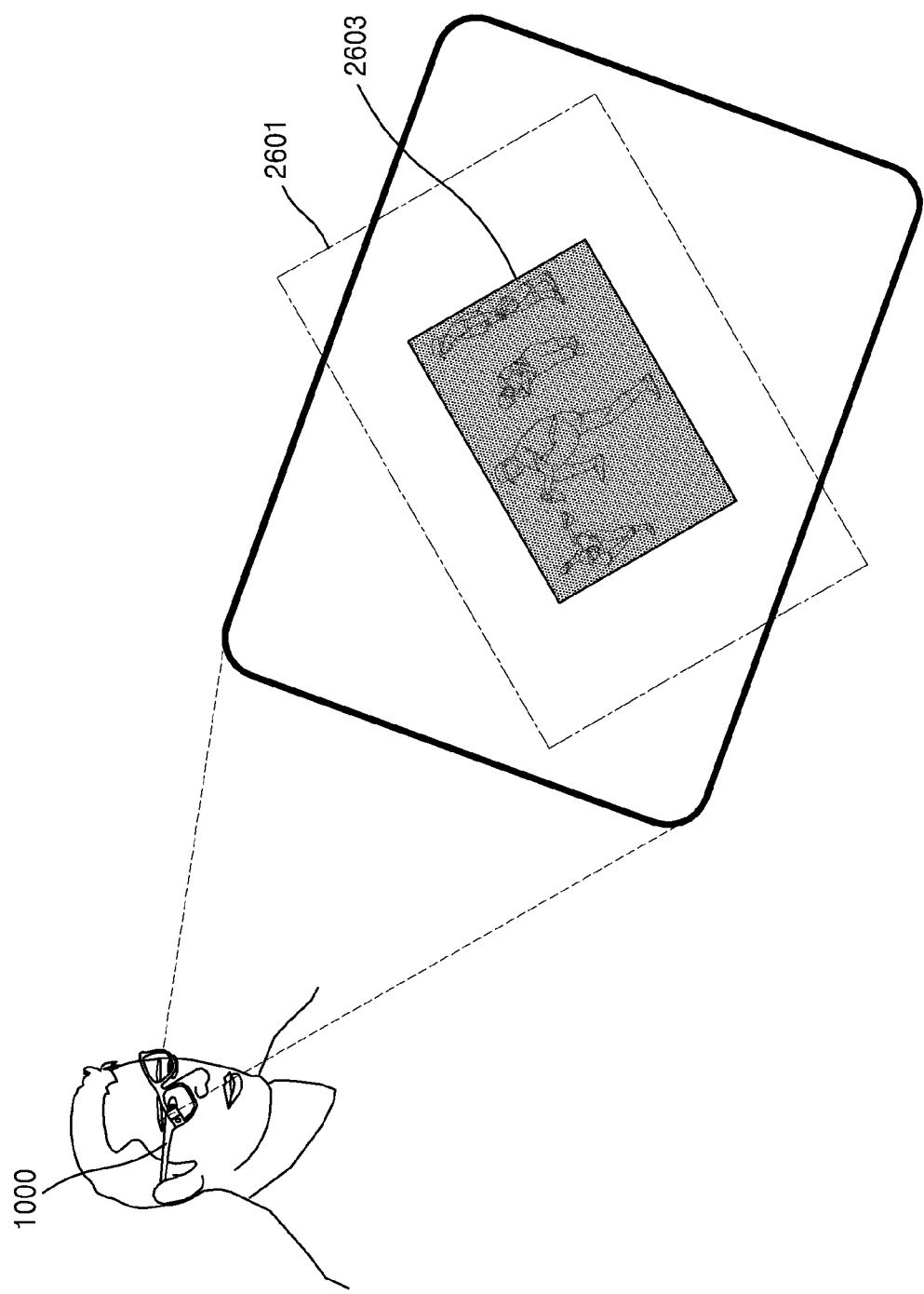
FIG. 26 is a schematic diagram for explaining an image that is shrunk based on an inclination of wearable glasses and displayed, according to an exemplary embodiment.

FIG. 26 is a schematic diagram for explaining an image that is shrunk based on an inclination of the wearable glasses 1000 and displayed, according to an exemplary embodiment.

FIG. 26 illustrates a case of adjusting a display image based on a top-bottom inclination of the wearable glasses 1000 with respect to a user, when the wearable glasses 1000 are inclined as compared with the reference wear state illustrated in FIG. 20. When an adjusted image 2601 deviates from the area where the wearable glasses 1000 may display an image as indicated by a dotted line of FIG. 26, the wearable glasses 1000 may shrink (e.g., demagnify) the adjusted image 2601 and display a shrunk image 2603.

When a location of the wearable glasses 1000 with respect to the user is greatly changed as compared with the reference wear state, the user may be provided with a distorted image even when the wearable glasses 1000 adjust the display image based on the inclination thereof. In this case, according to an exemplary embodiment, the wearable glasses 1000 may output an image that guides the user to correct the location of the HMD 1000.

Figure 27:
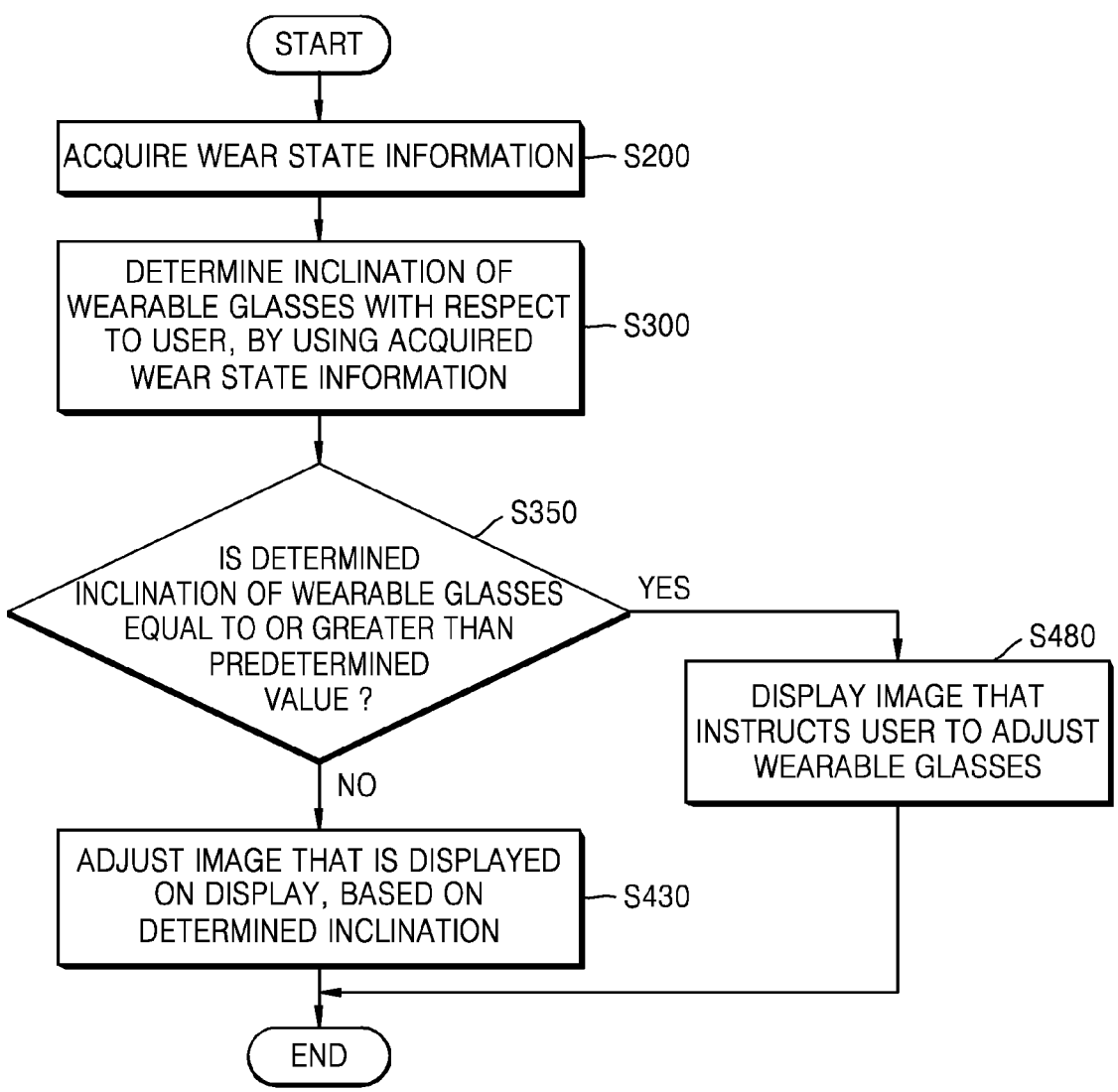
FIG. 27 is a flowchart of a method of displaying an image that requests a user to adjust the wearable glasses, according to an exemplary embodiment.

FIG. 27 is a flowchart of a method in which the wearable glasses 1000 display an image that requests a user to adjust the wearable glasses 1000, according to an exemplary embodiment.

Operations S200 and S300 of FIG. 27 respectively correspond to operations S200 and S300 of FIG. 6, and thus redundant descriptions thereof will be omitted herein.

As shown in FIG. 27, in operation S300, the wearable glasses 1000 determine an inclination of the wearable glasses 1000 with respect to the user.

In operation S350, the wearable glasses 1000 determine whether the inclination of the wearable glasses 1000 determined in operation S300 is equal to or greater than a predetermined value. The predetermined value may be a pre-stored value or a value set by the user.

When the determined inclination of the wearable glasses 1000 is less than the predetermined value, the wearable glasses 1000 may adjust an image being displayed on the display 1030, based on the determined inclination, in operation S430. On the other hand, when the determined inclination of the wearable glasses 1000 is equal to or greater than the predetermined value, the wearable glasses 1000 may display an image that instructs the user to adjust the wearable glasses 1000, in operation S480.

Figure 28:
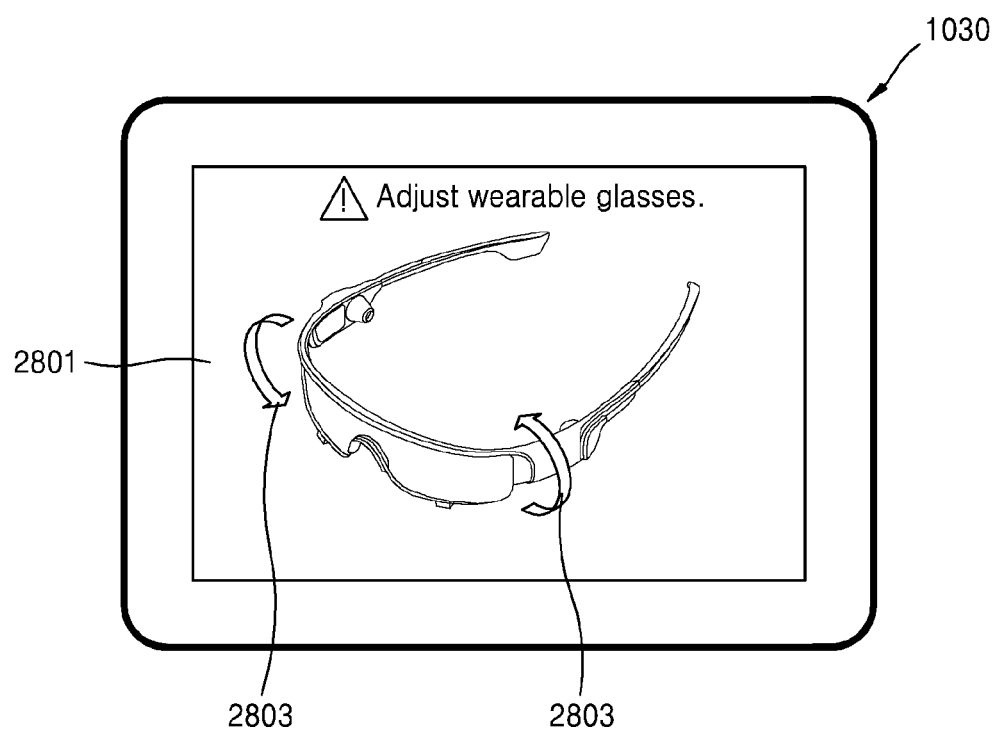
FIG. 28 illustrates an example of an image that requests a user to adjust the wearable glasses, according to an exemplary embodiment.

FIG. 28 illustrates an example of an image that requests a user to adjust the wearable glasses 1000, according to an exemplary embodiment.

As shown in FIG. 28, when an inclination of the wearable glasses 1000 is equal to or greater than a predetermined value, the wearable glasses 1000 may display on the display 1030 an image 2801 that requests the user to adjust the wearable glasses 1000. The image 2801 requesting the user to adjust the wearable glasses 1000 may include an image that provides information about a state in which the wearable glasses 1000 are properly worn by the user (i.e., a reference wear state).

For example, as shown in FIG. 28, the image 2801 requesting the user to adjust the wearable glasses 1000 may include an image 2803 that guides a direction in which the wearable glasses 1000 is to be adjusted such that the state in which the user currently wears the wearable glasses 1000 becomes the reference wear state.

In response to the image 2801 requesting the user to adjust the wearable glasses 1000, the user may physically change the location of the wearable glasses 1000. After showing to the user the image 2801 requesting the user to adjust the wearable glasses 1000, the wearable glasses 1000 may resume operation S200 in order to repeat adjusting an image based on information about the wear state of the user.

The wearable glasses 1000 may display a guide image that guides the user to adjust the wearable glasses 1000. According to another exemplary embodiment, the wearable glasses 1000 may simply display an image (e.g., an icon, a flashing icon, etc.) that alerts the user to adjust the wearable glasses 1000.

Figure 29:
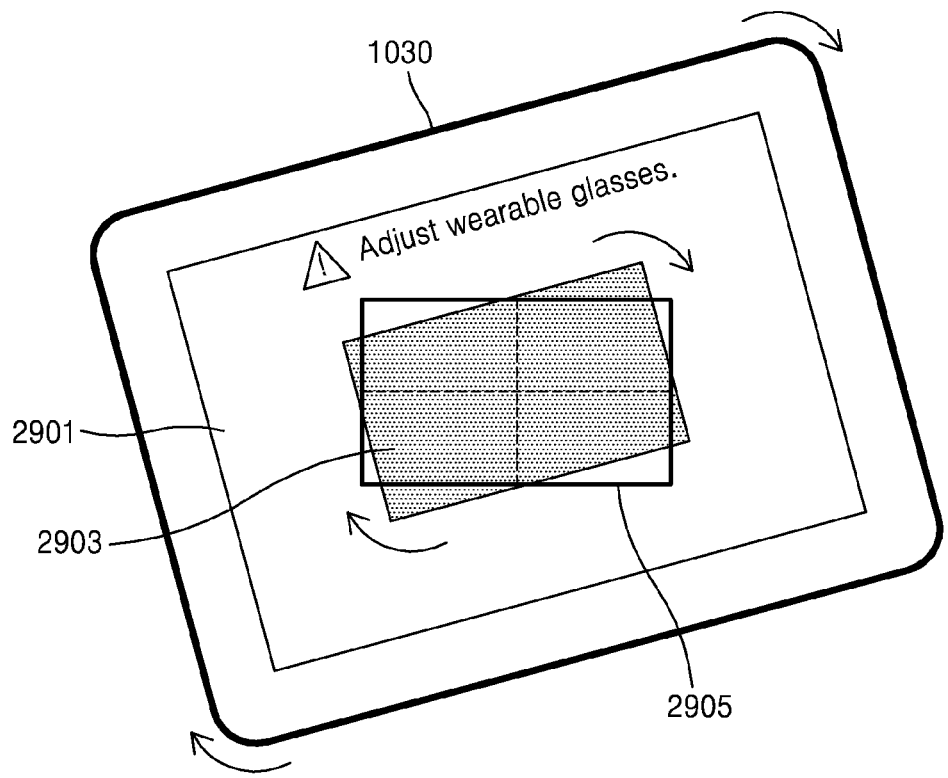
FIG. 29 illustrates an example of an image that guides a user to adjust wearable glasses, according to an exemplary embodiment.
Figure 29:

FIG. 29 illustrates an example of an image that guides a user to adjust the wearable glasses 1000, according to an exemplary embodiment.

As shown in FIG. 29, when an inclination of the wearable glasses 1000 is equal to or greater than a predetermined value, the wearable glasses 1000 may display on the display 1030 an image 2901 that requests the user to adjust the wearable glasses 1000. The image 2901 requesting the user to adjust the wearable glasses 1000 may include a guide image 2905 that guides the user to adjust the wearable glasses 1000.

The guide image 2905 may be an image that provides information about the reference wear state. For example, as shown in FIG. 29, the image 2905 may guide a direction in which the wearable glasses 1000 are to be adjusted such that the state in which the user currently wears the wearable glasses 1000 becomes the reference wear state.

For example, the guide image 2905 may be an image representing a case where the wearable glasses 1000 are in a horizontal state (i.e., the wearable glasses 1000 are perpendicular to the direction of the Earth's gravity), or an image that is expected to be provided to the user when the wearable glasses 1000 are positioned at a reference location. The reference location denotes a location of the wearable glasses 1000 on the user when the state in which the user currently wears the wearable glasses 1000 is the reference wear state, and thus may be pre-stored as a default value or set by the user.

For example, the wearable glasses 1000 may display as the guide image 2905 an image that is expected to be provided to the user when the wearable glasses 1000 are in a horizontal state, based on the sensing unit (e.g., sensor) built in the wearable glasses 1000.

Thus, as shown in FIG. 29, the user may physically change the location of the wearable glasses 1000 such that a display image 2903 corresponds to the guide image 2905.

For example, when the guide image 2905 is an image representing a case where the wearable glasses 1000 are in a horizontal state, making the display image 2903 and the guide image 2905 correspond to each other represents that the wearable glasses 1000 are positioned in the horizontal state. Thus, the user may repeat changing the location of the wearable glasses 1000 until the display image 2903 and the guide image 2905 correspond to each other, to thereby position the wearable glasses 1000 in the horizontal state.

As another example, when the guide image 2905 is an image representing a case where the wearable glasses 1000 are positioned at the reference location, making the display image 2903 and the guide image 2905 correspond to each other represents that the wearable glasses 1000 are positioned most appropriate for the user to receive an image. Thus, the user may repeat changing the location of the wearable glasses 1000 until the display image 2903 and the guide image 2905 correspond to each other, to thereby position the wearable glasses 1000 at the reference location.

The wearable glasses 1000 are not limited to the case in which a user changes the location of the wearable glasses 1000 such that the state in which the user currently wears the wearable glasses 1000 becomes the reference wear state. The wearable glasses 1000 may include a driver capable of changing the state in which the user currently wears the wearable glasses 1000. For example, when the wearable glasses 1000 are in the form of eyeglasses, the wearable glasses 1000 may include the driver within the temples or the nose bridge and thus correct the inclination of the wearable glasses 1000 with respect to the user.

The wearable glasses 1000 may adjust an image that is displayed on the display 1030, by taking into account, not only the inclination of the wearable glasses 1000, but also at least one of a variation in the location of the wearable glasses 1000 and the brightness of an external environment. The wearable glasses 1000 may adjust the brightness of the image that is displayed on the display 1030, based on the variation in the location of the wearable glasses 1000 or the brightness of the external environment. For example, the wearable glasses 1000 may determine the variation in the brightness of the external environment by using an image of the eyes of the user.

Figure 30:
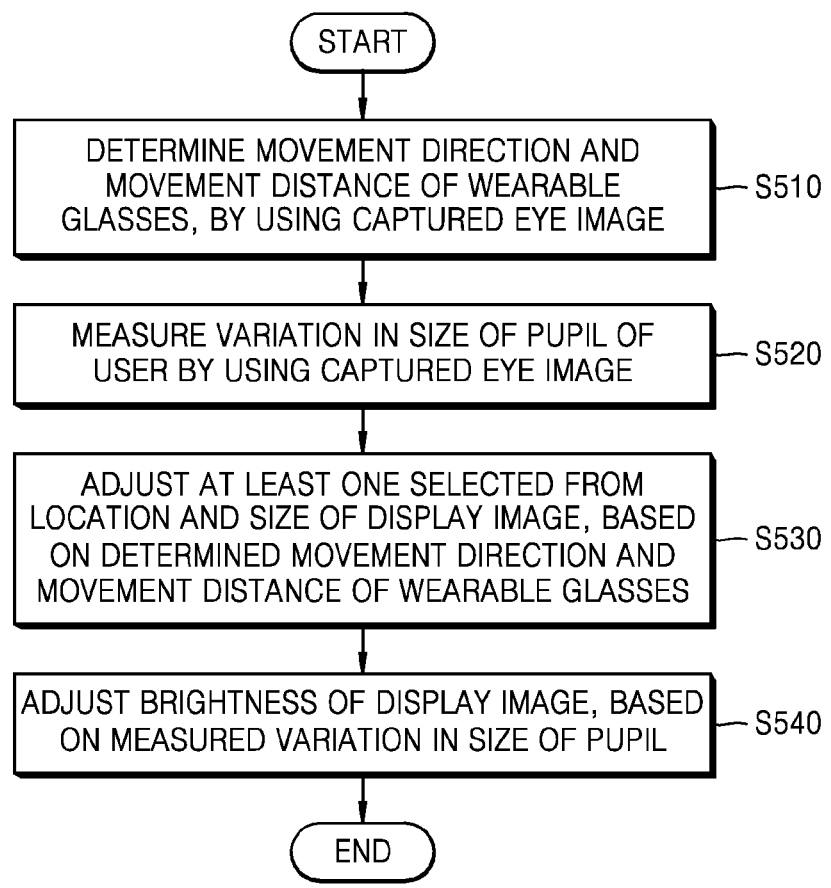
FIG. 30 is a flowchart of a method in which wearable glasses adjust a display image, according to an exemplary embodiment.

FIG. 30 is a flowchart of a method in which the wearable glasses 1000 adjust a display image, according to an exemplary embodiment.

Referring to FIG. 30, in operation S510, the wearable glasses 1000 may determine at least one of a movement direction and a movement distance of the wearable glasses 1000, by using an image of the eyes of a user.

For example, the wearable glasses 1000 may determine a location value of an eye of the user from the eye image of the user. The wearable glasses 1000 may compare the determined location value with a reference value included in the reference wear state information, and determine at least one of the movement direction and the movement distance of the wearable glasses 1000 based on a result of the comparison.

Figure 31:
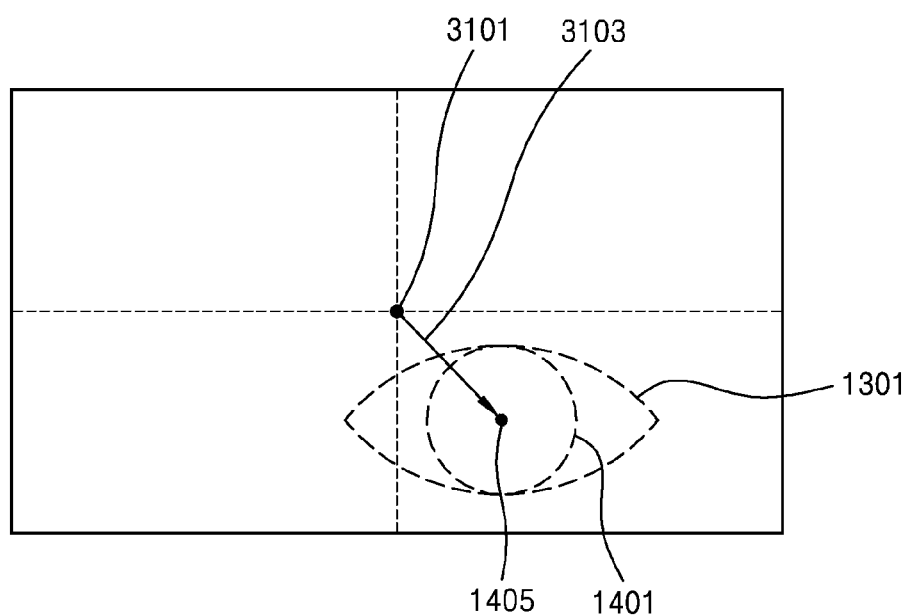
FIG. 31 is a schematic diagram for explaining a method in which wearable glasses adjust the location and the size of a display image, according to an exemplary embodiment.

FIG. 31 is a schematic diagram for explaining a method in which the wearable glasses 1000 adjust the location and the size of a display image, according to an exemplary embodiment.

FIG. 31 illustrates a first area 1301 corresponding to an eye of a user and a second area 1401 corresponding to an iris of the user, wherein the first area 1301 and the second area 1401 are determined from an eye image of the user. FIG. 31 illustrates a case in which the wearable glasses 1000 determine a movement direction and a movement distance of the wearable glasses 1000 based on a value representing the location of the iris of the user. For example, the wearable glasses 1000 may determine the location of a center 1405 of the second area 1401 corresponding to the iris of the user, as the value representing the location of the iris.

As shown in FIG. 31, the wearable glasses 1000 may compare the location 1405 of the iris determined from the eye image of the user with a pre-stored reference location 3101 of the iris and may determine at least one of the movement direction and the movement distance of the wearable glasses 1000 based on a result of the comparison. A movement of the wearable glasses 1000 may be represented by an arrow 3103 that connects the location 1405 of the iris determined from the eye image of the user to the pre-stored reference location 3101 of the iris. In this case, a direction indicated by the arrow 3103 may be the movement direction of the wearable glasses 1000, and the length of the arrow 3103 may be the movement distance of the wearable glasses 1000.

Referring back to FIG. 30, in operation S520, the wearable glasses 1000 may measure a variation in the size of a pupil of the user by using the eye image of the user.

For example, the wearable glasses 1000 may determine an area corresponding to the pupil of the user from the eye image of the user and determine a value representing the width of the area corresponding to the pupil of the user. The wearable glasses 1000 may compare the value of the area corresponding to the pupil of the user, which has been determined from the eye image of the user, with the reference value included in the reference wear state information. The wearable glasses 1000 may measure the variation in the size of the pupil of the user, based on a result of the comparison.

Figure 32:
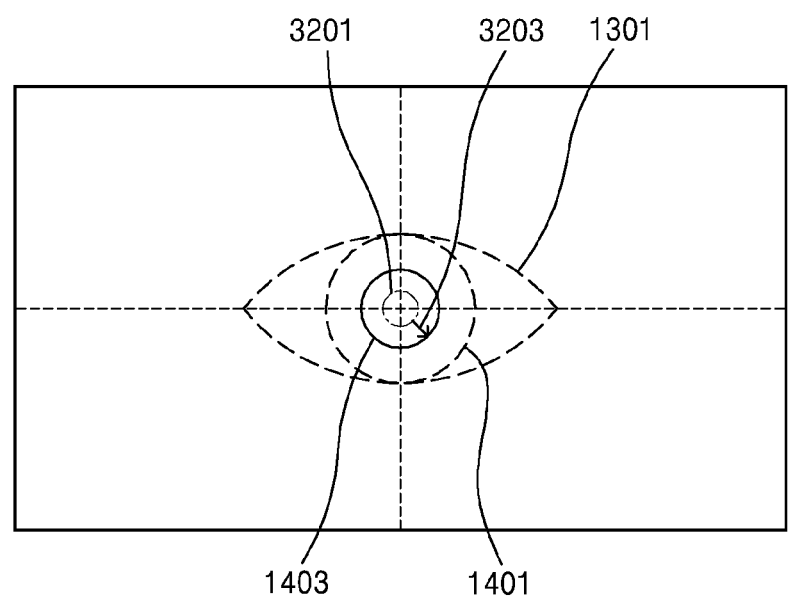
FIG. 32 is a schematic diagram for explaining a method in which wearable glasses adjust the brightness of a display image, according to an exemplary embodiment.

FIG. 32 is a schematic diagram for explaining a method in which the wearable glasses 1000 adjust the brightness of a display image, according to an exemplary embodiment.

FIG. 32 illustrates a first area 1301 corresponding to an eye of a user, a second area 1401 corresponding to an iris of the user, and a third area 1403 corresponding to a pupil of the user and included in the second area 1401, wherein the first area 1301, the second area 1401, and the third area 1403 are determined from an eye image of the user.

As shown in FIG. 32, the wearable glasses 1000 may compare the area 1403 corresponding to the iris, which has been determined from the eye image of the user, with a pre-stored area 3201 corresponding to the pupil, and may measure a variation in the size of the pupil of the user based on a result of the comparison. Referring to FIG. 32, as indicated by an arrow 3203, the size of the pupil of the user is increased.

Referring back to FIG. 30, in operation S530, the wearable glasses 1000 may adjust at least one of the location and the size of the display image, based on at least one of the movement direction and the movement distance of the wearable glasses 1000 determined in operation S510.

For example, the wearable glasses 1000 may adjust an image that is displayed on the display 1030, such that the wearable glasses 1000 are moved in a direction opposite to the movement direction of the wearable glasses 1000 and by a distance corresponding to the movement distance of the wearable glasses 1000.

When the location of the wearable glasses 1000 with respect to the user is changed, a distance from the eye of the user to the wearable glasses 1000 may vary. Accordingly, when the distance from the eye of the user to the wearable glasses 1000 changes, compared with the reference wear state, the wearable glasses 1000 may display a display image obtained by compensating for the distance change. For example, when the distance from the eye of the user to the display image is increased according to a movement of the wearable glasses 1000, the wearable glasses 1000 may display a display image of which size has been changed by a factor corresponding to the increased distance.

In operation S540, the wearable glasses 1000 may adjust the brightness of the display image, based on the variation in the size of the pupil of the user measured in operation S520.

For example, when the brightness around the wearable glasses 1000 is increased, the brightness of the image being displayed on the wearable glasses 1000 also is to be increased so that the user identifies the image being displayed on the wearable glasses 1000. When the brightness around the wearable glasses 1000 is decreased, the brightness of the image being displayed on the wearable glasses 1000 also is to be decreased in order to prevent the user from being blinded or to protect the user from discomfort.

Information about the brightness of an external environment of the wearable glasses 1000 may be directly acquired using a brightness sensor included in the wearable glasses 1000. Alternatively (or additionally), the information about the brightness of the external environment of the wearable glasses 1000 may be indirectly acquired based on a variation in the size of the pupil of the user who wears the wearable glasses 1000.

The wearable glasses 1000 may display a display image of which brightness has been adjusted based on the variation in the size of the pupil of the user. For example, when the size of the pupil of the user is increased, the wearable glasses 1000 may determine that the brightness around the wearable glasses 1000 is decreased, and thus decrease the brightness of the display image. When the size of the pupil of the user is decreased, the wearable glasses 1000 may determine that the brightness around the wearable glasses 1000 is increased, and thus increase the brightness of the display image.

As another example, the wearable glasses 1000 may provide the user with a display image of which brightness is sufficiently high enough for the user to identify an image being displayed on the wearable glasses 1000 and is still low enough for the user not to feel blinded or discomfort.

Accordingly, when the size of the pupil of the user is increased, the wearable glasses 1000 may determine that the brightness of the display image is too low, and thus increase the brightness of the display image. When the size of the pupil of the user is decreased, the wearable glasses 1000 may determine that the brightness of the display image is too high, and thus decrease the brightness of the display image.

Although FIG. 30 illustrates the case where the wearable glasses 1000 adjust a display image by taking into account both the movement of the wearable glasses 1000 and the size of the pupil of a user, it is understood that one or more other exemplary embodiments are not limited thereto. That is, the wearable glasses 1000 may be constructed or configured to adjust at least one of the location, the size, and the brightness of the display image, based on at least one of the movement of the wearable glasses 1000 and the size of the pupil of the user.

According to an exemplary embodiment, a method in which the wearable glasses 1000 display an image described above with reference to FIG. 6 may further include an operation of setting a reference wear state, before the wearable glasses 1000 are worn for a long time. The user may set, as the reference wear state, a state that is determined to be the most appropriate for the user to receive an image from the wearable glasses 1000.

According to an exemplary embodiment, a reference value may be set based on information about a body part of the user that has been acquired by the wearable glasses 1000 that is positioned at the reference location. The wearable glasses 1000 may store the reference value as the reference wear state information.

For example, when the information about the body part of the user includes an image of the eyes of the user, a property value of the eyes of the user that is measured from an eye image of the user that has been captured by the wearable glasses 1000 positioned at the reference location may be set as the reference value.

Figure 33:
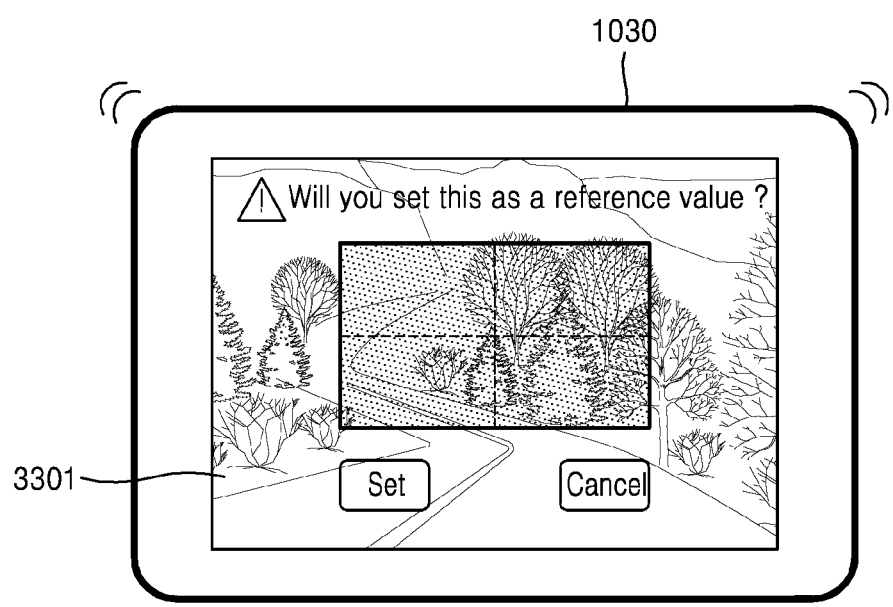
FIG. 33 is a schematic diagram for explaining a method in which wearable glasses set a reference value to adjust a display image, according to an exemplary embodiment.
Figure 33:

FIG. 33 is a schematic diagram for explaining a method in which the wearable glasses 1000 set the reference wear state, according to an exemplary embodiment.

As shown in FIG. 33, when at least a portion of the wearable glasses 1000 is touched by a user, the wearable glasses 1000 may determine that the user physically moves the wearable glasses 1000 such that the wearable glasses 1000 are positioned at the reference location.

Accordingly, the wearable glasses 1000 may determine, as reference wear state information, wear state information of the user that has been acquired by the wearable glasses 1000 at the moment when the user touch is ended or at a time corresponding thereto. The wearable glasses 1000 may update pre-stored reference wear state information with newly acquired wear state information. For example, the wearable glasses 1000 may photograph a body part of the user at the moment when the use touch ends, and store a captured image as the wear state information.

When the user unintentionally touches the wearable glasses 1000, the wearable glasses 1000 may prevent the reference wear state information from being updated. For example, when a user touch occurs on the wearable glasses 1000, the wearable glasses 1000 may output a graphical user interface (GUI) 3301 for asking the user whether to set the reference wear state information based on a current location of the wearable glasses 1000. In this case, only when the wearable glasses 1000 receive a user input of setting the reference wear state information based on the current location of the wearable glasses 1000, the wearable glasses 1000 may update the reference wear state information.

According to an exemplary embodiment, the wearable glasses 1000 may further consider an image reflected on the eyeball of the user, when adjusting an image being displayed on the display 1030 based on the inclination of the wearable glasses 1000.

A portion of the light output via the display 1030 of the wearable glasses 1000 may be absorbed by the eyeball of the user, and the user may recognize a display image from the absorbed light. The other portion of the light output via the display 1030 of the wearable glasses 1000 may be reflected by the eyeball of the user.

Figure 34:
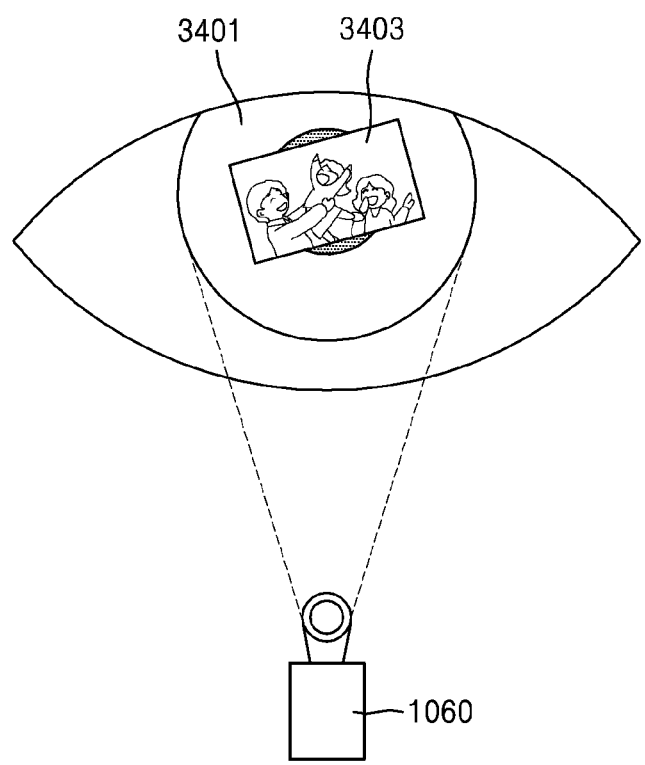
FIG. 34 is a schematic diagram for explaining a method in which wearable glasses correct a display image based on a test image that is reflected from an eye of a user, according to an exemplary embodiment.

As shown in FIG. 34, according to an exemplary embodiment, the wearable glasses 1000 adjust a display image based on an image reflected by the eyeball of a user. According to an exemplary embodiment, the wearable glasses 1000 may include the camera 1060 for photographing the eyes of the user. An eye image of the user captured by the camera 1060 may include an image 3403 reflected on an eyeball 3401 of the user.

According to an exemplary embodiment, the wearable glasses 1000 may display a test image, and adjust a display image based on a reflection image acquired by reflecting a portion of the light constituting the test image from the eyeball of a user.

Figure 35:
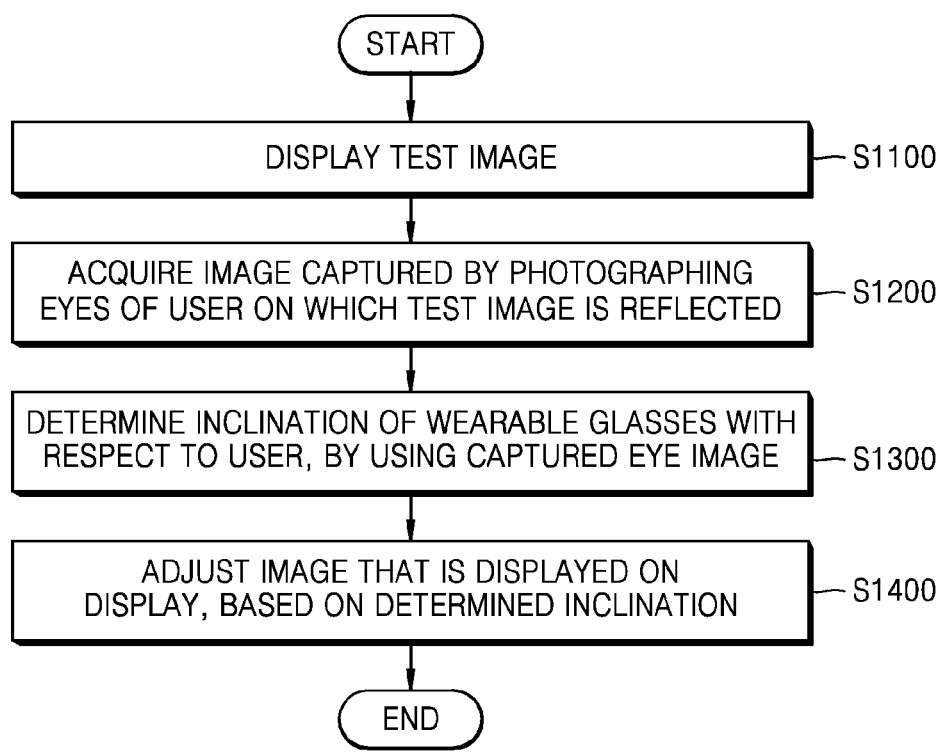
FIG. 35 is a flowchart of a method in which wearable glasses correct a display image based on a test image that is reflected from the eyes of a user, according to an exemplary embodiment.

FIG. 35 is a flowchart of a method in which the wearable glasses 1000 correct a display image based on a test image that is reflected from the eyes of a user, according to an exemplary embodiment.

Referring to FIG. 35, in operation S1100, the wearable glasses 1000 display the test image. The test image denotes an image that is used to determine an inclination of the wearable glasses 1000. For example, the test image may be an image previously determined to be used to determine the inclination, or an image that is displayed on the display 1030.

Figure 36A:
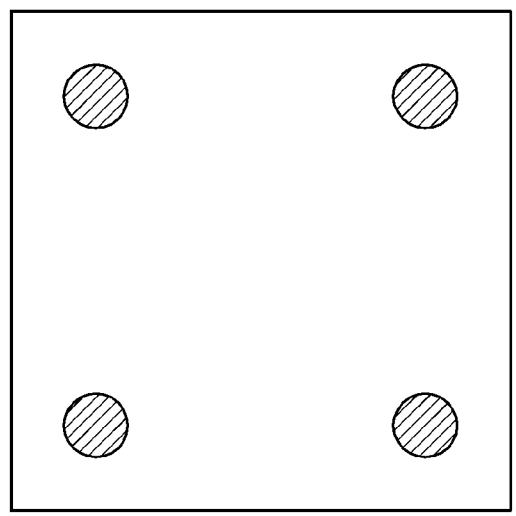
FIGS. 36A, 36B, and 36C illustrate examples of a test image, according to one or more exemplary embodiments.
Figure 36B:
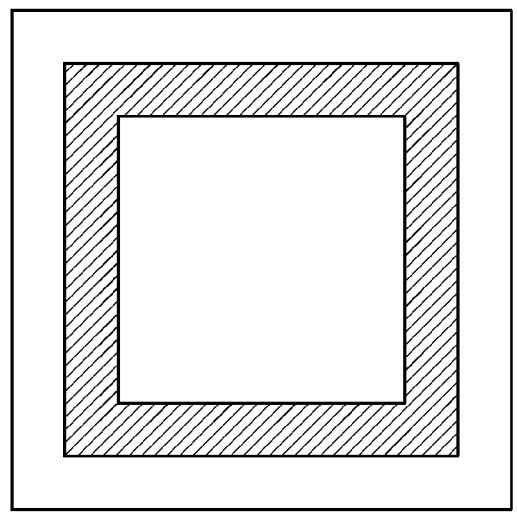
Figure 36C:
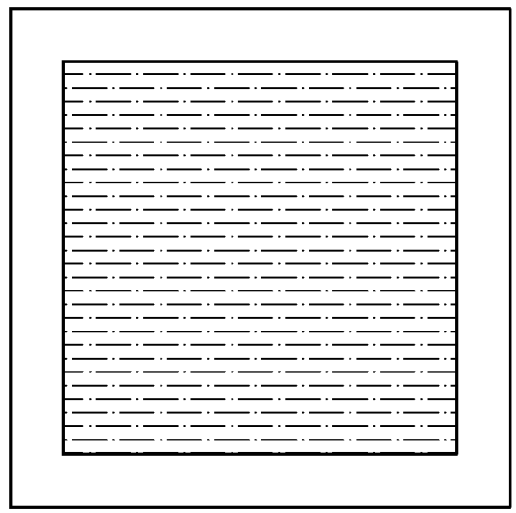

FIGS. 36A, 36B, and 36C illustrate examples of a test image, according to one or more exemplary embodiments.

As shown in FIG. 36A, the wearable glasses 1000 may display a test image including a plurality of dots.

As shown in FIG. 36B, the wearable glasses 1000 may display a test image comprised of a plurality of line segments.

As shown in FIG. 36C, the wearable glasses 1000 may display a test image including a polygon of a predetermined color.

Referring back to FIG. 35, in operation S1200, the wearable glasses 1000 acquire an image captured by photographing the eyes of the user on which the test image is reflected. The wearable glasses 1000 may acquire the eye image of the user on which the test image is reflected, as information about a state in which the user currently wears the wearable glasses 1000.

For example, the wearable glasses 1000 may output the test image for a time so short that the user cannot recognize the test image, and acquire a reflection image captured by photographing the eyes of the user on which the test image is reflected, thereby controlling an operation of the wearable glasses 1000 based on the reflection image of the test image.

Figure 37A:
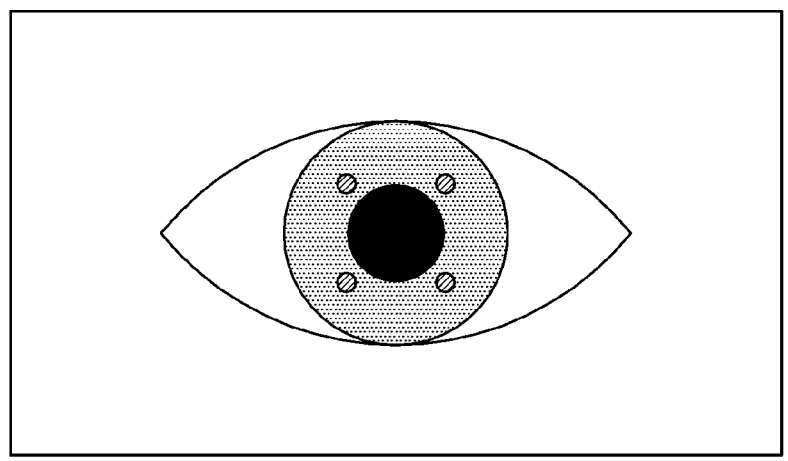
FIGS. 37A, 37B, and 37C illustrate examples of an image captured by photographing the eyes of a user on which a test image is reflected by using wearable glasses, according to one or more exemplary embodiments.
Figure 37B:
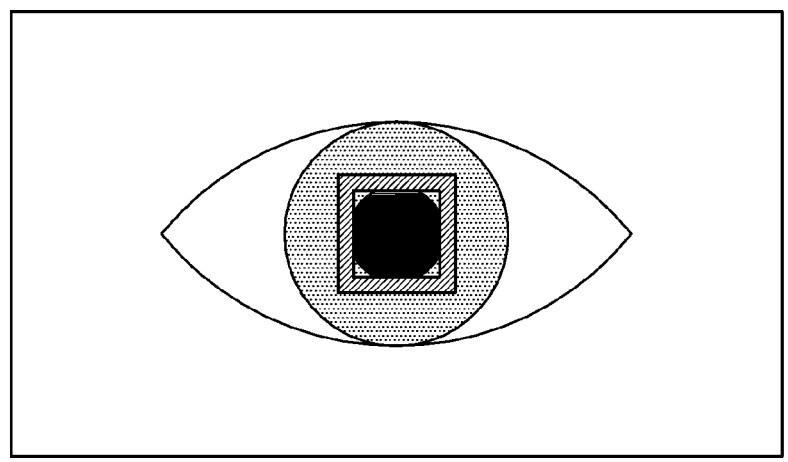
Figure 37C:
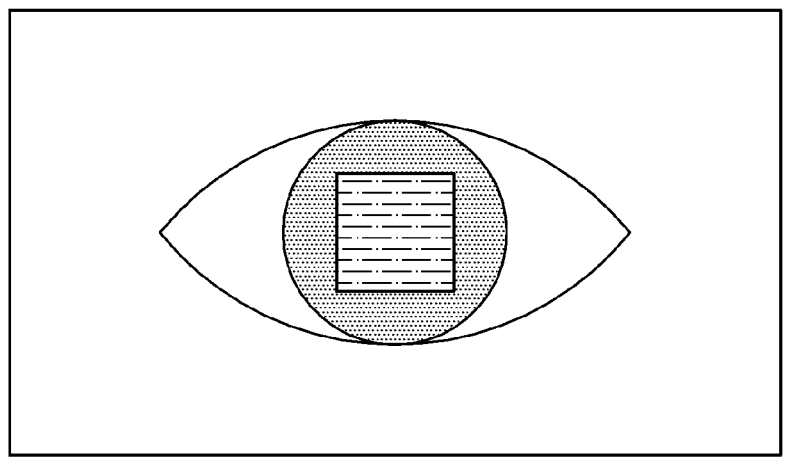

FIGS. 37A, 37B, and 37C illustrate examples of an image captured by photographing the eyes of a user on which a test image is reflected by using the wearable glasses 1000, according to one or more exemplary embodiments.

For example, when the wearable glasses 1000 output the test image of FIG. 36A, the wearable glasses 1000 may photograph the eyes of the user on which the test image of FIG. 36A is reflected, as illustrated in FIG. 37A.

As another example, when the wearable glasses 1000 output the test image of FIG. 36B, the wearable glasses 1000 may photograph the eyes of the user on which the test image of FIG. 36B is reflected, as illustrated in FIG. 37B.

As another example, when the wearable glasses 1000 output the test image of FIG. 36C, the wearable glasses 1000 may photograph the eyes of the user on which the test image of FIG. 36C is reflected, as illustrated in FIG. 37C.

The description of operation S200 of FIG. 6 may be applied to operation S1200 of FIG. 35. A redundant description of operation S1200 of FIG. 35 is omitted below.

In operation S1300, the wearable glasses 1000 may determine an inclination of the wearable glasses 1000 with respect to the user, by using the eye image of the user on which the test image is reflected.

The inclination of the wearable glasses 1000 with respect to the user denotes the degree to which the wearable glasses 1000 worn by the user are inclined as compared with the reference wear state. The wearable glasses 1000 may determine the inclination of the wearable glasses 1000 with respect to the user, by comparing the eye image of the user acquired in operation S1200 with the reference wear state information. The wearable glasses 1000 may store the reference wear state information including an image of the eyes of the user that is acquired in the reference wear state. The wearable glasses 1000 may store, as the reference wear state information, a reflection image of a test image that is included in the eye image of the user that is acquired in the reference wear state.

The wearable glasses 1000 may extract the reflection image of the test image from the eye image of the user. The wearable glasses 1000 may determine the inclination of the wearable glasses 1000, based on at least one of the size and the shape of the reflection image.

For example, the wearable glasses 1000 may determine the inclination of the wearable glasses 1000 with respect to the user, by comparing the reflection image extracted from the eye image of the user with a reference image.

For convenience of explanation, FIGS. 38, 39A, 39B, 39C, 42, 43A, 43B, 43C, 44A, and 44B illustrate cases in which the test image of FIG. 36B, which is rectangular, is displayed. However, it is understood that one or more other exemplary embodiments are not limited thereto, and various other test images may be used.

Figure 38:
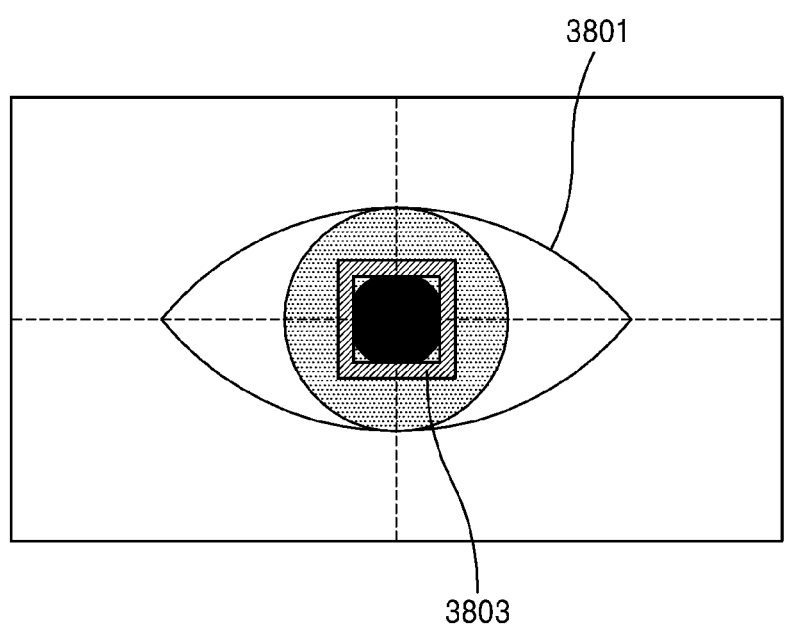
FIG. 38 illustrates an example of an eye image of a user that is acquired via wearable glasses when the wearable glasses are not inclined with respect to the user, according to an exemplary embodiment.

FIG. 38 illustrates an eye image 3801 of a user that is captured by the wearable glasses 1000 when the wearable glasses 1000 are not inclined with respect to the user, according to an exemplary embodiment.

As shown in FIG. 38, the eye image 3801 captured by the wearable glasses 1000 may include a reflection image 3803 of the test image.

For example, the wearable glasses 1000 may determine a location of the wearable glasses 1000 when the eye image 3801 of FIG. 38 is captured, as the reference location. The wearable glasses 1000 may set the eye image 3801, which is acquired when the wearable glasses 1000 are positioned at the reference location, as the reference image and may store the eye image 3801. Alternatively, the wearable glasses 1000 may set the reflection image 3803, which is acquired when the wearable glasses 1000 are positioned at the reference location, as the reference image and may store the reflection image 3803.

Figure 39A:
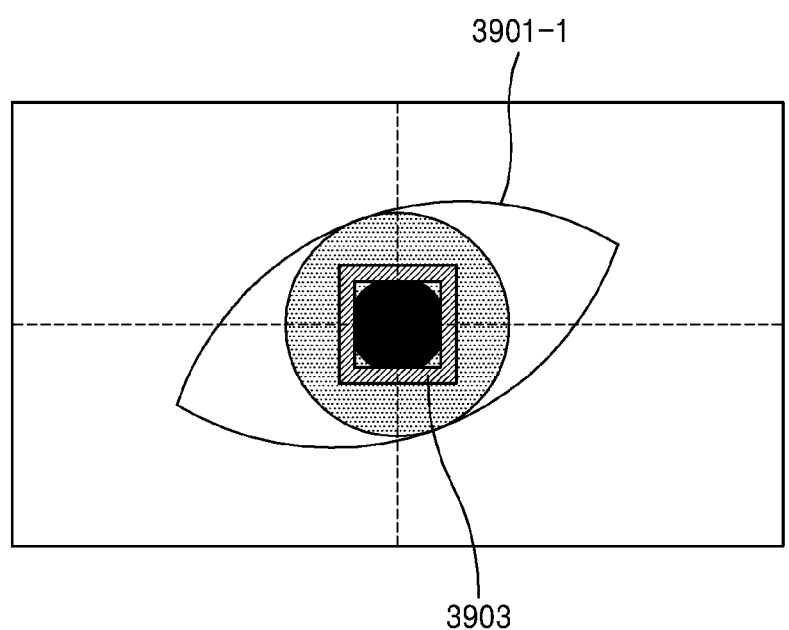
FIGS. 39A, 39B, and 39C illustrate examples of an eye image of a user that is acquired via wearable glasses when the wearable glasses are inclined with respect to the user, according to one or more exemplary embodiments.
Figure 39B:
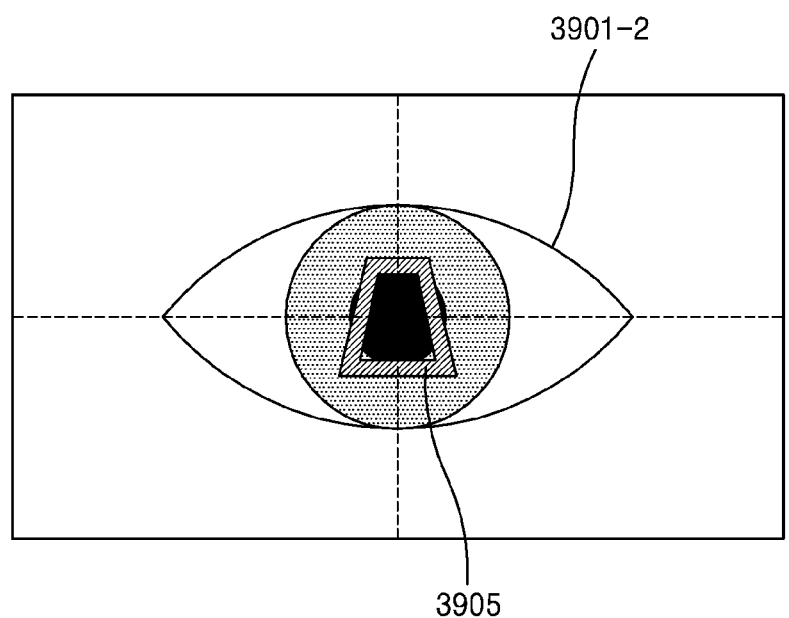
Figure 39C:
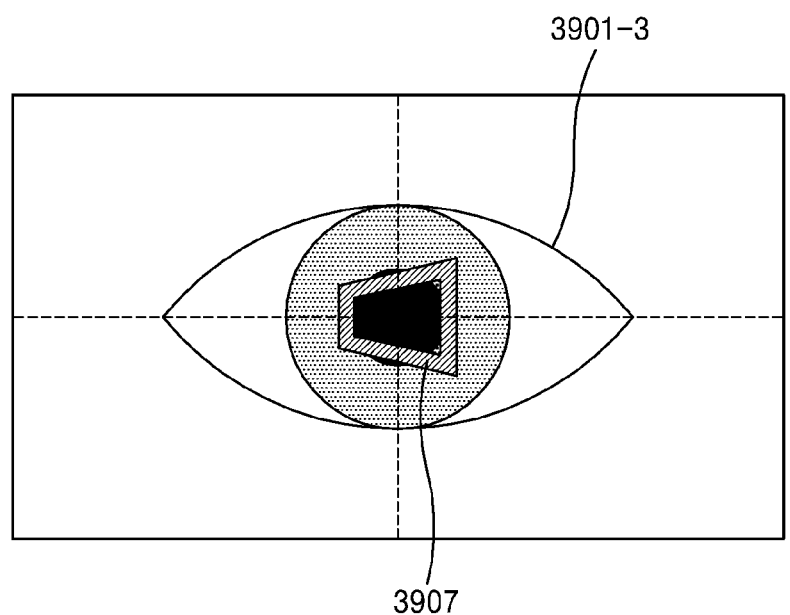

A case where the reflection image 3803 of FIG. 38 is set as the reference image will now be illustrated. FIGS. 39A, 39B, and 39C illustrate an example of an eye image of a user that is acquired via the wearable glasses 1000 when the wearable glasses 1000 are inclined with respect to the user, according to one or more exemplary embodiments.

FIG. 39A illustrates a case in which the wearable glasses 1000 are inclined top and bottom with respect to the user and thus a top-bottom inclination is measured. A shape of a reflection image 3903 of FIG. 39A is the same as that of the reflection image 3803 of FIG. 38, but an eye image 3901-1 of FIG. 39A is inclined compared with the eye image 3801 of FIG. 38. Thus, it may be seen that the location of the wearable glasses 1000 with respect to the user has changed.

FIG. 39B illustrates a case in which the wearable glasses 1000 are inclined front and back with respect to the user and thus a front-back inclination is measured. A location and a shape of an eye image 3901-2 of FIG. 39B are the same as those of the eye image 3801 of FIG. 38, but a shape of a reflection image 3905 of FIG. 39B is different from that of the reflection image 3803 of FIG. 38. Thus, it may be seen that the location of the wearable glasses 1000 with respect to the user has changed.

FIG. 39C illustrates a case in which the wearable glasses 1000 are inclined right and left with respect to the user and thus a left-right inclination is measured. A location and a shape of the eye image 3801 of FIG. 38 are the same as those of an eye image 3901-3 of FIG. 39C, but a shape of a reflection image 3907 of FIG. 39C is different from that of the reflection image 3803 of FIG. 38. Thus, it may be seen that the location of the wearable glasses 1000 with respect to the user has changed.

A method of determining an inclination of the wearable glasses 1000 with respect to a user by using an eye image of the user will be described in detail below with reference to FIGS. 40 through 42 and 43A through 43C.

Referring back to FIG. 35, in operation S1400, the wearable glasses 1000 adjust an image that is displayed on the display 1030, based on the determined inclination.

The wearable glasses 1000 may adjust at least one selected of a rotation angle, a size, and a shape of the display image, based on the inclination of the wearable glasses 1000 determined in operation S1300. However, it is understood that one or more other exemplary embodiments are not limited thereto, and the wearable glasses 1000 may adjust various parameters of a display image that is shown to a user.

For example, the wearable glasses 1000 may further adjust at least one of the brightness of the display image, a location on the display 1030 on which the display image is displayed, and the color of the display image. As another example, when the display 1030 of the wearable glasses 1000 is constructed as a semi-transparent optical waveguide (for example, a prism), the wearable glasses 1000 may adjust the location of a focal point on which light output from the projector of the display 1030 is focused, based on the inclination of the wearable glasses 1000.

Accordingly, a user who uses the wearable glasses 1000 may be provided with a nondistorted image without correcting the inclination of the wearable glasses 1000, even when the wearable glasses 1000 are inclined with respect to the user.

The description of operation S400 of FIG. 6 may be applied to operation S1400 of FIG. 35. A redundant description of operation S1400 of FIG. 35 is omitted below.

The wearable glasses 1000 may display a test image, acquire an image of the eyes of a user as wear state information, extract or obtain a reflection image of the test image from the eye image of the user, and analyze the reflection image, thereby determining the inclination of the wearable glasses 1000 with respect to the user.

In this case, the wearable glasses 1000 may acquire the eye image of the user by directly photographing the eyes of the user by using the camera included therein or by receiving an image of the eyes of the user captured by an external device from the external device.

Figure 40:
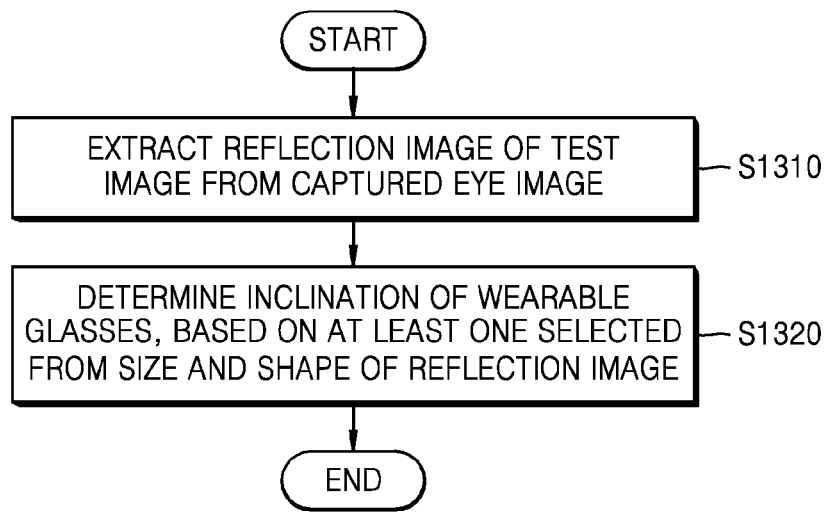
FIG. 40 is a flowchart of a method of determining an inclination of wearable glasses from an eye image of a user, according to an exemplary embodiment.

FIG. 40 is a flowchart of a method of determining an inclination of the wearable glasses 1000 from an eye image of a user, according to an exemplary embodiment.

Referring to FIG. 40, in operation S1310, the wearable glasses 1000 may extract a reflection image of a test image from the eye image.

For example, the wearable glasses 1000 may determine a first area 1301 (see FIG. 42) corresponding to an eye of the user from the eye image and determine a second area 1401 (see FIG. 42) corresponding to an iris of the user and included in the first area 1301. The wearable glasses 1000 may extract a reflection image 4205 (see FIG. 42) of the test image, based on at least one of brightness and color within the second area 1301.

In operation S1320, the wearable glasses 1000 may determine the inclination of the wearable glasses 1000, based on at least one of the size and the shape of the reflection image.

The wearable glasses 1000 may determine the inclination of the wearable glasses 1000 with respect to the user by comparing the at least one of the size and the shape of the extracted reflection image with at least one of the size and the shape of the reference image.

Figure 41:
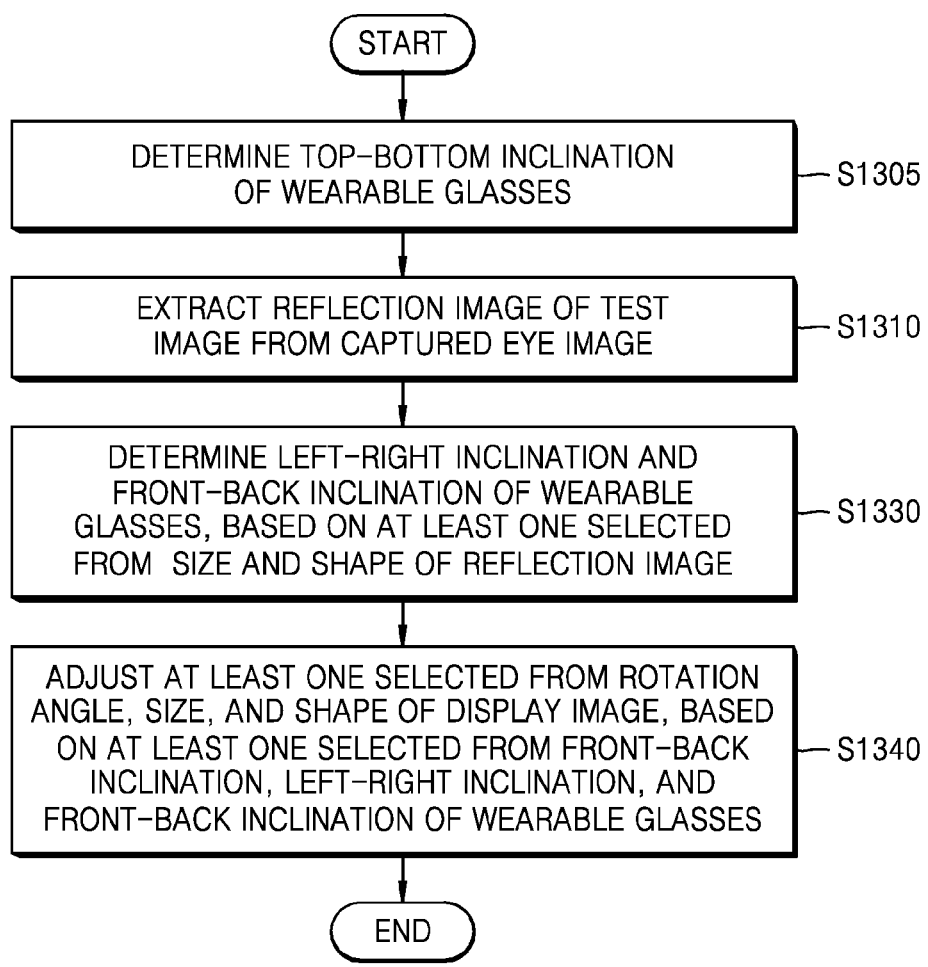
FIG. 41 is a flowchart of a method in which wearable glasses display an adjusted image obtained based on an inclination of the wearable glasses, according to an exemplary embodiment.

FIG. 41 is a flowchart of a method in which the wearable glasses 1000 display an image that has been adjusted based on the inclination of the wearable glasses 1000, according to an exemplary embodiment.

FIG. 12 illustrates the method in which the property value of the eyes is acquired by analyzing the eye image of the user and the inclination of the wearable glasses 1000 is determined based on the property value of the eyes. The method of FIG. 12 may be used to determine a top-bottom inclination of the wearable glasses 1000. Furthermore, by performing the method of FIG. 41, the wearable glasses 1000 may further consider the reflection image of the test image to thereby determine not only the top-bottom inclination of the wearable glasses 1000, but also a left-right inclination and a front-back inclination thereof with high accuracy.

In operation S1305, the wearable glasses 1000 may determine the top-bottom inclination thereof.

Figure 42:
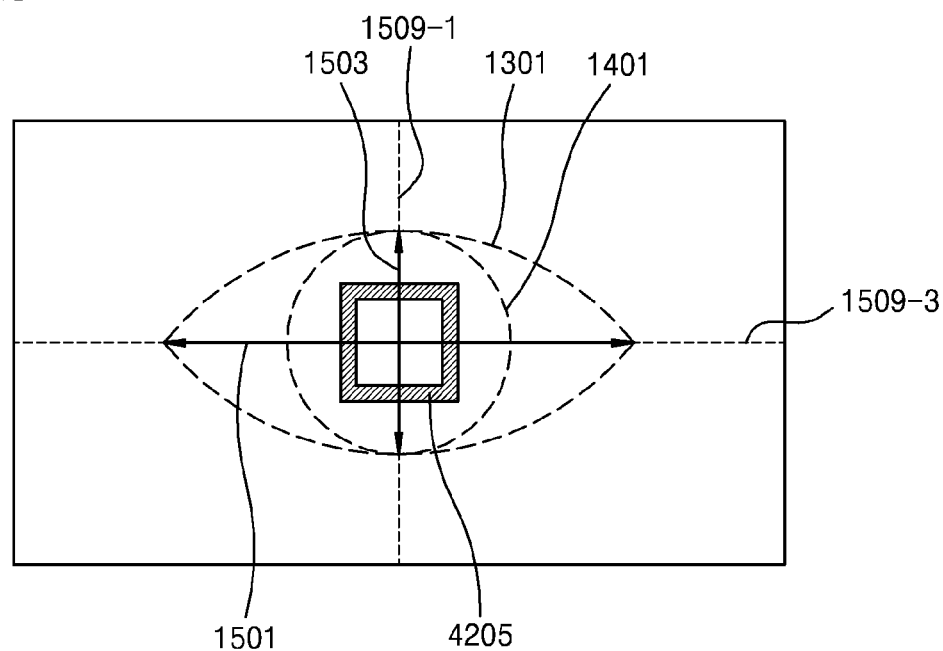
FIG. 42 is a schematic diagram for describing property values of the eyes of a user that are measured from a captured eye image of the user, according to an embodiment of the present disclosure.

FIG. 42 is a schematic diagram for describing property values of the eyes of a user that are measured from a captured eye image of the user, according to an exemplary embodiment.

As shown in FIG. 42, the wearable glasses 1000 may determine, as a major axis, a line segment 1501 that connects points at which a straight line passing through two focal points of the first area 1301, corresponding to the eye of the user, intersects with the first area 1301, and determine a length of the line segment 1501 as a length of the major axis.

The wearable glasses 1000 may determine as the minor axis a line segment 1503 that perpendicularly bisects the line segment 1501, and determine a length of the line segment 1503 as a length of the minor axis.

The wearable glasses 1000 may extract the reflection image 4205 of the test image from the second area 1401 corresponding to the iris of the user.

The wearable glasses 1000 may acquire the angle of the major axis and/or the angle of the minor axis, by comparing the angle of the major axis and/or the angle of the minor axis with a horizontal axis and/or a vertical axis of the eye image. When the reflection image is a polygon, the wearable glasses 1000 may determine an angle between at least one side of the reflection image 4205 and a horizontal axis 1509-3 or a vertical axis 1509-1 of the wearable glasses 1000, as the inclination of the wearable glasses 1000.

The wearable glasses 1000 may determine the top-bottom inclination thereof according to the method of FIG. 12. Thus, a redundant description of the determination of the top-bottom inclination is omitted below.

Referring back to FIG. 41, in operation S1310, the wearable glasses 1000 may extract a reflection image of a test image from the eye image.

In operation S1330, the wearable glasses 1000 may determine the left-right inclination and the front-back inclination of the wearable glasses 1000, based on at least one of the size and the shape of the reflection image extracted in operation S1310.

Figure 43A:
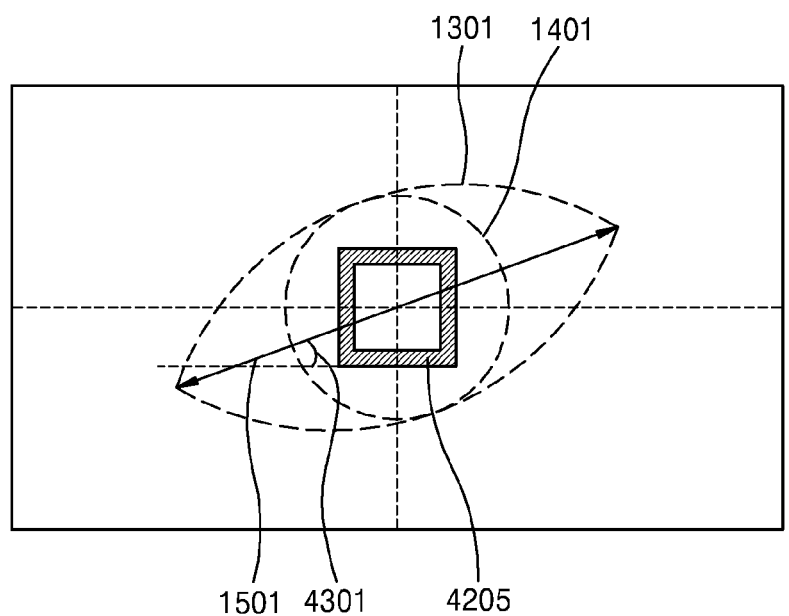
FIGS. 43A, 43B, and 43C are schematic diagrams for explaining a method in which wearable glasses determine an inclination of the wearable glasses based on a reflection image of a test image that is included in an eye image of a user, according to one or more exemplary embodiments.
Figure 43B:
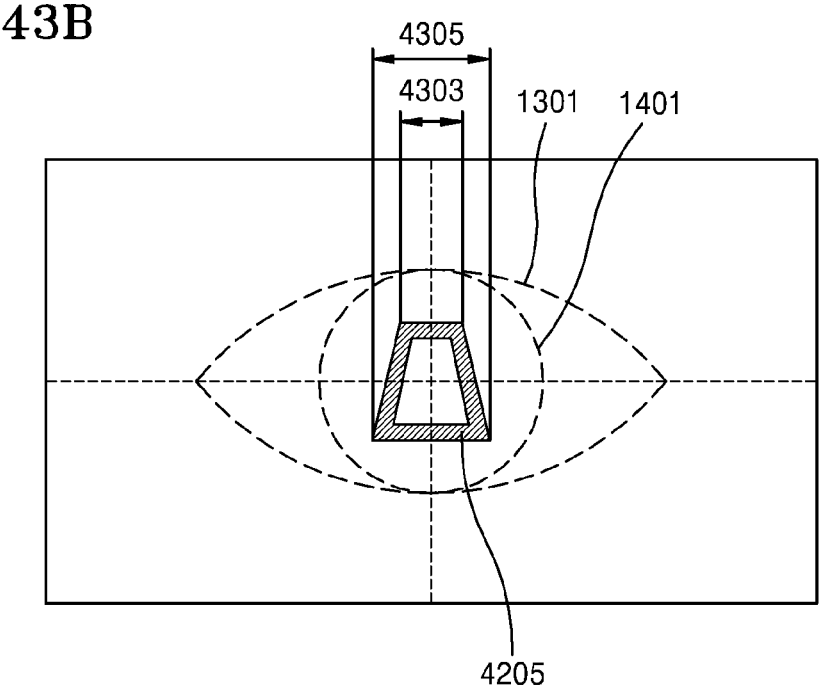
Figure 43C:
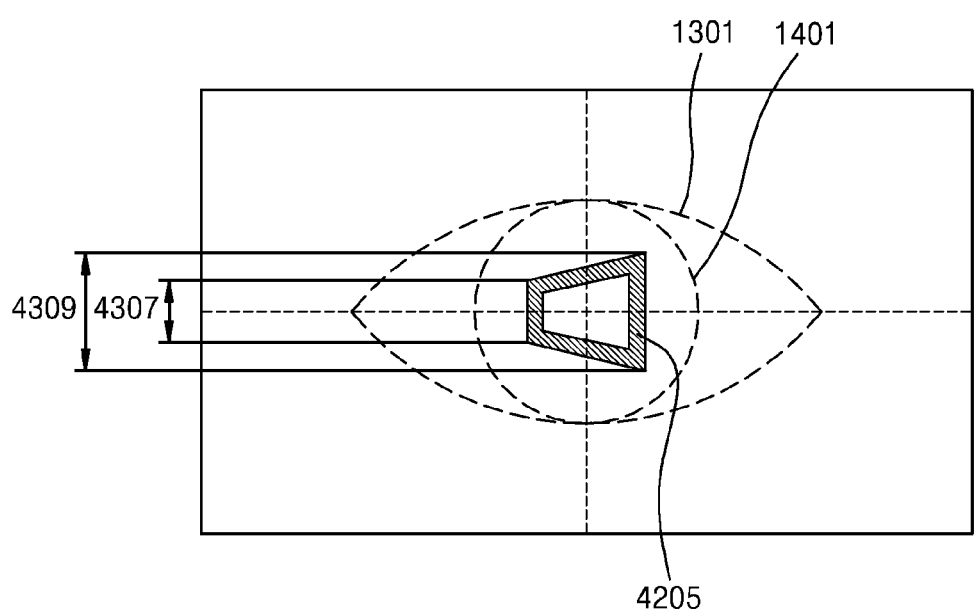

FIGS. 43A, 43B, and 43C are schematic diagrams for explaining a method in which the wearable glasses 1000 determine an inclination of the wearable glasses 1000 based on a reflection image of a test image that is included in an eye image of a user, according to one or more exemplary embodiments.

Referring to FIG. 43A, the wearable glasses 1000 may determine an angle 4301 between at least one side of the reflection image 4205 and the major axis 1501 of an eye, as the top-bottom inclination of the wearable glasses 1000.

Referring to FIG. 43B, the wearable glasses 1000 may determine the front-back inclination of the wearable glasses 1000, based on a ratio between the lengths of two sides, namely, an upper side 4303 and a lower side 4305, included in the reflection image 4205. For example, when a test image has a rectangular shape and the reflection image 4205 has a trapezoidal shape, the front-back inclination of the wearable glasses 1000 with respect to the user may be determined to increase with an increase in the ratio between the lengths of the upper side 4303 and the lower side 4305.

Referring to FIG. 43C, the wearable glasses 1000 may determine the left-right inclination of the wearable glasses 1000, based on a ratio between the lengths of two sides, namely, an upper side 4307 and a lower side 4309, included in the reflection image 4205. For example, when the test image has a rectangular shape and the reflection image 4205 has a shape of a 90°-rotated trapezoidal, the left-right inclination of the wearable glasses 1000 with respect to the user may be determined to increase with an increase in the ratio between the lengths of the upper side 4307 and the lower side 4309.

Referring back to FIG. 41, in operation S1340, the wearable glasses 1000 may adjust at least one of the rotation angle, the size, and the shape of the display image, based on at least one of the front-back inclination, the left-right inclination, and the front-back inclination of the wearable glasses 1000. However, it is understood that one or more other exemplary embodiments are not limited thereto, and the wearable glasses 1000 may adjust various parameters of a display image that is shown to a user. For example, the wearable glasses 1000 may further adjust at least one of the brightness of the display image, a location on which the display 1030 on which the display image is displayed, and the color of the display image. As another example, when the display 1030 of the wearable glasses 1000 is constructed as a semi-transparent optical waveguide (for example, a prism), the wearable glasses 1000 may adjust the location of a focal point on which light output from the projector of the display 1030 is focused, based on the inclination of the wearable glasses 1000.

The wearable glasses 1000 may perform image adjustment based on at least one of the front-back inclination, the left-right inclination, and the front-back inclination of the wearable glasses 1000 (for example, horizontal translation, vertical translation, keystoning, and/or various types of image processing in which a display image is corrected so that a user may be provided with a nondistorted image).

The wearable glasses 1000 may analyze the reflection image of the test image and use the analyzed reflection image to control an operation of the wearable glasses 1000.

Figure 44A:
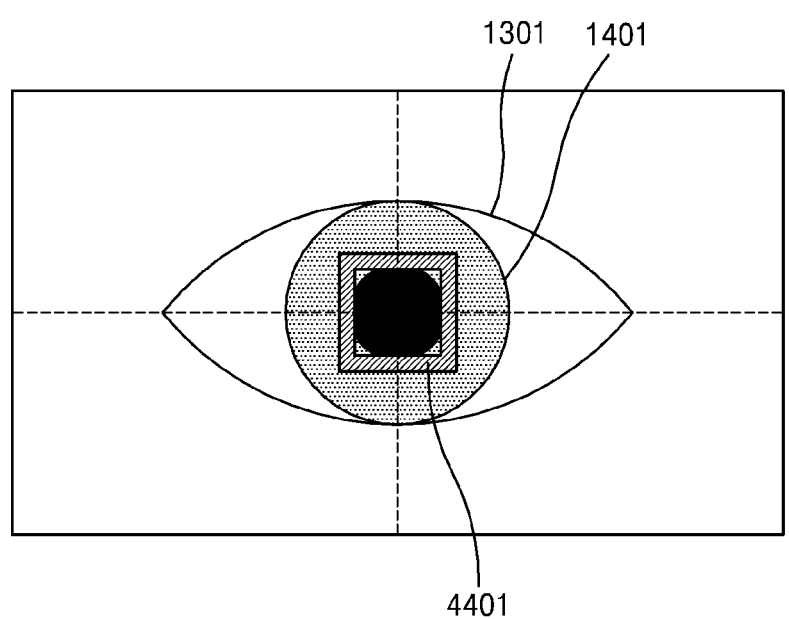
FIGS. 44A and 44B are schematic diagrams for explaining a method in which wearable glasses operate based on an eye image, according to one or more exemplary embodiments.
Figure 44B:
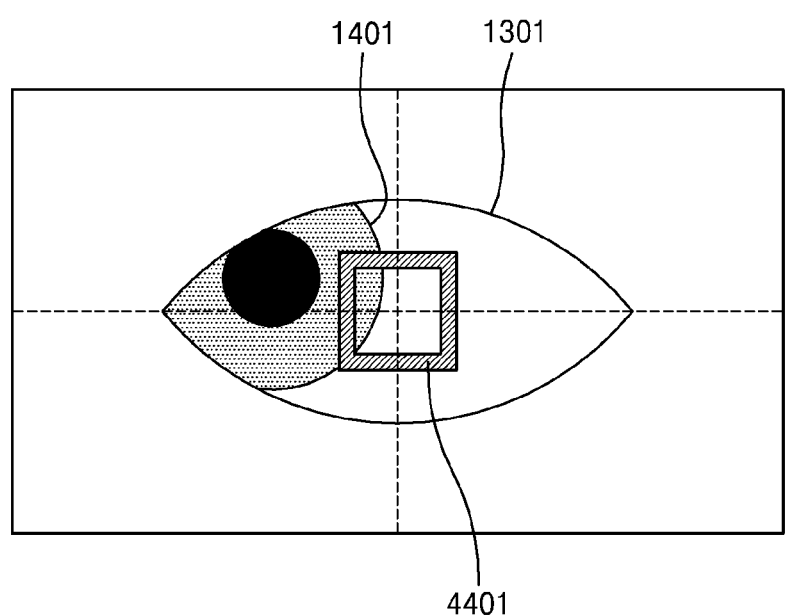

FIGS. 44A and 44B are schematic diagrams for explaining a method in which the wearable glasses 1000 operate based on an eye image, according to one or more exemplary embodiments.

As shown in FIG. 44A, the wearable glasses 1000 may determine a first area 1301 corresponding to an eye of a user and a second area 1401 corresponding to an iris of the user, from the eye image. The wearable glasses 1000 may extract a reflection image 4401 of a test image from the eye image.

As shown in FIG. 44B, when the reflection image 4401 deviates from the second area 1401, the wearable glasses 1000 may perform a predetermined operation.

For example, while the user is viewing a moving picture via the wearable glasses 1000, the user may view a place other than the display 1030 of the wearable glasses 1000.

When the user views a place other than the display 1030 of the wearable glasses 1000, the test image may be reflected on a place other than the iris of the user. When a reflection image of the test image deviates from an area corresponding to an iris of the user, the wearable glasses 1000 may stop playing back the moving picture.

The test image may be an image previously determined to be used to control an operation of the wearable glasses 1000 as shown in FIGS. 36A, 36B, and 36C, or a still image that is included in the moving picture and obtained at a certain time point.

For example, while a moving picture is being played back, the wearable glasses 1000 may output a test image for a time so short that the user cannot recognize the test image, and acquire an image of the eyes of the user on which the test image is reflected, thereby controlling an operation of the wearable glasses 1000 based on a reflection image of the test image.

According to an exemplary embodiment, the wearable glasses 1000 may adjust a display image, based on a gesture of a user. The term "gesture" may denote at least one of a shape of a body part of a user at a certain time point, a variation in the shape of the body part of the user for a certain period of time, a variation in the location of the body part, and an action of the body part.

Figure 45:
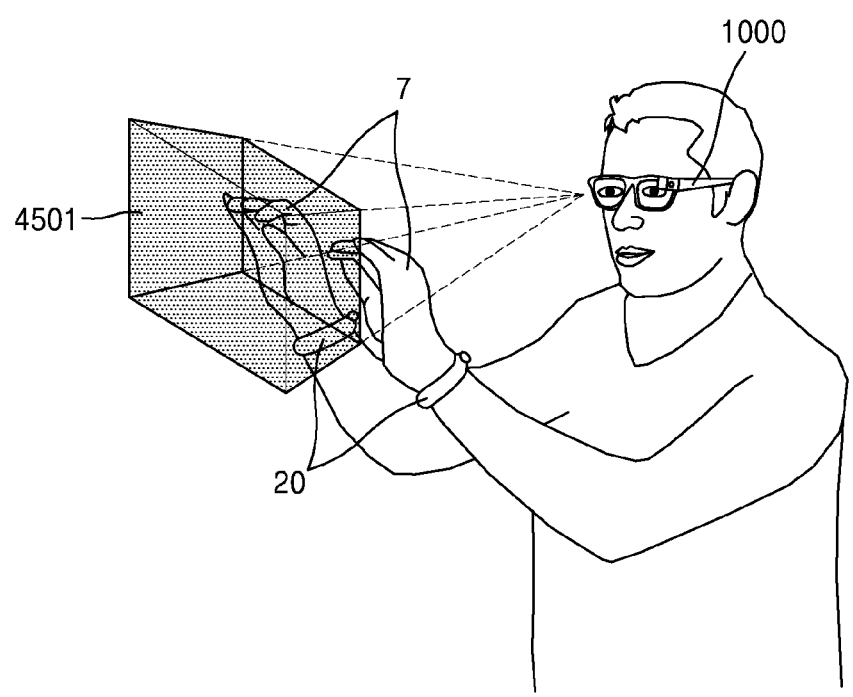
FIG. 45 is a schematic diagram for explaining a method in which wearable glasses adjust a display image based on a gesture of a user, according to an exemplary embodiment.

FIG. 45 is a schematic diagram for explaining a method in which the wearable glasses 1000 adjust a display image based on a gesture of a user, according to an exemplary embodiment.

As shown in FIG. 45, according to an exemplary embodiment, the wearable glasses 1000 may adjust a display image based on a gesture of a user within an interest space 4501.

For example, the wearable glasses 1000 may adjust the display image based on a gesture of hands 7 of the user.

To detect the gesture of the user, the wearable glasses 1000 may include a sensing unit (e.g., sensor) that includes a camera capable of acquiring an image, or various sensors. Examples of the sensors that may be included in the wearable glasses 1000 may include a depth sensor, an infrared sensor, an ultrasonic sensor, and a sensor similar thereto. For example, the wearable glasses 1000 may detect the gesture of the user, based on an image of a body part of the user or a signal received from the body part of the user (for example, an infrared signal or an ultrasonic signal). As another example, the wearable glasses 1000 may detect the gesture of the user by receiving a signal associated with the gesture of the user from wearable devices 20 worn on the wrists of the user or by detecting movements of the wearable devices 20.

Figure 46:
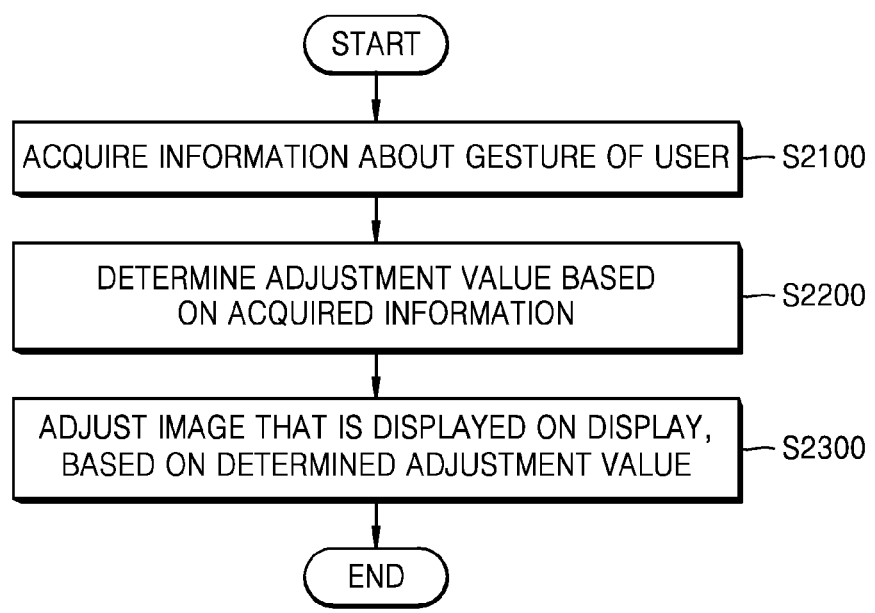
FIG. 46 is a flowchart of a method in which wearable glasses adjust a display image based on a gesture of a user, according to an exemplary embodiment.

FIG. 46 is a flowchart of a method in which the wearable glasses 1000 adjust a display image based on a gesture of a user, according to an exemplary embodiment.

Referring to FIG. 46, in operation S2100, the wearable glasses 1000 may acquire information about the gesture of the user.

The wearable glasses 1000 may acquire the information about the gesture of the user by using the sensing unit included in the wearable glasses 1000 or acquire the information about the gesture of the user from an external device. For example, the wearable glasses 1000 may acquire the information about the gesture of the user by using at least one of a magnetic sensor, an acceleration sensor, a gyroscope sensor, a proximity sensor, an optical sensor, a depth sensor, an infrared sensor, an ultrasonic sensor, or the like, which is included in the wearable glasses 1000. Alternatively, the wearable glasses 1000 may acquire information about a touch gesture of the user that is received via the user input unit 1040 included in the wearable glasses 1000.

When the wearable glasses 1000 are initialized or the power of the wearable glasses 1000 is turned on, the wearable glasses 1000 may acquire information about a gesture of the user that is used to compensate for an inclination of the wearable glasses 1000. Alternatively, when the wearable glasses 1000 receive an input of a user who wants to receive an image to which the inclination of has been compensated for, the wearable glasses 1000 may acquire the information about the gesture of the user.

Alternatively, when the wearable glasses 1000 greatly move, the wearable glasses 1000 may determine that the location of the wearable glasses 1000 with respect to the user is highly likely to be changed. Thus, when at least one of movement state values of the wearable glasses 1000, for example, an acceleration value, a velocity value, and an angular momentum value, is measured and equal to or greater than a critical (e.g., predetermined) value, the wearable glasses 1000 may acquire the information about the gesture of the user.

For example, the information about the gesture of the user acquired by the wearable glasses 1000 may be at least one of a degree of a change in the location of a body part that takes a gesture, a degree of a change in the shape thereof, and a duration time of a movement of the user.

The information about the gesture of the user may be information that is used to determine an adjustment value for adjusting a display image. For example, the information about the gesture acquired by the wearable glasses 1000 may include information about at least one of the head, the hands, the eyes, and the mouth of the user. The information about the gesture acquired by the wearable glasses 1000 may also include an image of the body part that takes the gesture. Alternatively, the information about the gesture of the user may include information about a touch input of the user that is received via the user input unit 1040.

For example, the wearable glasses 1000 may acquire the information about the gesture based on an image of the hands of the user. The wearable glasses 1000 may acquire the image of the hands and detect a change in at least one of palms, knuckles, and fingertips of the hands from the acquired hand image.

As another example, the wearable glasses 1000 may detect a gesture based on a predetermined signal received from the hands. The wearable glasses 1000 may transmit a predetermined signal to the hands and acquire the information about the gesture based on a signal reflected from the hands in response to the transmitted signal. For example, the predetermined signal may be an infrared signal or an ultrasonic signal. The wearable glasses 1000 may detect a change in at least one of palms, knuckles, and fingertips of the hands from a predetermined signal received from a target object.

As another example, the information about the gesture of the user may include information about a user input that is received via the user input unit 1040. For example, the user input may include an input of touching a touch pad, an input of rotating a wheel, or an input of pushing a button. The wearable glasses 1000 may acquire information about a touch input of the user that is received via the user input unit 1040 included in the wearable glasses 1000, as the information about the gesture of the user. For example, the wearable glasses 1000 may include a touch pad as the user input unit 120.

A method of acquiring the information about the gesture of the user will be described in more detail later with reference to FIGS. 47 through 49.

In operation S2200, the wearable glasses 1000 may determine an adjustment value based on the acquired information.

The adjustment value is used to adjust a display image. The adjustment value may be a value for adjusting at least one of the rotation angle, the size, and the shape of the display image. Alternatively, the adjustment value may be a value for adjusting the brightness of the display image, a location on the display 1030 where the display image is displayed, or a color of the display image. Alternatively, when the display 1030 of the wearable glasses 1000 is constructed as a semi-transparent optical waveguide (for example, a prism), the adjustment value may be the location of a focal point on which light output from the projector of the display 1030 of the wearable glasses 1000 is focused.

The wearable glasses 1000 may map information about several gestures with adjustment values and store a result of the mapping, or store relations capable of calculating the adjustment values based on the information about the gestures. The wearable glasses 1000 may determine the adjustment value by searching for a pre-stored adjustment value based on the acquired information, or by calculating the adjustment value by using a found relation.

In operation S2300, the wearable glasses 1000 may adjust an image that is displayed on the display 1030, based on the determined adjustment value.

First, the wearable glasses 1000 may adjust at least one of a rotation angle, a size, and a shape of the image being displayed on the display 1030, based on the determined adjustment value. Alternatively, the wearable glasses 1000 may adjust at least one of a brightness of the image being displayed on the display 1030, a location on the display 1030 on which the image is displayed, and a color of the image being displayed on the display 1030, based on the determined adjustment value.

Alternatively, when the display 1030 of the wearable glasses 1000 is constructed as a semi-transparent optical waveguide (for example, a prism), the wearable glasses 1000 may adjust the location of a focal point on which light output from the projector of the display 1030 is focused, based on the inclination of the wearable glasses 1000.

The wearable glasses 1000 may perform image adjustment based on the adjustment value (for example, horizontal translation, vertical translation, keystoning, and/or various types of image processing in which a display image is corrected so that a user may be provided with a nondistorted image).

For example, when the display 1030 of the wearable glasses 1000 is constructed as a semi-transparent optical waveguide (for example, a prism), the wearable glasses 1000 may adjust the location of a focal point on which light output from the projector of the display 1030 is focused, based on the inclination of the wearable glasses 1000.

Next, the wearable glasses 1000 may display an adjusted image. The description of operation S400 of FIG. 6 may be applied to operation S2300 of FIG. 46, and thus a repeated description of operation S2300 of FIG. 46 will be omitted.

When the gesture of the user is used to adjust an image that is displayed via the wearable glasses 1000, an operation of acquiring information about the gesture of the user may be continuously performed at regular time intervals. For example, to acquire the information about the gesture of the user, the wearable glasses 1000 may photograph a body part that takes the gesture, at predetermined time intervals, and analyze captured images.

However, continuously acquiring the information about the gesture of the user may cause overload of a memory capacity and overload of the number of calculations performed by a processor. Accordingly, according to an exemplary embodiment, the wearable glasses 1000 may be constructed to acquire the information about the gesture of the user only when a predetermined event has occurred.

Figure 47:
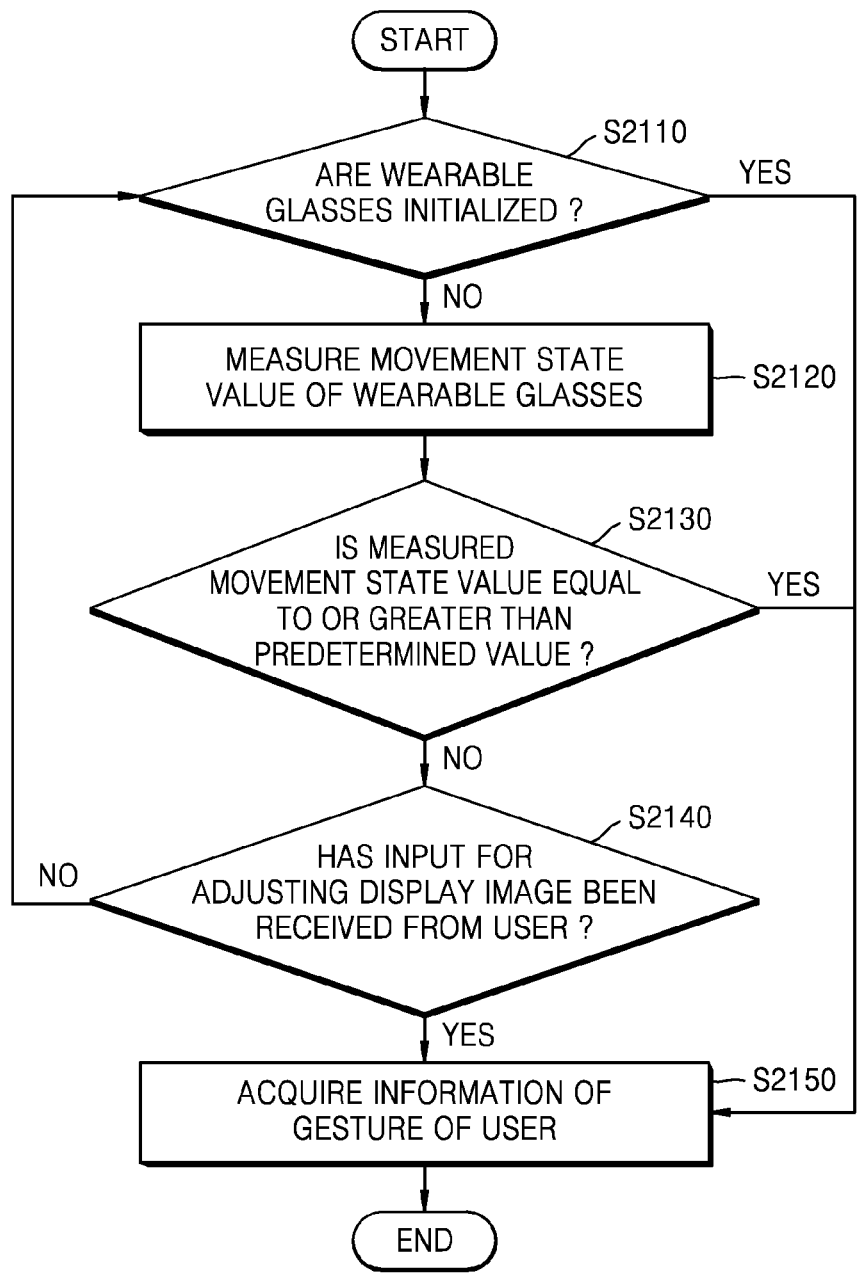
FIG. 47 is a flowchart of a method in which wearable glasses acquire information about a gesture of a user, according to an exemplary embodiment.

FIG. 47 is a flowchart of a method in which the wearable glasses 1000 acquire information about a gesture of a user, according to an exemplary embodiment.

The information about the gesture of the user may be information that is used to determine an adjustment value for adjusting a display image. For example, the information about the gesture may include an image of a body part that takes the gesture.

In operation S2110, the wearable glasses 1000 may determine whether the wearable glasses 1000 are initialized. For example, when the power of the wearable glasses 1000 is turned on or an initialization input for initializing the wearable glasses 1000 is received from the user, the wearable glasses 1000 may be initialized.

When the wearable glasses 1000 are initialized, the wearable glasses 1000 may acquire the information about the gesture of the user, in operation S2150. When the wearable glasses 1000 are not initialized (e.g., when the wearable glasses 1000 are continuously working), the wearable glasses 1000 may acquire the information about the gesture of the user based on a movement state value of the wearable glasses 1000 by performing operation S2120.

In operation S2120, the wearable glasses 1000 may measure the movement state value of the wearable glasses 1000. The movement state value denotes a value representing a movement of the wearable glasses 1000.

For example, the wearable glasses 1000 may measure at least one of an acceleration value, a velocity value, and an angular momentum value of the wearable glasses 1000, as the movement state value. In operation S2130, the wearable glasses 1000 may determine whether the measured movement state value is equal to or greater than a predetermined value. When the measured movement state value is equal to or greater than the predetermined value, the wearable glasses 1000 may acquire the information about the gesture of the user, in operation S2150. When the measured movement state value of the wearable glasses 1000 is less than the predetermined value, the wearable glasses 1000 may acquire the information about the gesture of the user based on a user input by performing operation S2140.

However, it is understood that one or more other exemplary embodiments are not limited to operation S2130 of FIG. 47. The wearable glasses 1000 may determine not only whether the movement state value is equal to or greater than the predetermined value, but also whether the movement state value is less than or equal to the predetermined value or whether the movement state value is less than the predetermined value. In other words, the wearable glasses 1000 may compare the movement state value with the predetermined value and determine whether to acquire the information about the gesture of the user based on a result of the comparison.

In operation S2140, the wearable glasses 1000 determine whether an input for adjusting a display image has been received from the user. When a distorted image is provided due to a change in the location of the wearable glasses 1000, the user may input to the wearable glasses 1000 a command for adjusting the display image based on the gesture of the user.

The wearable glasses 1000 determine whether the user input for adjusting the display image has been received, in operation S2140. When the user input for adjusting the display image has been received, the wearable glasses 1000 may acquire the information about the gesture of the user, in operation S2150. When the user input for adjusting the display image is not received, the wearable glasses 1000 may repeat operations S2110 to S2140.

In operation S2150, the wearable glasses 1000 may acquire the information about the gesture of the user. For example, when the information about the gesture of the user is an image of the gesture, the wearable glasses 1000 may output a guide image for inducing the gesture of the user.

The wearable glasses 1000 guide the user to take a gesture for adjusting a display image by outputting the guide image, thereby determining the adjustment value for adjusting the display image based on the gesture of the user.

Figure 48:
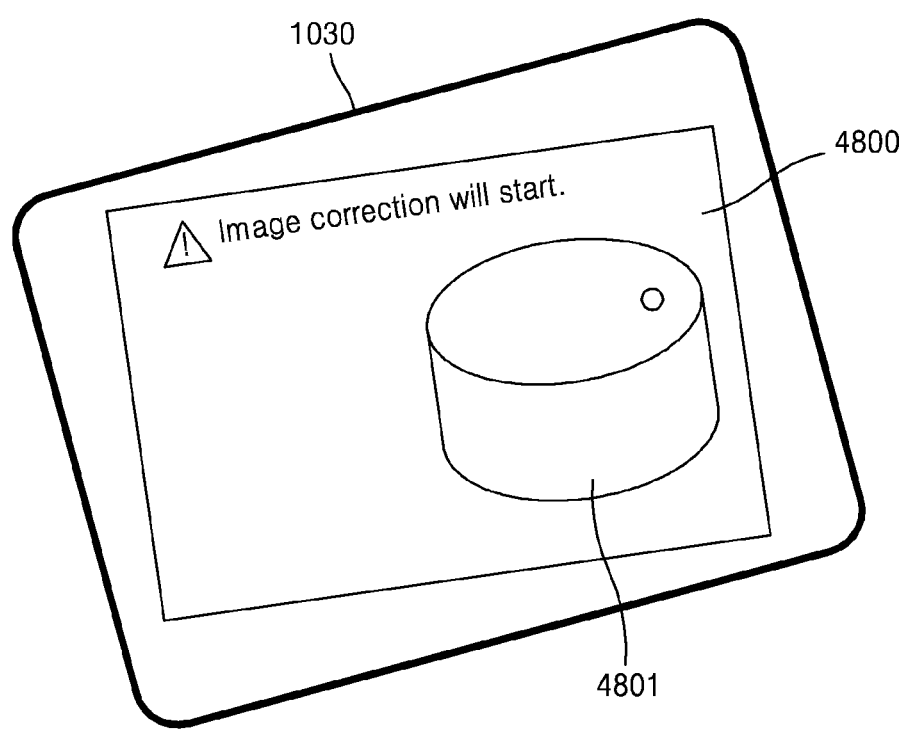
FIGS. 48 and 49 illustrate examples of a screen of wearable glasses on which a guide image for inducing a gesture of a user is displayed, according to one or more exemplary embodiments.
Figure 49:
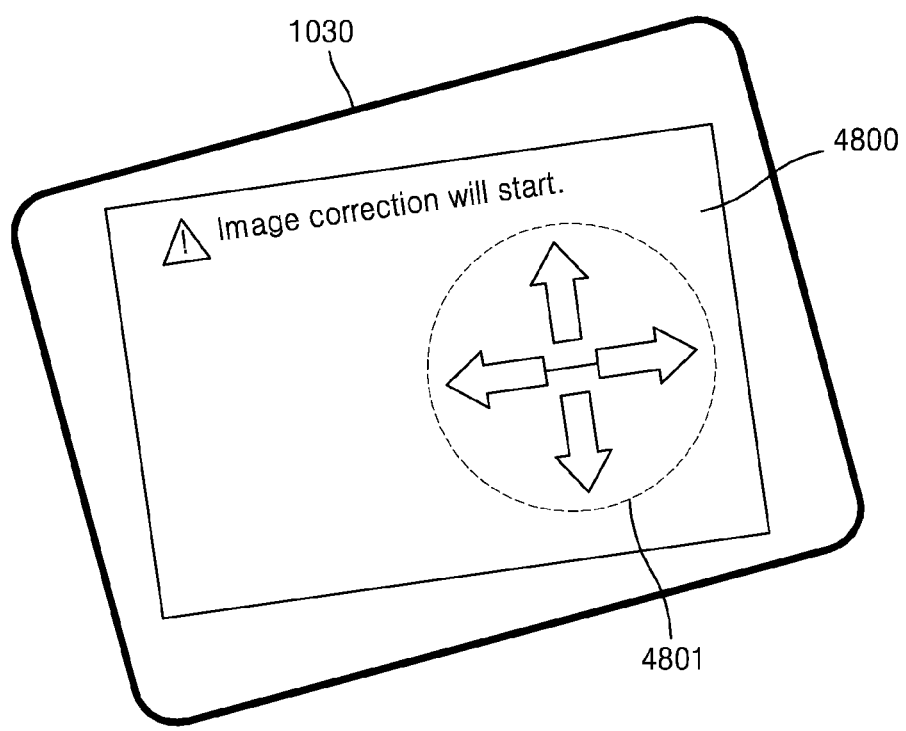

FIGS. 48 and 49 illustrate examples of a screen of the wearable glasses 1000 on which a guide image for inducing a gesture of a user is displayed, according to one or more exemplary embodiments.

As shown in FIGS. 48 and 49, a guide image 4800 displayed via the wearable glasses 1000 may include a virtual input interface 4801 for inducing the gesture of the user.

The virtual input interface 4801 may be of a button type or a type representing a physical switch (for example, a toggle switch, a rotary switch, or a tumbler switch), and various modifications may be implemented as to the type of virtual input interface 4801.

The user may take (e.g., make) gestures according to the types of virtual input interface 4801 that is provided via the display 1030 of the wearable glasses 1000.

For example, when the user is provided with the guide image 4800 of FIG. 48, the user may take a gesture of rotating the virtual input interface 4801 with the hands of the user. When the user is provided with the guide image 4800 of FIG. 49, the user may take a gesture of pressing at least one arrow-shaped button included in the virtual input interface 4801 with the hands of the user.

Figure 52:
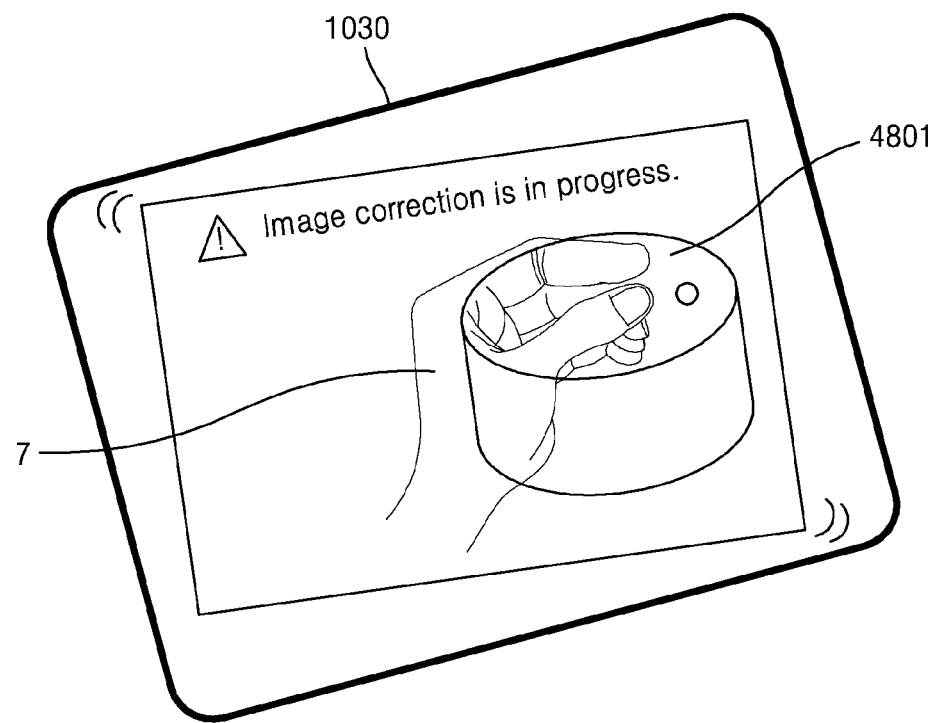
FIGS. 52, 53, and 54 are schematic diagrams for explaining a method in which wearable glasses determine an adjustment value for adjusting a display image based on a gesture of a user, according to an exemplary embodiment.
Figure 52:
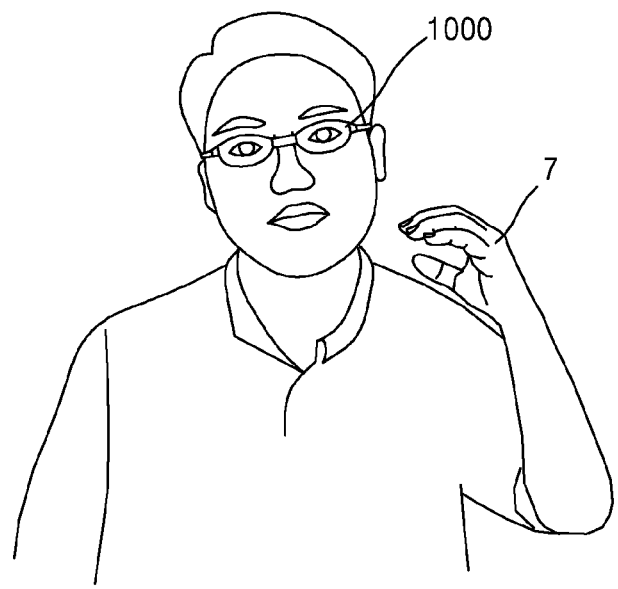
Figure 53:
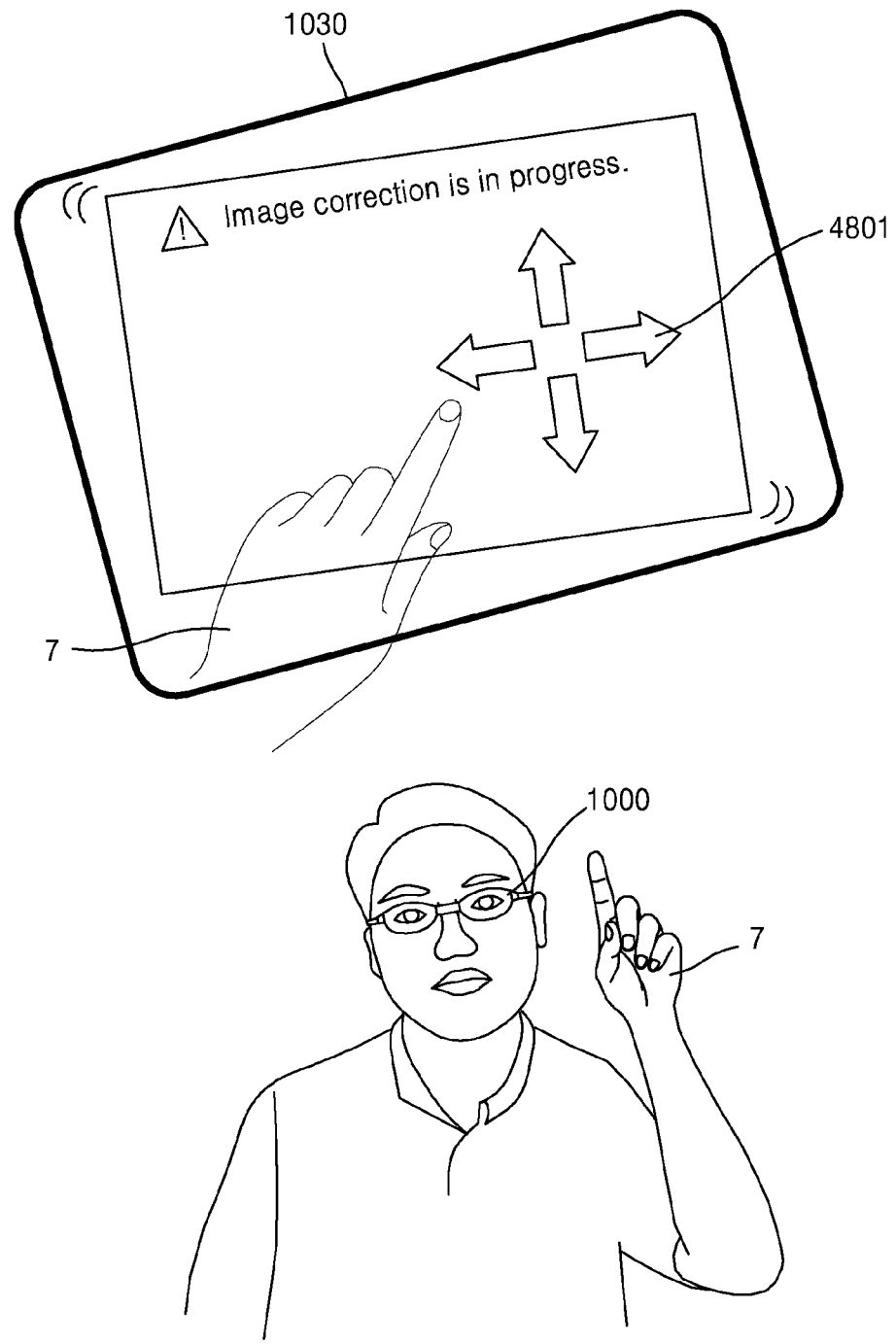
Figure 54:
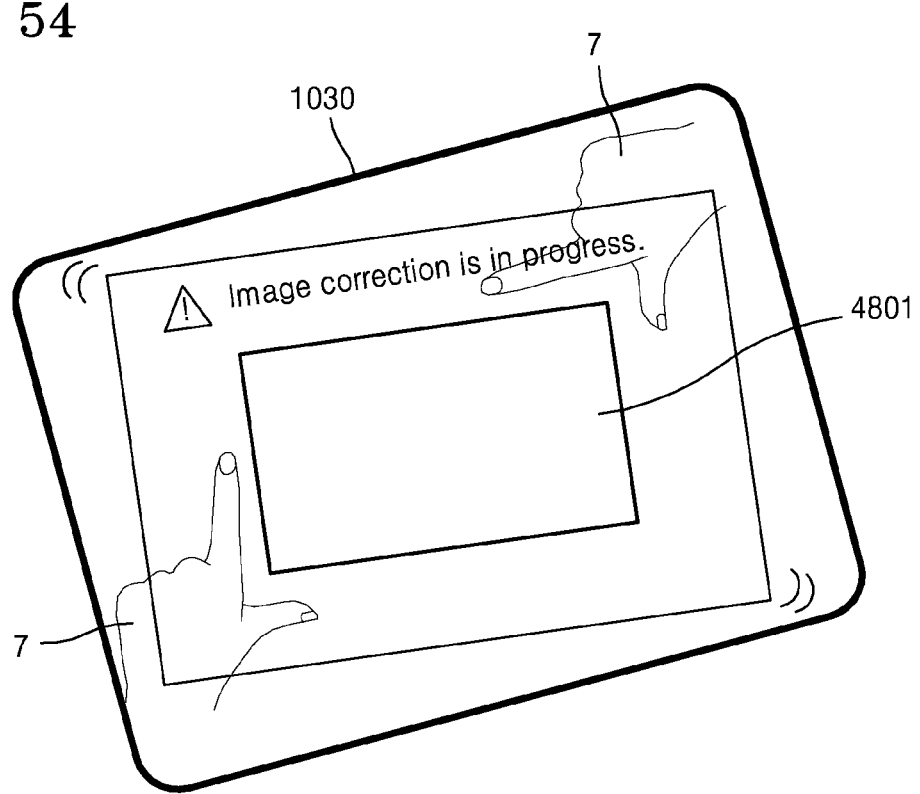
Figure 54:
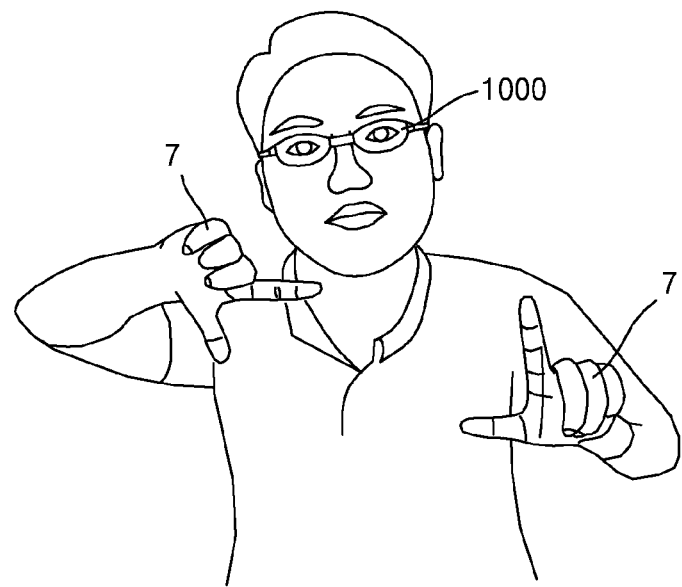

In operation S1150, the wearable glasses 1000 photograph the gesture of the user. FIGS. 52 through 54 illustrate examples of an image of a gesture of a user that is acquired via the wearable glasses 1000, according to one or more exemplary embodiments.

The wearable glasses 1000 may determine an adjustment value for adjusting a display image, based on information about a gesture of a user. For example, the wearable glasses 1000 may acquire an image of the gesture of the user and analyze the image of the gesture to thereby determine the adjustment value.

A case of determining an adjustment value by analyzing an image of a gesture of the hands of a user will now be illustrated. However, it is understood that one or more other exemplary embodiments are not limited thereto, and the wearable glasses 1000 may adjust a display image by using a gesture of a body part of a user other than the hands of the user.

Figure 50:
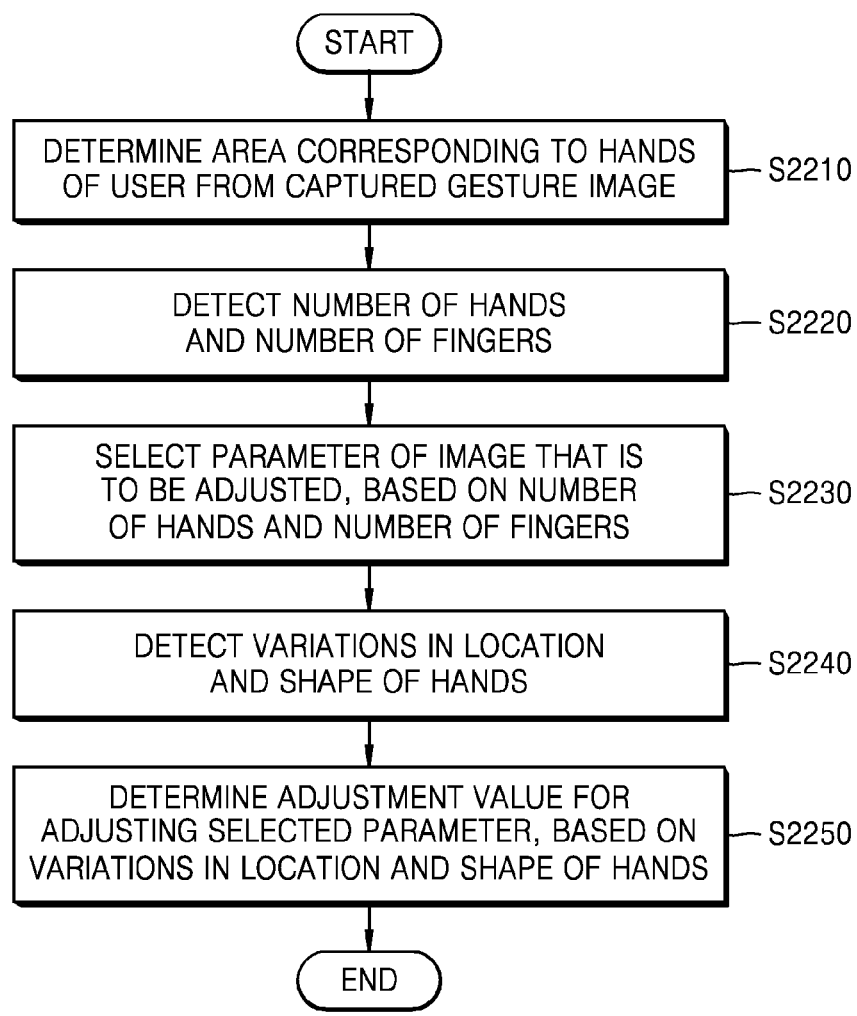
FIG. 50 is a flowchart of a method in which wearable glasses determine an adjustment value from a gesture image of a user, according to an exemplary embodiment.

FIG. 50 is a flowchart of a method in which the wearable glasses 1000 determine an adjustment value from a gesture image of a user, according to an exemplary embodiment.

Referring to FIG. 50, in operation S2210, the wearable glasses 1000 may determine an area corresponding to the hands of the user from the gesture image.

Figure 51:
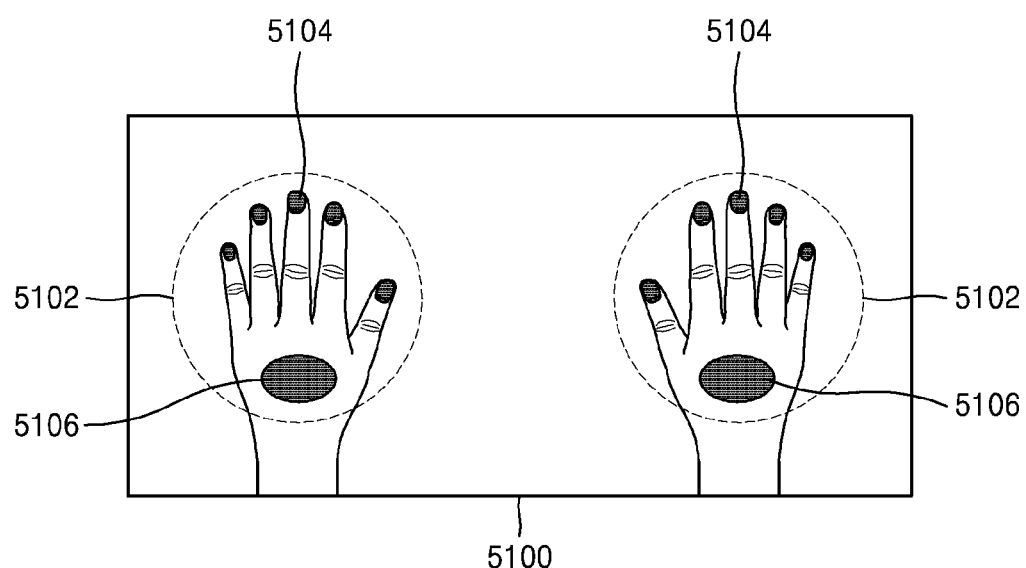
FIG. 51 is a schematic diagram for explaining a method in which wearable glasses detect a hand gesture of a user, according to an exemplary embodiment.

FIG. 51 is a schematic diagram for explaining a method in which the wearable glasses 1000 detect a hand gesture of a user, according to an exemplary embodiment.

As shown in FIG. 51, the wearable glasses 1000 may acquire an image 5100 of the hands of a user that are located within an interest space existing with a predetermined distance from the wearable glasses 1000, and detect a gesture of the hands from the acquired image 5100.

For example, the wearable glasses 1000 may estimate areas 5102 corresponding to the hands of the user from the image 5100.

In operation S2220, the wearable glasses 1000 may detect the number of hands and the number of fingers.

Referring to FIG. 51, the wearable glasses 1000 may analyze the areas 5102 corresponding to the hands of the user to thereby further detect areas 5104 corresponding to fingertips and areas 5106 corresponding to the backs of the hands, which are included in the areas 5102 corresponding to the hands. However, it is understood that one or more other exemplary embodiments are not limited to the backs of the hands, and the wearable glasses 1000 may detect an area corresponding to at least a portion of a hand (for example, a palm or a wrist).

The wearable glasses 1000 may detect the number of hands that exist within the interest space and the number of fingers that exist within the interest space, based on a detected area.

In operation S2230, the wearable glasses 1000 may select a parameter of an image that is to be adjusted, based on the number of hands and the number of fingers. The wearable glasses 1000 may determine the type of gesture of the hands of the user, based on the number of hands and the number of fingers.

The wearable glasses 1000 may determine the parameter of the image to be adjusted, based on the determined type of the gesture. The parameter of the image to be adjusted may include at least one of the size, the shape, and the rotation angle of the image to be adjusted. In other words, the wearable glasses 1000 may determine which parameter from among the size, location, shape, and rotation angle of a display image is to be adjusted, based on the determined type of the gesture. However, the parameter of the image to be adjusted is not limited thereto in one or more other exemplary embodiments.

For example, the parameter of the image to be adjusted may be a parameter associated with a location on the display 1030 where the image to be adjusted is displayed, or a color of the image to be adjusted. Alternatively, when the display 1030 of the wearable glasses 1000 is constructed as a semi-transparent optical waveguide (for example, a prism), the parameter of the image to be adjusted may be the location of a focal point on which light output from the projector of the display 1030 of the wearable glasses 1000 is focused.

In operation S2240, the wearable glasses 1000 may detect variations in the location and shape of the hands.

For example, the wearable glasses 1000 may detect movements (for example, distances or angles of movements) of the areas 5104 corresponding to the fingertips with respect to the areas 5106 corresponding to the backs of the hands.

For example, the wearable glasses 1000 may detect an operation of a user bending a finger, by detecting that the areas 5104 corresponding to the fingertips and the areas 5106 corresponding to the backs of the hands become closer to each other. Alternatively, the wearable glasses 1000 may detect an operation of a user unbending a finger, by detecting that the areas 5104 corresponding to the fingertips and the areas 5106 corresponding to the backs of the hands become farther to each other.

In operation S2250, the wearable glasses 1000 may determine an adjustment value for adjusting the selected parameter, based on the variations in the location and shape of the hands.

For example, the wearable glasses 1000 may determine how much the selected parameter is to be adjusted based on a variation in a distance by which at least a portion of a hand is moved for a predetermined period of time or a variation in the shape in which at least a portion of the hand is moved for the predetermined period of time. However, it is understood that one or more other exemplary embodiments are not limited thereto. For example, the wearable glasses 1000 may determine the adjustment value, based on various pieces of information acquired based on a gesture, such as, a speed at which the hand moves, a location from which the hand is detected, a direction in which the hand moves, and the number of times an action of taking the gesture is repeated.

FIGS. 52, 53, and 54 are schematic diagrams for explaining a method in which the wearable glasses 1000 determine an adjustment value for adjusting a display image based on a gesture of a user, according to an exemplary embodiment.

Referring to FIG. 52, the wearable glasses 1000 may output a guide image that guides the user to take a gesture of rotating the virtual input interface 4801 with a hand 7.

When the gesture of the hand 7 of the user corresponding to the virtual input interface 4801 is detected, the wearable glasses 1000 may adjust a display image based on an angle at which the hand 7 of the user is moved, a distance by which the hand 7 of the user is moved, or a speed at which the hand 7 of the user is moved.

For example, when the user takes a gesture of clockwise rotating the virtual input interface 4801 with the hand 7, the wearable glasses 1000 may clockwise rotate the display image by an angle at which the hand 7 of the user is rotated.

As shown in FIG. 53, the wearable glasses 1000 may output a guide image that guides the user to take a gesture of pressing at least one button included in the virtual input interface 4801 with the hand 7.

When the gesture of the hand 7 of the user corresponding to the virtual input interface 4801 is detected, the wearable glasses 1000 may adjust a display image based on the location of the hand 7 of the user and a distance by which or the number of times the hand 7 of the user is moved.

For example, when the user takes a gesture of pressing an arrow-shaped button included in the virtual input interface 4801 with the hand 7, the wearable glasses 1000 may move the display image in a direction corresponding to the arrow-shaped button. In this case, the wearable glasses 1000 may move the display image by a distance corresponding to the number of times the hand 7 of the user is moved.

As shown in FIG. 54, the wearable glasses 1000 may output a guide image that guides the user to take a gesture of moving the virtual input interface 4801 with the hand 7.

When a gesture of the hand 7 of the user corresponding to the virtual input interface 4801 is detected, the wearable glasses 1000 may adjust a display image based on a distance by which the hand 7 of the user is moved or an angle at which the hand 7 of the user is rotated.

For example, when the user takes a gesture of rotating the virtual input interface 4801 with the hand 7, the wearable glasses 1000 may rotate the display image by an angle at which the hand 7 of the user rotates.

A method of adjusting the display image based on a gesture of a user within an interest space, according to one or more exemplary embodiments, has been described above with reference to FIGS. 50 through 54. However, it is understood that one or more other exemplary embodiments are not limited thereto.

For example, according to one or more other exemplary embodiments, the wearable glasses 1000 may acquire information about a touch input of the user that is received via the user input unit 1040 included in the wearable glasses 1000, as the information about the gesture of the user. For example, the wearable glasses 1000 may include a touch pad as the user input unit 120. The touch pad included in the wearable glasses 1000 may be a capacitive overlay type, a resistive overlay type, an infrared beam type, a surface acoustic wave type, an integral strain gauge type, a piezo electric type, an optical input device or pad, or the like, but is not limited thereto.

The touch pad included in the wearable glasses 1000 may be configured to detect a proximity touch as well as a real touch. Throughout the specification, the term "real touch" denotes a case in which a pointer really or directly touches a screen, and the term "proximity touch" denotes a case in which the pointer does not actually touch the screen but approaches a position which is separated from the screen by a certain distance.

The pointer used herein denotes a touch instrument for really touching or proximity-touching a portion of a displayed screen image. Examples of the pointer include an electronic pen, a finger, a stylus pen, etc.

In order to detect a real touch or a proximity touch, various sensors may be provided within or near the touch pad. An example of the sensor used to detect the actual touch or the proximate touch on the touch pad may include a tactile sensor. The tactile sensor denotes a sensor that detects a touch by a specific object to a degree to which a human feels or more. The tactile sensor may detect various types of information, such as the roughness of a touched surface, the hardness of the touching object, the temperature of a touched point, and the like.

Another example of the sensor used to detect a touch on the touch pad is a proximity sensor. The proximity sensor is a sensor that detects the existence of an object that approaches a predetermined detection surface or that exists nearby, by using an electromagnetic force or infrared rays, without using any mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like.

Examples of the touch gesture of the user may include tap, touch and hold, double tap, drag, panning, flick, drag and drop, swipe, and the like.

The wearable glasses 1000 may acquire the information about the gesture of the user via the user input unit 1040. For example, the wearable glasses 1000 may sense a touch input for adjusting a display image via the user input unit 1040. For example, the user may drag or tap a predetermined location on the touch pad of the user input unit 1040.

"Drag" denotes an action of a user touching a screen with a fingertip or a touch tool and moving the fingertip or touch tool to other positions on the screen while touching the screen. "Tap" denotes an action of a user touching a screen with a fingertip or a touch tool (e.g., an electronic pen) and very quickly lifting the fingertip or the touch tool from the screen without moving.

The wearable glasses 1000 may adjust the display image based on a touch input of the user. For example, the wearable glasses 1000 may acquire a touch input of the user as the information about the gesture of the user, determine an adjustment value based on the touch input of the user, and adjust the display image based on the determined adjustment value.

Figure 55:
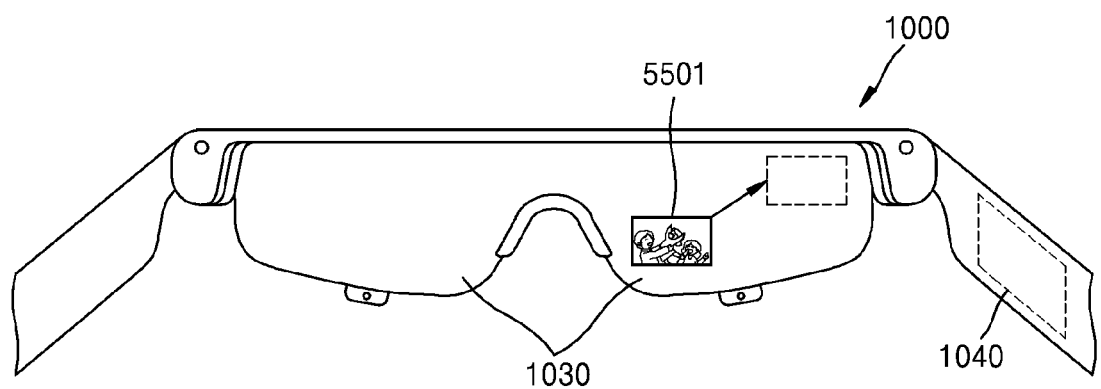
FIGS. 55 and 56 are schematic diagrams for explaining a method in which wearable glasses adjust a display image based on a gesture of a user, according to one or more exemplary embodiments.
Figure 55:
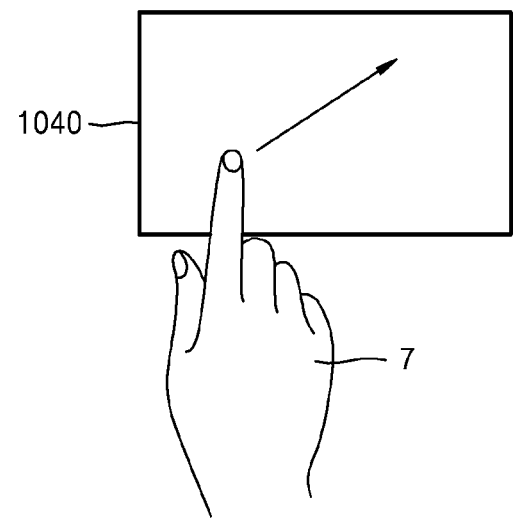
Figure 56:
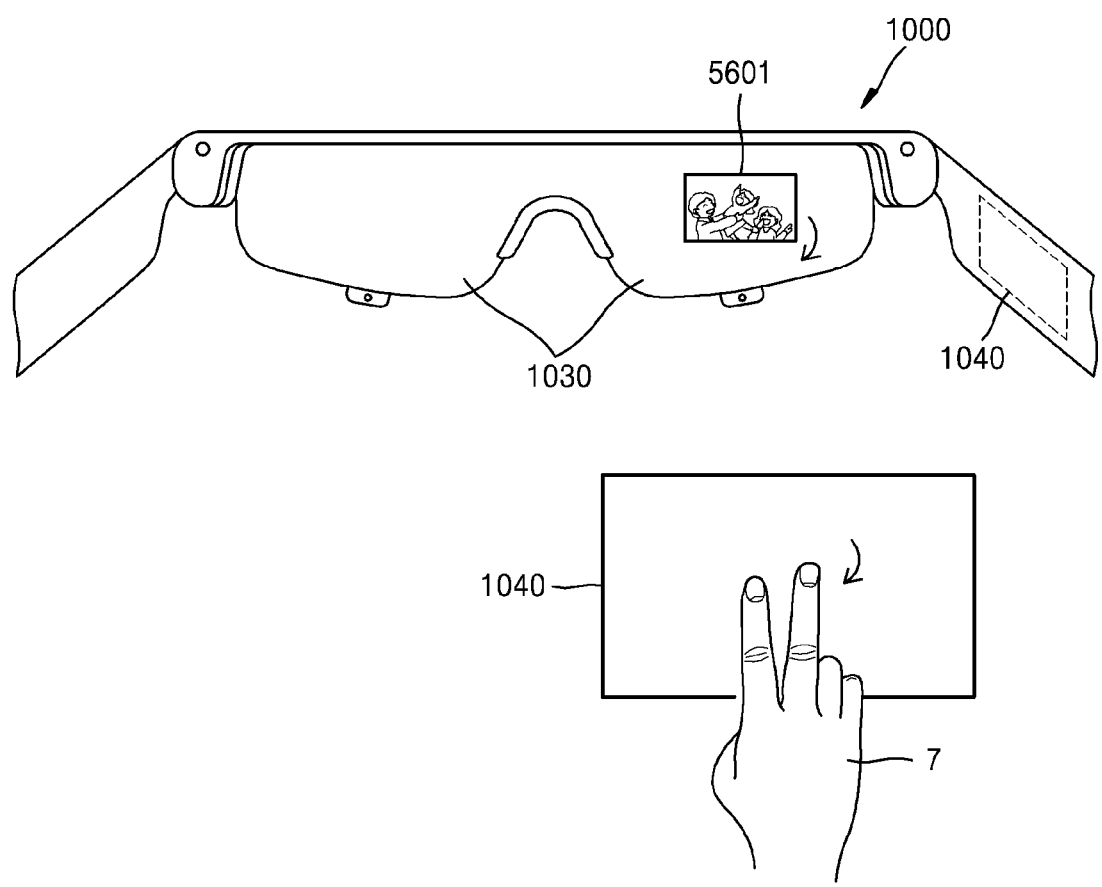

FIGS. 55 and 56 are schematic diagrams for explaining a method in which the wearable glasses 1000 adjust a display image based on a gesture of a user, according to one or more exemplary embodiments.

FIGS. 55 and 56 illustrate a case in which the wearable glasses 1000 include a touch pad as the user input unit 1040, according to one or more exemplary embodiments. The touch pad included in the wearable glasses 1000 may be a capacitive overlay type, a resistive overlay type, an infrared beam type, a surface acoustic wave type, an integral strain gauge type, a piezo electric type, or the like, but is not limited thereto.

First, as shown in FIG. 55, the wearable glasses 1000 may detect a gesture of a user dragging a predetermined location on the touch pad of the user input unit 1040. The wearable glasses 1000 may adjust the display image based on at least one of a direction of the drag gesture of the user, a duration thereof, and a distance by which the hand 7 is moved due to the drag gesture.

For example, as shown in FIG. 55, the wearable glasses 1000 may change the location of a display image 5501, based on a drag input of the user.

The wearable glasses 1000 may identify a multi-touch gesture by recognizing several touch points via the user input unit 1040. The wearable glasses 1000 may be set to differently react according to the number of touch points that are sensed, by identifying the multi-touch gesture.

As shown in FIG. 56, the wearable glasses 1000 may detect a gesture of a user touching a predetermined location on the touch pad of the user input unit 1040 by using a plurality of fingers. The wearable glasses 1000 may adjust the display image based on at least one of the number of touch points of the user, a direction in which the fingers move, a duration of the touch gesture, and a distance by which the fingers are moved due to the touch gesture.

For example, as shown in FIG. 56, in response to a user input of dragging the user input unit 1040 by using at least two fingers, the wearable glasses 1000 may rotate a display image 5601, based on a direction in which the touch input is moved.

However, it is understood that one or more other exemplary embodiments are not limited to FIGS. 55 and 56. The wearable glasses 1000 may adjust at least one of a rotation angle, a size, a location, a brightness, and a shape of the display image according to various touch inputs of the user. For example, when the display 1030 of the wearable glasses 1000 is constructed as a semi-transparent optical waveguide (for example, a prism), the wearable glasses 1000 may adjust the location of a focal point on which light output from the projector of the display 1030 is focused, based on the touch input of the user.

The wearable glasses 1000 may operate in connection with a device such as a mobile phone, a personal digital assistant (PDA), a laptop, a tablet, a portable multimedia player, a display device, a personal computer (PC), a server, etc. The device may display an image via the wearable glasses 1000.

Figure 57:
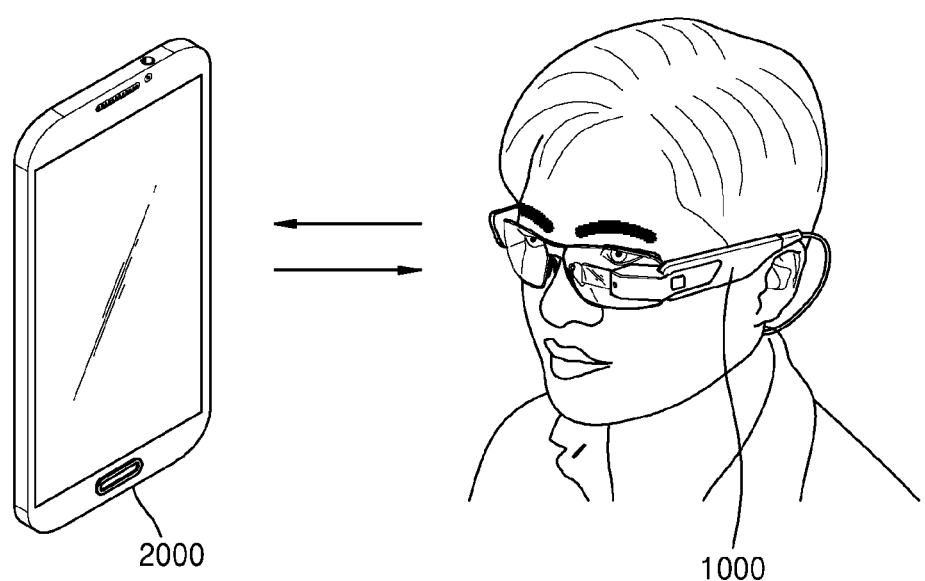
FIG. 57 is a schematic diagram of a system in which a device displays an image via wearable glasses, according to an exemplary embodiment.

FIG. 57 is a schematic diagram of a system in which a device 2000 displays an image via the wearable glasses 1000, according to an exemplary embodiment.

Referring to FIG. 57, the wearable glasses 1000 may provide the device 2000 with information that is used to adjust a display image.

The information provided by the wearable glasses 1000 to the device 2000 may include, for example, at least one of information about a body part of a user who is wearing the wearable glasses 1000, information about a gesture of the user, and a user input that is input via the wearable glasses 1000.

The device 2000 adjusts the display image based on the information received from the wearable glasses 1000, and provides an adjusted image to the wearable glasses 1000. The display 2000 may display the adjusted image via the wearable glasses 1000.

The wearable glasses 1000 may photograph a body part of the user and transmit an image of the body part to the device 2000. For example, the wearable glasses 1000 may photograph the eyes or hands of the user.

The device 2000 may receive the image captured by the wearable glasses 1000 from the wearable glasses 1000, and determine a display image via the wearable glasses 1000. The display 2000 may determine a location on which an image is to be displayed, and may display the image on the determined location via the wearable glasses 1000.

Examples of the device 2000 may include, but are not limited to, a smartphone, a tablet personal computer (PC), a PC, a smart TV, a mobile phone, a PDA, a laptop, a media player, a micro-server, a global positioning system (GPS) device, an electronic book terminal, a digital broadcasting terminal, a navigation device, a kiosk, an MP3 player, a digital camera, and other mobile or non-mobile computing devices. The device 2000 may also include various apparatuses capable of receiving a touch input, such as, an electronic blackboard and a touch table. The device 2000 may be a wearable device including a communication function and a data processing function. However, it is understood that one or more other exemplary embodiments are not limited thereto, and the device 1000 may be any kind of apparatus capable of receiving or transmitting data from or to the wearable glasses 1000 via a network.

The device 2000 and the wearable glasses 1000 may be connected to each other via a network, and the network may be a wired network, such as a local area network (LAN), a wide area network (WAN), or a value added network (VAN), or any kind of wireless network, such as a mobile radio communication network, a satellite communication network, etc.

Figure 58:
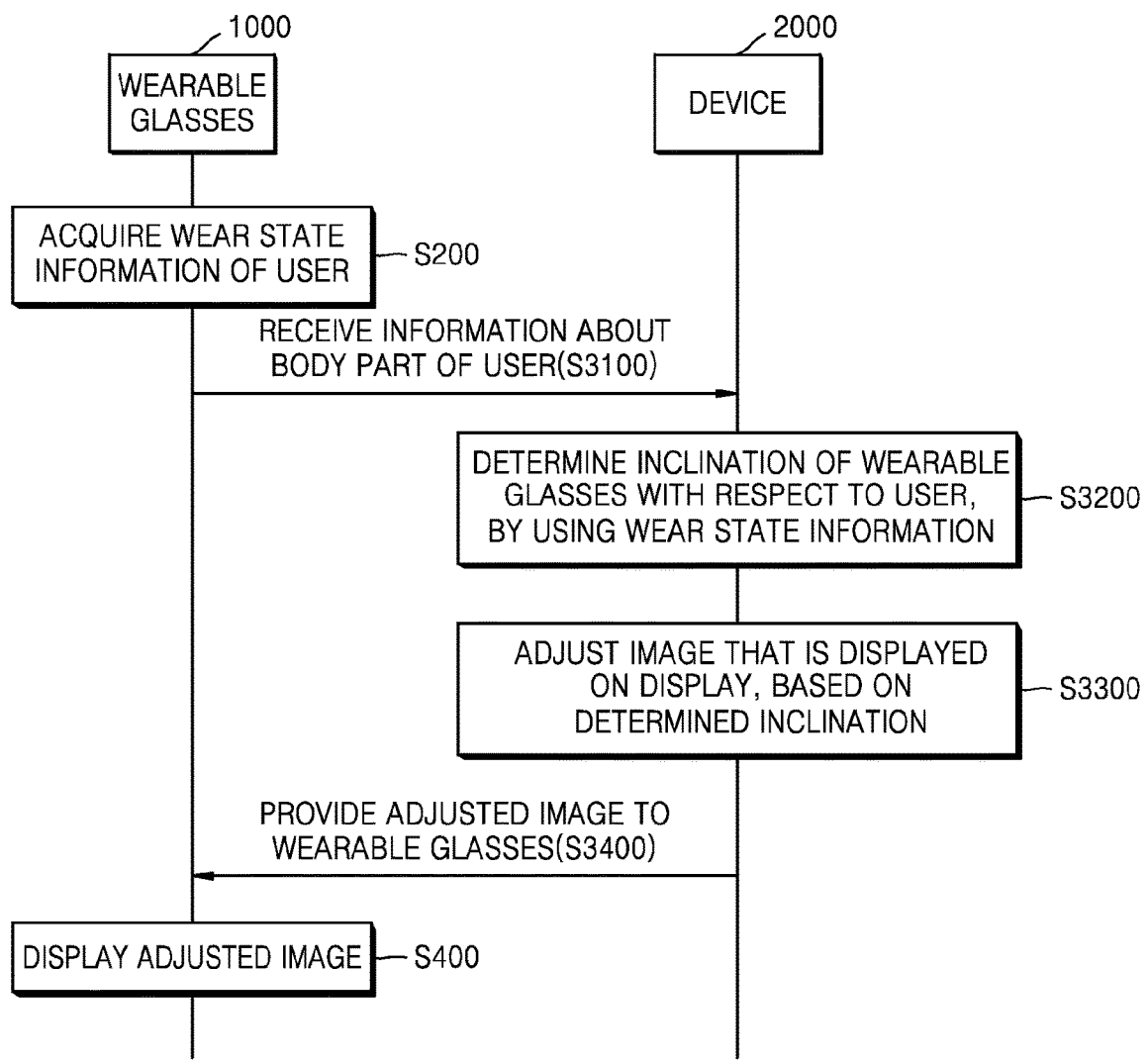
FIG. 58 is a flowchart of a method in which a device displays an image via wearable glasses, according to an exemplary embodiment.

FIG. 58 is a flowchart of a method in which the device 2000 displays an image via the wearable glasses 1000, according to an exemplary embodiment.

Referring to FIG. 58, in operation S3100, the device 2000 may receive wear state information representing a state where a user currently wears the wearable glasses 1000, from the wearable glasses 1000. The wear state information may include information about a body part of the user. The information about the body part of the user may be information that is used to determine an inclination of the wearable glasses 1000 with respect to the user as compared with the reference wear state. For example, the information about the body part acquired by the wearable glasses 1000 may include information about at least one selected from the eyes, nose, ears, mouth, and hands of the user. The information about the body part acquired by the wearable glasses 1000 may also include an image of the body part.

The wear state information received by the device 2000 from the wearable glasses 1000 in operation S3100 may be information acquired by the wearable glasses 1000. Operation S200 of FIG. 58 corresponds to operation S200 of FIG. 6, and thus a redundant description thereof is omitted below.

In operation S3200, the wearable glasses 1000 may determine an inclination of the wearable glasses 1000 with respect to the user, by using the received information about the body part of the user.

The inclination of the wearable glasses 1000 with respect to the user denotes an inclination degree of the wearable glasses 1000 that is determined based on a location of the wearable glasses 1000 that is the most appropriate to show an image to the user.

For example, the device 2000 may determine the inclination of the wearable glasses 1000 with respect to the user by comparing predetermined reference wear state information with the wear state information received from the wearable glasses 1000. The reference wear state information is information representing the location of the wearable glasses 1000 that is the most appropriate to provide an image to a user. The reference wear state information may be pre-stored or may be set by the user.

For example, the wear state information may include an image of the body part of the user. The device 2000 may detect an area corresponding to the body part from the image of the body part and acquire a property value of the body part from the detected area. The device 2000 may acquire a property value associated with the location, the shape, or the size of the area corresponding to the body part detected from the image of the body part. The device 2000 may determine the inclination by comparing the acquired property value with a reference value included in the reference wear state information. The reference value included in the reference wear state information may be a property value detected from an image of a body part acquired in the reference wear state.

In operation S3300, the device 2000 may adjust an image that is displayed on the display 1030 of the wearable glasses 1000, based on the inclination determined in operation S3200. For example, the device 2000 may adjust at least one of a rotation angle, a size, and a shape of a display image, based on the inclination determined in operation S3200.

However, it is understood that one or more other exemplary embodiments are not limited thereto, and the device 2000 may adjust various parameters of an image that is provided to the user via the display 1030. For example, the device 2000 may further adjust at least one of the brightness of the image that is displayed on the display 1030, a location on the display 1030 on which the image is displayed, and the color of the image that is displayed on the display 1030.

As another example, when the display 1030 of the wearable glasses 1000 is constructed as a semi-transparent optical waveguide (for example, a prism), the device 2000 may adjust the location of a focal point on which light output from the projector of the display 1030 is focused, based on the inclination of the wearable glasses 1000.

In operation S3400, the device 2000 may provide an adjusted image obtained in operation S3300 to the wearable glasses 1000. In operation S400, the adjusted image provided by the device 2000 to the wearable glasses 1000 may be displayed via the wearable glasses 1000.

When the device 2000 adjusts the display image by using the information about the body part, any of the methods described above may be applied. In other words, any method described above, in which the wearable glasses 1000 adjusts a display image, may be applied to the case where the device 2000 adjusts an image that is displayed on the wearable glasses 1000 according to one or more exemplary embodiment. Thus, a redundant description of the case where the device 2000 adjusts an image that is displayed on the wearable glasses 1000 is omitted below.

Figure 59:
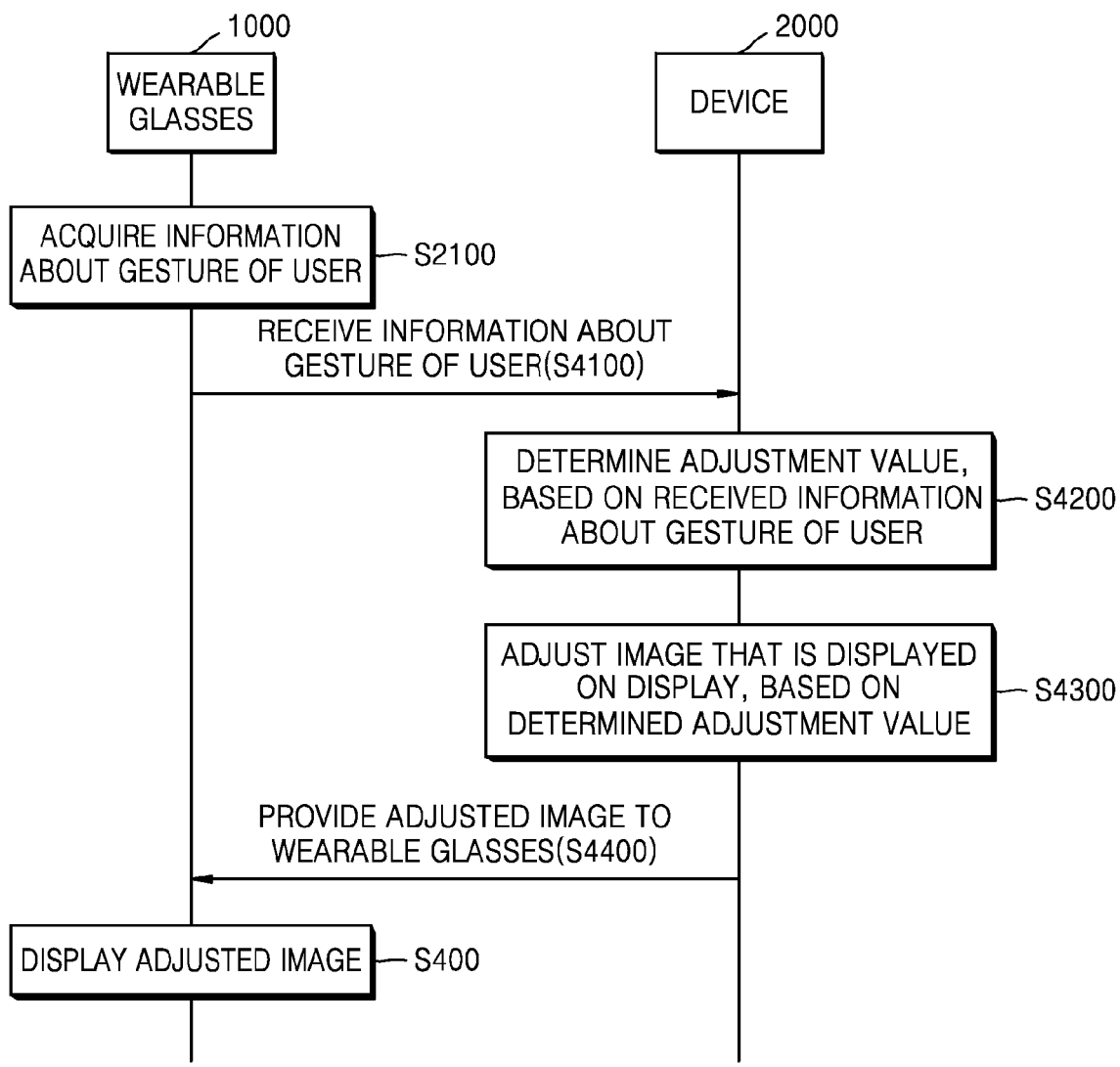
FIG. 59 is a flowchart of a method in which a device displays an image via wearable glasses, according to an exemplary embodiment.

FIG. 59 is a flowchart of a method in which the device 2000 displays an image via the wearable glasses 1000, according to an exemplary embodiment.

Referring to FIG. 59, in operation S4100, the device 2000 may receive information about a gesture of a user from the wearable glasses 1000.

The information about the gesture of the user may be information that is used to determine an adjustment value for adjusting a display image. For example, the information about the gesture acquired by the wearable glasses 1000 may include information about at least one of the head, the hands, the eyes, and the mouth of the user. The information about the gesture acquired by the wearable glasses 1000 may also include an image of the body part that takes the gesture.

The information about the gesture received by the device 2000 from the wearable glasses 1000 in operation S4100 may be information acquired by the wearable glasses 1000. Operation S2100 of FIG. 59 corresponds to operation S2100 of FIG. 46, and thus a redundant description thereof is omitted below.

In operation S4200, the device 2000 may determine an adjustment value for adjusting a display image, based on the received information about the gesture of the user.

For example, the adjustment value may be a value for adjusting at least one of the rotation angle, the size, and the shape of the display image. Alternatively, the adjustment value may be a value for adjusting the brightness of the display image, a location on the display 1030 where the display image is displayed, or a color of the display image. Alternatively, when the display 1030 of the wearable glasses 1000 is constructed as a semi-transparent optical waveguide (for example, a prism), the adjustment value may be the location of a focal point on which light output from the projector of the display 1030 of the wearable glasses 1000 is focused.

The device 2000 may map information about several gestures with adjustment values and store a result of the mapping, or store relations capable of calculating the adjustment values based on the information about the gestures. The device 2000 may determine the adjustment value by searching for a pre-stored adjustment value based on the acquired information, or by calculating the adjustment value by using a found relation.

In operation S4300, the device 2000 may adjust a display image, based on the determined adjustment value. For example, the wearable glasses 1000 may adjust at least one of a rotation angle, a size, and a shape of the display image, based on the determined adjustment value.

In operation S4400, the device 2000 may provide an adjusted image obtained in operation S4300 to the wearable glasses 1000. In operation S400, the adjusted image provided by the device 2000 to the wearable glasses 1000 may be displayed via the wearable glasses 1000.

When the device 2000 adjusts a display image by using information about a gesture of a user, the method described above with reference to FIGS. 45 through 56 may be applied. In other words, the method described above with reference to FIGS. 45 through 56, in which the wearable glasses 1000 adjusts a display image, may be applied to the case where the device 2000 adjusts an image that is displayed on the wearable glasses 1000 according to an exemplary embodiment. Thus, a redundant description of the case where the device 2000 adjusts an image that is displayed on the wearable glasses 1000 is omitted below.

Figure 60:
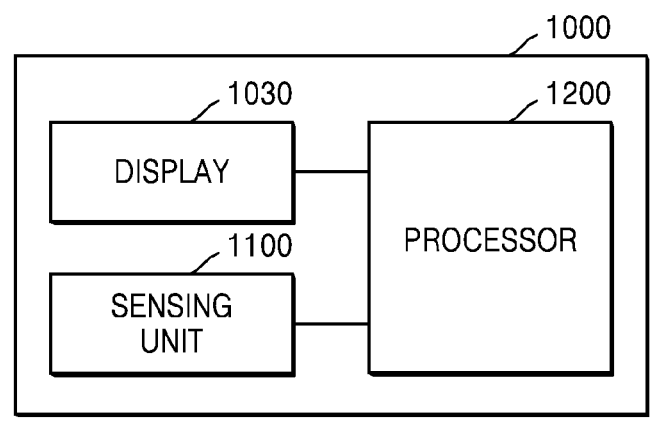
FIGS. 60 and 61 are block diagrams of wearable glasses according to one or more exemplary embodiments.

FIG. 60 is a block diagram of the wearable glasses 1000, according to an exemplary embodiment.

Referring to FIG. 60, the wearable glasses 1000 may include a sensing unit 1100 (e.g., sensor), a processor 1200, and a display 1030. Other and/or additional components than those illustrated in FIG. 60 may be included in the wearable glasses 1000. The components included in the wearable glasses 1000 may be arranged on a frame that is used to wear the wearable glasses 1000 on the head of a user.

The display 1030 shows an image to the user. The display 1030 displays information that is processed by the wearable glasses 1000. The display 1030 may display an image that has been adjusted based on an inclination of the wearable glasses 1000 or a gesture of the user.

The display 1030 may display at least one of a user interface (UI) for setting a reference value that is used to adjust a display image, a UI for inducing a gesture of the user that is used to adjust the display image, and a UI for providing the user with information associated with adjustment of the display image.

The sensing unit 1100 may acquire information about a body part of the user or information about a gesture of the user. The information about the body part of the user may include an image of the body part, and the information about the gesture of the user may include an image of a body part of the user that takes the gesture.

For example, the sensing unit 1100 may acquire an image of the eyes of the user or an image of the hands of the user.

The processor 1200 may determine an inclination of the wearable glasses 1000 with respect to the user by using the information about the body part of the user, and adjust a display image based on the determined inclination. Alternatively, the processor 1200 may determine an adjustment value by using the information about the gesture of the user, and adjust a display image based on the adjustment value.

Figure 61:
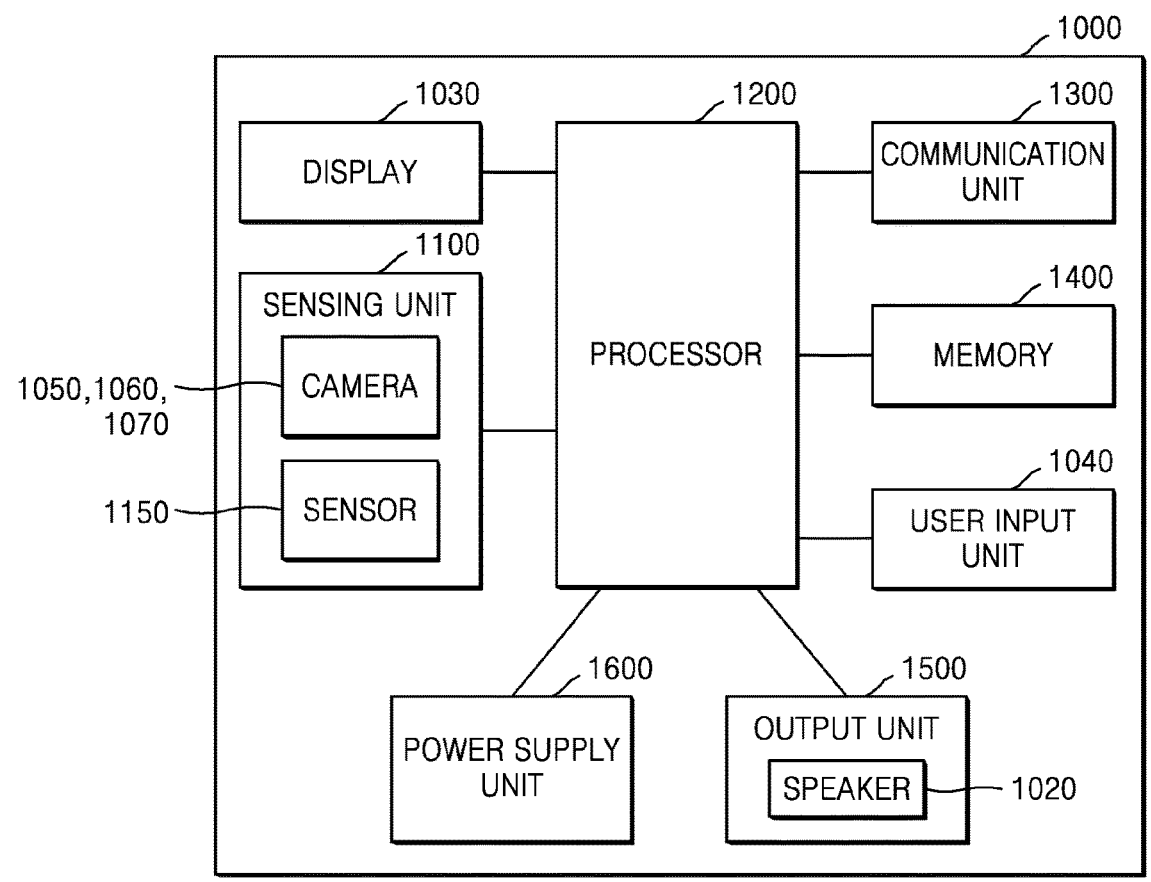

As shown in FIG. 61, the wearable glasses 1000 may further include a communication unit 1300 (e.g., communicator), a memory 1400, a user input unit 1040 (e.g., user inputter or user input device), an output unit 1500 (e.g., outputter or output device), and a power supply unit 1600 (e.g., power supplier or power supply). According to an exemplary embodiment, the sensing unit 1100 may include at least one camera, namely, cameras 1050, 1060, and 1070, and a sensor 1150. The above-described components may be connected to one another via a bus.

The aforementioned components will now be described in detail.

The cameras 1050, 1060, and 1070 photograph or capture an image of an object in an actual space. Object images captured by the cameras 1050, 1060, and 1070 may be moving picture images or consecutive still images. The wearable glasses 1000 may be an eyeglasses-type device including a communication operation and a data processing operation. The camera 1050 in the wearable glasses 1000 may face the user and photograph the object of the actual space.

The camera 1060 may photograph the eyes of the user. For example, the camera 1060 in the wearable glasses 1000 may face the face of the user and photograph the eyes of the user.

The eye tracking camera 1070 may photograph the eyes of the user. For example, the eye tracking camera 1070 in the wearable glasses 1000 may track the eyes of the user by tracking at least one of a head pose, eyelids, and irises of the user.

The sensor 1150 may sense a status of the wearable glasses 1000 or a status of the surrounding of the wearable glasses 1000 and may transmit information corresponding to the sensed status to the processor 1200. For example, the sensor 1150 may acquire wear state information representing a state in which the user currently wears the wearable glasses 1000. For example, the sensor 1150 may include at least one of a magnetic sensor, an acceleration sensor, a gyroscope sensor, a proximity sensor, an optical sensor, a depth sensor, an infrared sensor, and an ultrasonic sensor.

The communication unit 1300 may transmit or receive information that is used when the wearable glasses 1000 display an image and adjust a display image, to or from the device 2000, peripheral devices, or a server.

The memory 1400 stores the information that is used when the wearable glasses 1000 display an image and adjust the image based on an inclination of the wearable glasses 1000. The memory 1400 may store information about a reference wear state representing a state in which the wearable glasses 1000 are worn by the user on a location that is the most appropriate for the user to receive an image. For example, the memory 1400 may store reference wear state information including an image of a body part of the user that is acquired in a reference wear state, and a property value that is detected from the image of the body part of the user acquired in the reference wear state.

The user input unit 1040 receives a user unit for controlling the wearable glasses 1000. The user input unit 1040 may receive a touch input with respect to the wearable glasses 1000 and a key input with respect to the wearable glasses 1000. The user input unit 1040 may also receive a gesture input of the user that is photographed by the camera 1050.

The power supply unit 1600 supplies power for operating the wearable glasses 1000, to each component. The power supply unit 1600 may include a battery capable of charging, and a cable or cable port capable of receiving power from an external source.

The output unit 1500 outputs information received from the communication unit 1300, processed by the processor 1200, or stored in the memory 1400, in the form of at least one of light, sound, and vibration. For example, the output unit 1500 may include a speaker 1020 outputting audio data. The speaker 1020 may also output an audio signal (for example, a call signal receiving sound, a message receiving sound, a notification sound) related with a function of the wearable glasses 1000.

The processor 1200 may control overall operations of the wearable glasses 1000. For example, the processor 1200 may control the display 1030, the sensing unit 1100, the communication unit 1300, the memory 1400, the user input unit 1040, the output unit 1100, and the power supply unit 1600 by executing programs stored in the memory 1400.

The wearable glasses 1000 may be connected to the device 2000 and may receive information about a display image from the device 2000 to thereby display an image on the display 1030 of the wearable glasses 1000.

Figure 62:
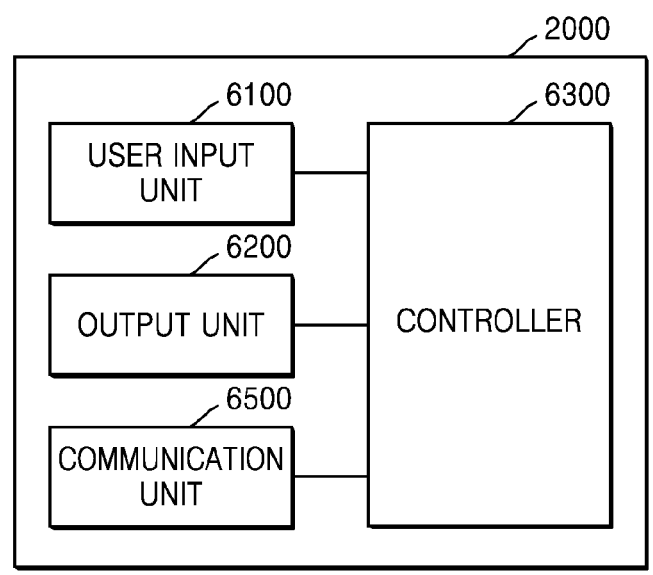

FIGS. 62 and 63 are block diagrams of devices 2000 according to one or more exemplary embodiments.

Referring to FIG. 62, the device 2000 may include a user input unit 6100, an output unit 6200, a controller 6300, and a communication unit 6500. More or less components than those illustrated in FIG. 62 may be included the device 2000.

For example, referring to FIG. 63, the device 2000 may further include a sensing unit 6400 (e.g., sensor), an audio/video (A/V) input unit 6600 (e.g., A/V inputter or A/V input device), and a memory 6700, in addition to the user input unit 6100 (e.g., user inputter or user input device), the output unit 6200 (e.g., outputter or output device), the controller 6300, and the communication unit 6500 (e.g., communicator).

The user input unit 6100 denotes a unit via which a user inputs data for controlling the device 2000. For example, the user input unit 6100 may be, but not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The user input unit 6100 may receive a user unit for controlling the wearable glasses 1000. The user input unit 6100 may also receive a user unit for adjusting an image that is displayed via the wearable glasses 1000, based on information about a body part of a user or information about a gesture of the user.

The output unit 6200 may output an audio signal, a video signal, or a vibration signal, and may include a display 6210, an audio output unit 6220 (e.g., speaker, audio outputter, audio jack, audio output device), and a vibration motor 6230.

The display 6210 displays information that is processed by the device 2000. For example, the display 6210 may display a UI for receiving a user input for controlling the wearable glasses 1000, and a UI for receiving a setting value associated with an operation of adjusting an image that is displayed via the wearable glasses 1000.

When the display 6210 forms a layer structure together with a touch pad to construct a touch screen, the display 6210 may be used as an input device as well as an output device. The display 6210 may include at least one of a liquid crystal display (LCD), a thin film transistor-liquid crystal display (TFT-LCD), an organic light-emitting diode (OLED), a flexible display, a 3D display, and an electrophoretic display. According to one or more exemplary embodiments of the device 2000, the device 2000 may include at least two displays 6210. The at least two displays 6210 may be disposed to face each other by using a hinge.

The audio output unit 6220 may output audio data that is received from the communication unit 6500 or stored in the memory 6700. The audio output unit 6220 may also output an audio signal (for example, a call signal receiving sound, a message receiving sound, a notification sound) related with a function of the device 2000. The audio output unit 6220 may include a speaker, a buzzer, and the like.

The vibration motor 6230 may output a vibration signal. For example, the vibration motor 6230 may output a vibration signal corresponding to an output of audio data or video data (for example, a call signal receiving sound or a message receiving sound). The vibration motor 6230 may also output a vibration signal when the touch screen is touched.

The controller 6300 may control all operations of the device 2000. For example, the controller 6300 may control the user input unit 6700, the output unit 6200, the sensing unit 6400, the communication unit 6500, the A/V input unit 6600, and the like by executing programs stored in the memory 6500.

In detail, the controller 6300 receives information for use in adjusting a display image from the wearable glasses 1000 and adjust the display image based on the received information, by controlling the communication unit 6500.

The controller 6300 receives a user input for controlling an operation of the wearable glasses 1000. The user input may be, for example, a touch input, a button input, or a voice input, but is not limited thereto. The controller 6300 may receive a user input with respect to the wearable glasses 1000, from the wearable glasses 1000.

The sensing unit 6400 may sense the status of the device 2000 or the status of the surrounding of the device 2000 and may transmit information corresponding to the sensed status to the controller 6300.

The sensing unit 6400 may include, but is not limited thereto, at least one of a magnetic sensor 6410, an acceleration sensor 6420, a temperature/humidity sensor 6430, an infrared sensor 6440, a gyroscope sensor 6450, a position sensor (e.g., a GPS) 6460, a pressure sensor 6470, a proximity sensor 6480, and an RGB sensor 6490 (i.e., an illumination sensor).

The communication unit 6500 may include at least one component that enables the device 2000 to perform data communication with the wearable glasses 1000 or a server. For example, the communication unit 6500 may include a short-range wireless communication unit 6510 (e.g., short-range wireless communicator), a mobile communication unit 6520 (e.g., mobile communicator), and a broadcasting reception unit 6530 (e.g., broadcast receiver).

The short-range wireless communication unit 1510 may include, but is not limited to, a Bluetooth communicator, a Bluetooth Low Energy (BLE) communicator, a near field communication (NFC) unit, a wireless local area network (WLAN) (e.g., Wi-Fi) communicator, a ZigBee communicator, an infrared Data Association (IrDA) communicator, a Wi-Fi direct (WFD) communicator, an ultra wideband (UWB) communicator, and the like.

The mobile communication unit 6520 may exchange a wireless signal with at least one selected from a base station, an external terminal, and a server on a mobile communication network. Examples of the wireless signal may include a voice call signal, a video call signal, and various types of data generated during a short message service (SMS)/multimedia messaging service (MMS).

The broadcasting reception unit 6530 receives a broadcasting signal and/or broadcasting-related information from an external source via a broadcasting channel. The broadcasting channel may be a satellite channel, a ground wave channel, or the like. According to one or more other exemplary embodiments, the device 2000 may not include the broadcasting reception unit 6530.

The A/V input unit 6600 inputs an audio signal or a video signal, and may include a camera 6610 and a microphone 6620. The camera 6610 may acquire an image frame, such as a still image or a moving picture, via an image sensor in a video call mode or a photography mode. An image captured via the image sensor may be processed by the controller 6300 or a separate image processor.

The image frame obtained by the camera 6610 may be stored in the memory 6700 or transmitted to the outside via the communicator 6500. At least two cameras 6610 may be included according to one or more exemplary embodiments of the structure of a terminal.

The microphone 6620 receives an external audio signal and converts the external audio signal into electrical audio data. For example, the microphone 6620 may receive an audio signal from an external device or a speaking person. The microphone 6620 may use various noise removal algorithms in order to remove noise that is generated while receiving the external audio signal.

The memory 6700 may store a program used by the controller 6300 to perform processing and control, and may also store data that is input to or output from the device 2000.

The memory 6700 may include at least one type of storage medium from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The programs stored in the memory 6700 may be classified into a plurality of modules according to their functions, for example, a UI module 6710, a touch screen module 6720, and a notification module 6730.

The UI module 6710 may provide a UI, a GUI, or the like that is specialized for each application and interoperates with the device 2000. The touch screen module 6720 may detect a touch gesture on a touch screen of a user and transmit information regarding the touch gesture to the controller 6300. The touch screen module 6720 according to an exemplary embodiment may recognize and analyze a touch code. The touch screen module 6720 may be configured by separate hardware including a controller.

In order to detect the actual touch or the proximate touch on the touch pad, the touch screen may internally or externally have various sensors. An example of a sensor used to detect the real touch or the proximity touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, the temperature of a touched point, and the like.

Another example of a sensor used to detect the real touch or the proximity touch on the touch screen is a proximity sensor.

The proximity sensor is a sensor that detects the existence of an object that approaches a predetermined detection surface or that exists nearby, by using an electromagnetic force or infrared rays, without using any mechanical contact. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. Examples of the touch gesture of the user may include tap, touch and hold, double tap, drag, panning, flick, drag and drop, swipe, and the like.

The notification module 6730 may generate a signal for notifying that an event has been generated in the device 2000. Examples of the event generated in the device 2000 may include call signal receiving, message receiving, a key signal input, schedule notification, and the like. The notification module 6730 may output a notification signal in the form of a video signal via the display 6210, in the form of an audio signal via the audio output unit 6220, or in the form of a vibration signal via the vibration motor 6230.

An exemplary embodiment can also be embodied as a storage medium including instruction codes executable by a computer such as a program module executed by the computer. A computer-readable recording medium can be any usable medium which can be accessed by the computer and includes all volatile/non-volatile and removable/non-removable media. Further, the computer-readable recording medium may include all computer storage and communication media. The computer storage medium includes all volatile/non-volatile and removable/non-removable media embodied by a certain method or technology for storing information such as computer-readable instruction code, a data structure, a program module or other data. The communication medium may include the computer-readable instruction code, the data structure, the program module, or other data of a modulated data signal such as a carrier wave, or other transmission mechanism, and includes any information transmission medium. It is understood that one or more of the above-described elements may be implemented in or by at least one processor, circuitry, a microprocessor, etc.

Although exemplary embodiments have been disclosed for illustrative purposes, one of ordinary skill in the art will appreciate that diverse variations and modifications are possible, without departing from the spirit and scope of the present inventive concept. Thus, the above-described exemplary embodiments should be understood not to be restrictive but to be illustrative, in all aspects. For example, respective elements described in an integrated form may be dividedly used, and the divided elements may be used in a state of being combined.

The above exemplary embodiments should be considered in descriptive sense only and not for purposes of limitation. Descriptions of features or aspects within each exemplary embodiment should typically be considered as available for other similar features or aspects in other embodiments.

While exemplary embodiments have been particularly shown and described above, it will be understood by those of ordinary skill in the art that various changes in form and details may be made therein without departing from the spirit and scope of the present invention as defined by the following claims.

What is claimed is:

1. Wearable glasses comprising:
   a display configured to display an image;
   a sensor configured to acquire wear state information representing a state in which a user currently wears the wearable glasses, while the image is being displayed on the display; and
   a processor configured to determine an inclination of the wearable glasses with respect to the user based on the wear state information and adjust the displayed image based on the determined inclination,
   wherein the processor is further configured to reduce a size of the adjusted image to fit a display area of the display if the adjusted image deviates from the display area.

2. The wearable glasses of claim 1, wherein:
   the sensor is configured to acquire the wear state information including information about a body part of the user; and
   the processor is configured to determine the inclination of the wearable glasses with respect to the user by comparing the acquired wear state information with predetermined reference wear state information.

3. The wearable glasses of claim 2, wherein:
   the sensor is configured to acquire the wear state information including an image of the body part; and
   the processor is configured to:
     detect an area corresponding to the body part from the image of the body part,
     acquire a property value from the detected area, and
     compare the acquired property value with a reference value included in the predetermined reference wear state information in order to determine the inclination.

4. The wearable glasses of claim 1, wherein:
   the acquired wear state information comprises an eye image of an eye of the user who is wearing the wearable glasses; and
   the processor is configured to:
     acquire at least one value from among a length of a major axis of the eye, a length of a minor axis of the eye, an angle of the major axis of the eye, an angle of the minor axis of the eye, and a location value of an iris of the user from the eye image,
     compare the acquired at least one value with at least one predetermined reference value, and determine the inclination based on a result of comparing the acquired at least one value with at least one predetermined reference value.

5. The wearable glasses of claim 1, wherein:
the display is configured to display a test image;
the sensor is configured to acquire the wear state information including an eye image of an eye of the user on which the test image is reflected; and
the processor is configured to:
   detect an area corresponding to the eye of the user from the eye image,
   obtain a reflection image which is formed by reflection of the test image on the eye of the user within the detected area corresponding to the eye,
   compare the at least one of a size and a shape of the obtained reflection image with predetermined reference wear state information, and
   determine the inclination based on a result of comparing the at least one of the size and the shape of the obtained reflection image with predetermined reference wear state information.

6. The wearable glasses of claim 1, wherein the sensor is configured to obtain a state value representing a movement state of the wearable glasses and to acquire the wear state information when the obtained state value is equal to or greater than a predetermined value.

7. The wearable glasses of claim 1, wherein
the processor is configured to:
   determine whether the determined inclination is equal to or greater than a predetermined value,
   control the display to display the adjusted image obtained based on the determined inclination if the determined inclination is less than a predetermined value, and
   control the display to display an image informing the user to adjust a position of the wearable glasses if the determined inclination is equal to or greater than the predetermined value.

8. The wearable glasses of claim 1, wherein:
the acquired wear state information comprises an eye image of an eye of the user who is wearing the wearable glasses; and
the processor is configured to:
   acquire a length of a major axis of the eye from the eye image,
   compare the acquired length of the major axis of the eye with a predetermined reference value for the eye,
   calculate a change in a distance between the display and the eye of the user, and
   adjust a size of the displayed image based on the calculated change.

9. A method of displaying an image via wearable glasses, the method comprising:
displaying, on a display of the wearable glasses, an image;
acquiring wear state information representing a state in which a user currently wears the wearable glasses while the image is displayed on the display;
determining an inclination of the wearable glasses with respect to the user based on the wear state information; and
adjusting the displayed image based on the determined inclination,
wherein the adjusting the displayed image comprises reducing a size of the adjusted image to fit a display area of the display if the adjusted image deviates from the display area.

10. The method of claim 9, wherein:
the acquiring the wear state information comprises acquiring the wear state information including information about a body part of the user; and
the determining the inclination comprises determining the inclination of the wearable glasses with respect to the user by comparing the acquired wear state information with predetermined reference wear state information.

11. The method of claim 10, wherein:
the acquiring the wear state information comprises acquiring the wear state information including an image of the body part; and
the determining the inclination comprises:
   detecting an area corresponding to the body part from the image of the body part,
   acquiring a property value from the detected area, and
   comparing the acquired property value with a reference value included in the predetermined reference wear state information in order to determine the inclination.

12. The method of claim 9, wherein:
the wear state information comprises an eye image of an eye of the user who is wearing the wearable glasses; and
the determining the inclination comprises:
   acquiring at least one value from among a length of a major axis of the eye, a length of a minor axis of the eye, an angle of the major axis of the eye, an angle of the minor axis of the eye, and a location value of an iris of the user from the eye image,
   comparing the acquired at least one value with at least one predetermined reference value, and
   determining the inclination based on a result of the comparing.

13. The method of claim 9, wherein:
the displaying the image comprises displaying a test image;
the acquiring the wear state information comprises acquiring the wear state information including an eye image of an eye of the user on which the test image is reflected; and
the determining the inclination comprises:
   detecting an area corresponding to the eye of the user from the eye image,
   obtaining a reflection image which is formed by reflection of the test image on the eye of the user within the detected area corresponding to the eye,
   comparing the at least one of a size and a shape of the reflection image with predetermined reference wear state information, and
   determining the inclination based on a result of the comparing.

14. The method of claim 9, wherein the acquiring the wear state information comprises:
obtaining a state value representing a movement state of the wearable glasses; and
acquiring the wear state information when the obtained state value is equal to or greater than a predetermined value.

15. The method of claim 9, wherein the adjusting the displayed image comprises:
determining whether the determined inclination is equal to or greater than a predetermined value;
if the determined inclination is equal to or greater than the predetermined value according to the determining, displaying an image informing the user to adjust a position of the wearable glasses; and if the determined inclination is less than the predetermined value according to the determining, adjusting the displayed image, based on the determined inclination.

16. A non-transitory computer-readable storage medium having embodied thereon at least one program including commands for performing a method of displaying an image via wearable glasses, wherein the method comprises:
displaying an image that is provided by the wearable glasses;
acquiring wear state information representing a state in which a user currently wears the wearable glasses while the image is displayed on the display;
determining an inclination of the wearable glasses with respect to the user based on the wear state information; and
displaying an adjusted image obtained based on the determined inclination,
wherein the adjusting the image comprises reducing a size of the adjusted image to fit a display area of the display if the adjusted image deviates from the display area.

17. The non-transitory computer-readable storage medium of claim 16, wherein:
the acquiring the wear state information comprises acquiring the wear state information including information about a body part of the user; and
the determining the inclination comprises determining the inclination of the wearable glasses with respect to the user by comparing the acquired wear state information with predetermined reference wear state information.

18. The non-transitory computer-readable storage medium of claim 17, wherein:
the acquiring the wear state information comprises acquiring the wear state information including an image of the body part of the user; and
the determining the inclination comprises:
detecting an area corresponding to the body part from the image of the body part,
acquiring a property value from the detected area, and
comparing the acquired property value with a reference value included in the predetermined reference wear state information in order to determine the inclination.

19. The non-transitory computer-readable storage medium of claim 16, wherein the displaying the image comprises displaying a test image;
the acquiring the wear state information comprises acquiring the wear state information including an eye image of an eye of the user on which the test image is reflected; and
the determining the inclination comprises:
detecting an area corresponding to the eye of the user from the eye image,
obtaining a reflection image which is formed by reflection of the test image on the eye of the user within the detected area corresponding to the eye,
comparing the at least one of a size and a shape of the reflection image with predetermined reference wear state information, and
determining the inclination based on a result of the comparing.

20. The non-transitory computer-readable storage medium of claim 16, wherein the displaying the adjusted image comprises:
determining whether the determined inclination is equal to or greater than a predetermined value; and
based on the determined inclination being less than the predetermined value according to the determining, adjusting the displayed image, based on the determined inclination.

* * * * *